US007275260B2

(12) United States Patent
de Jong et al.

(10) Patent No.: US 7,275,260 B2
(45) Date of Patent: Sep. 25, 2007

(54) ENHANCED PRIVACY PROTECTION IN IDENTIFICATION IN A DATA COMMUNICATIONS NETWORK

(75) Inventors: Eduard K. de Jong, San Mateo, CA (US); Moshe Levy, Sunnyvale, CA (US); Albert Y. Leung, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 1001 days.

(21) Appl. No.: 10/040,270

(22) Filed: Oct. 29, 2001

(65) Prior Publication Data

US 2003/0140230 A1 Jul. 24, 2003

(51) Int. Cl.
*H04L 9/32* (2006.01)
(52) U.S. Cl. .......................................... 726/10; 713/155
(58) Field of Classification Search ............... 726/4–7
See application file for complete search history.

(56) References Cited

U.S. PATENT DOCUMENTS

| 5,202,921 | A | | 4/1993 | Herzberg et al. ............. 380/23 |
|---|---|---|---|---|
| 5,467,398 | A | * | 11/1995 | Pierce et al. ................... 380/44 |
| 5,701,343 | A | * | 12/1997 | Takashima et al. ........... 705/51 |
| 5,706,427 | A | | 1/1998 | Tabuki |
| 5,721,781 | A | | 2/1998 | Deo et al. ..................... 380/25 |
| 5,757,920 | A | | 5/1998 | Misra et al. ................... 380/25 |
| 5,758,068 | A | * | 5/1998 | Brandt et al. .................. 726/27 |
| 5,768,504 | A | | 6/1998 | Kells et al. ............ 395/187.01 |
| 5,774,668 | A | | 6/1998 | Choquier et al. ...... 395/200.53 |
| 5,774,670 | A | | 6/1998 | Montulli |
| 5,784,464 | A | | 7/1998 | Akiyama et al. .............. 380/25 |
| 5,802,519 | A | | 9/1998 | De Jong ..................... 707/100 |
| 5,841,970 | A | | 11/1998 | Tabuki |
| 5,844,218 | A | | 12/1998 | Kawan et al. ............... 235/380 |
| 5,862,325 | A | | 1/1999 | Reed et al. ............ 395/200.31 |
| 5,930,363 | A | | 7/1999 | Stanford et al. .............. 380/24 |
| 5,930,804 | A | | 7/1999 | Yu et al. |
| 5,999,971 | A | | 12/1999 | Buckland ..................... 709/218 |

(Continued)

FOREIGN PATENT DOCUMENTS

EP 0 748 135 11/1996

(Continued)

OTHER PUBLICATIONS

R. Rivest, "The MD4 Message Digest Algorithm", Request for Comments (RFC) 1320, MIT Laboratory for Computer Science and RSA Data Security , Inc., Apr. 1992, pp. 1-20.

(Continued)

*Primary Examiner*—Matthew B Smithers
(74) *Attorney, Agent, or Firm*—Gunnison, McKay & Hodgson, L.L.P.; Forrest Gunnison

(57) ABSTRACT

A method for enhanced privacy protection in identification in a data communications network includes enrolling for a service on the data communications network, receiving a randomized identifier (ID) in response to the enrolling, storing the randomized ID and using the randomized ID to obtain services on the data communications network. An apparatus for obtaining a service on a data communications network includes an enrollment authority configured to accept an enrollment request. The enrollment authority is further configured to return enrollment results in response to the enrollment request. The enrollment results include user data and the enrollment results may be used obtaining a service from a service provider.

10 Claims, 55 Drawing Sheets

U.S. PATENT DOCUMENTS

| | | | |
|---|---|---|---|
| 6,041,357 A | 3/2000 | Kunzelman et al. | |
| 6,047,268 A | 4/2000 | Bartoli et al. | 705/35 |
| 6,052,690 A | 4/2000 | De Jong | 707/101 |
| 6,088,451 A | 7/2000 | He et al. | 380/25 |
| 6,092,196 A | 7/2000 | Reiche | |
| 6,094,656 A | 7/2000 | De Jong | 707/100 |
| 6,148,404 A | 11/2000 | Yatsukawa | 713/200 |
| 6,212,633 B1 | 4/2001 | Levy et al. | 713/153 |
| 6,212,640 B1 | 4/2001 | Abdelnur et al. | 713/201 |
| 6,226,744 B1 | 5/2001 | Murphy et al. | 713/200 |
| 6,233,341 B1* | 5/2001 | Riggins | 380/277 |
| 6,233,683 B1 | 5/2001 | Chan et al. | 713/172 |
| 6,275,941 B1 | 8/2001 | Saito et al. | |
| 6,286,104 B1 | 9/2001 | Buhle et al. | |
| 6,308,317 B1 | 10/2001 | Wilkinson et al. | 717/5 |
| 6,373,950 B1 | 4/2002 | Rowney | 380/255 |
| 6,421,768 B1 | 7/2002 | Purpura | 711/164 |
| 6,438,550 B1 | 8/2002 | Doyle et al. | 707/9 |
| 6,453,353 B1 | 9/2002 | Win et al. | 709/229 |
| 6,460,140 B1* | 10/2002 | Schoch et al. | 726/22 |
| 6,484,260 B1* | 11/2002 | Scott et al. | 713/186 |
| 6,490,624 B1 | 12/2002 | Sampson et al. | 709/227 |
| 6,496,931 B1 | 12/2002 | Rajchel et al. | 713/168 |
| 6,510,236 B1 | 1/2003 | Crane et al. | |
| 6,557,032 B1 | 4/2003 | Jones et al. | |
| 6,970,904 B1 | 11/2005 | Rode | 709/203 |
| 2001/0011250 A1 | 8/2001 | Paltenghe et al. | 705/41 |
| 2001/0051996 A1 | 12/2001 | Cooper et al. | 709/217 |
| 2001/0054155 A1 | 12/2001 | Hagan et al. | 713/193 |
| 2002/0012433 A1 | 1/2002 | Haverinen et al. | 380/247 |
| 2002/0040936 A1 | 4/2002 | Wentker et al. | |
| 2002/0046353 A1 | 4/2002 | Kishimoto | 713/202 |
| 2002/0059425 A1 | 5/2002 | Belfiore et al. | 709/226 |
| 2002/0067832 A1 | 6/2002 | Jablon | 380/277 |
| 2002/0078102 A1 | 6/2002 | Dutta | 707/526 |
| 2002/0087857 A1* | 7/2002 | Tsao et al. | 713/155 |
| 2002/0091932 A1* | 7/2002 | Shimizu et al. | 713/182 |
| 2002/0099936 A1 | 7/2002 | Kou et al. | 713/151 |
| 2002/0120864 A1 | 8/2002 | Wu et al. | 713/201 |
| 2002/0124116 A1 | 9/2002 | Yaung | 709/313 |
| 2002/0129285 A1 | 9/2002 | Kuwata et al. | 713/202 |
| 2002/0131436 A1 | 9/2002 | Suri | 370/419 |
| 2002/0138728 A1 | 9/2002 | Parfenov et al. | 713/170 |
| 2002/0144119 A1 | 10/2002 | Benantar | 713/171 |
| 2002/0178366 A1 | 11/2002 | Ofir | 713/182 |
| 2002/0184507 A1 | 12/2002 | Makower et al. | 713/182 |
| 2002/0199004 A1 | 12/2002 | Jaye | 709/228 |
| 2003/0005280 A1 | 1/2003 | Bobde et al. | 713/150 |
| 2003/0005290 A1 | 1/2003 | Fishman et al. | 713/156 |
| 2003/0005308 A1 | 1/2003 | Rathbun et al. | 713/185 |
| 2003/0014631 A1 | 1/2003 | Sprague | 713/168 |
| 2003/0028773 A1 | 2/2003 | McGarvey et al. | 713/176 |
| 2003/0039361 A1* | 2/2003 | Hawkes et al. | 380/278 |
| 2003/0041240 A1 | 2/2003 | Roskind et al. | 713/168 |
| 2003/0065947 A1 | 4/2003 | Song et al. | 713/201 |
| 2004/0030887 A1 | 2/2004 | Harrisville-Wolff et al. | 713/155 |
| 2004/0111621 A1 | 6/2004 | Himberger et al. | 713/182 |
| 2004/0117490 A1 | 6/2004 | Peterka et al. | 709/229 |
| 2005/0022001 A1 | 1/2005 | Bahl et al. | 713/200 |
| 2005/0039008 A1 | 2/2005 | Bhatia et al. | 713/170 |
| 2005/0154887 A1 | 7/2005 | Birk et al. | 713/168 |
| 2005/0268241 A1 | 12/2005 | Lerner | 715/749 |
| 2006/0005234 A1 | 1/2006 | Birk et al. | 726/9 |
| 2006/0059546 A1 | 3/2006 | Nester et al. | 726/5 |

FOREIGN PATENT DOCUMENTS

| | | |
|---|---|---|
| EP | 0 855 659 | 7/1998 |
| EP | 1 089 516 | 4/2001 |
| GB | 2 352 850 | 2/2001 |
| WO | 94/30023 | 12/1994 |
| WO | WO97/08868 | 3/1997 |
| WO | 97/45817 | 12/1997 |
| WO | 98/37526 | 2/1998 |
| WO | 98/19237 | 5/1998 |
| WO | 00/00890 | 1/2000 |
| WO | WO 00/42491 | 7/2000 |
| WO | 01/06391 | 1/2001 |

OTHER PUBLICATIONS

R. Rivest, "The MD5 Message-Digest Algorithm", Request for Comments (RFC) 1321 MIT Laboratory for Computer Science and RSA Data Security, Inc., Apr. 1992.

"Secure Hash Standard", Federal Information Processing Standard Publication 180-1, Apr. 17, 1995.

"Smart Card Stage I Description", Version 1.1, CDMA Development Group—Smart Card Team Document, May 22, 1996.

"Digital Cellular Telecommunications Systems (Phase 2+); AT Command Set for GSM Mobile Equipment (ME)", ETSI TS 100 916 V7.4.0, 1998.

"Wireless Identity Module Pert; Security", Version 12, Wireless Application Protocol WAP-260-WIM-20010712-a, Jul. 2001.

"3rd Generation Partnership Project; Technical Specification Group Terminals; USIM and IC Card Requirements (Release 4)", 3GPP TS 21.111 V4.0.0, 2001.

"3rd Generation Partnership Project 2: Removable User Identity Module for Spread Spectrum Systems" 3GPP2 C. S0023-A, Version 1.0, Sep. 13, 2002, pp. 1-1-5-2, A1-A4.

International Search Report, PCT/US 03/24295, International filing date Aug. 1, 2003, date Search Report mailed Feb. 11, 2004.

Thomas Y.C. Woo et al. Authentication for Distributed Systems, IEEE, Jan. 1992, pp. 39-52.

Vipin Samar, "Single Sign-On Using Cookies for Web Applications", 1999, IEEE, pp. 158-163.

Phillip Hallam-Baker, "Security Assertions Markup Language", May 14, 2001, ver. 0.7, pp. 1-24.

International Search Report, PCT/US 02/34709, International filing date Oct. 29, 2002, date Search Report mailed Jul. 7, 2003.

Chan, "Infrastructure of Multi-Application Smart Card", http://home.hkstar.com/~alanchan/papers/multiApplicationsSmartCard/, Jul. 25, 2002.

Chen, Zhiqun, "Java Card™ Technology for Smart Cards", Sun Microsystems, pp. 11-16, Jun. 2000.

Cordonnier, et al., "The concept of suspicion: a new security model for identification management in smart cards", http://inforge.unil.ch/isdss97/papers/48.htm, (1997).

de Kerf, B. et al., "N-Count Fast, Low-Cost Secure Payments using Smart Cards", QC Technology, Version 1.1, Feb. 1997, 8 pages.

"Sun Delivers On Vision to Bring JAVA Technology to the Consumer and Embedded Market", Business Wire, Sep. 28, 1999.

"Sun Microsystems Announces JAVACARD API", Business Wire, Oct. 1996.

Sun Microsystems: "Sun's JAVA Technology Leads Open Worldwide Market for Smart Cards", M2, Presswire, May 1999.

Sun Microsystems, Inc., Java™ Servlet Specification Version 2.3, Sep. 2001, 256 pages.

Sun Microsystems, Inc., Mobile Information Device Profile (JSR-37), Dec. 15, 2000, 284 pages.

Deianov, Borislav, "Authentication—Lamport Hash and Biometrics", printed on Jan. 9, 2002 from http://www.cs.cornell.edu/html/cs513-sp99/NL12.html.

"Sun Leads Authentication Alliance", Sep. 27, 2001, printed from http://www.informationweek.com/story/IWK20010927S0001.

1998 Advanced Card Technology Sourcebook, Copyright 1997; Faulkner & Gray, "Sun Rises Over Smart Cards", pp. 150-154.

Berlind, David, "Who Do You Trust?", Oct. 16, 2001, printed from http://www.zdnet.com/filters/printerfriendly/0,6061,2818131-92,00.html on Jan. 9, 2002.

Dreifus, H., "Smart Cards: A guide to Building and Managing Smart Card Applications; Copyright 1998; Publisher Robert Ipsen; Smart Card Development Skills, Methods, and Tools"; pp. 159-225.

Evers, Joris, "Update: Sun, others form MS Passport alternative", Sun Microsystems, Inc., Sep. 26, 2001, printed from http://www.computerworld.com/cwi/Printer_Friendly_Version/0,1212,NAV47_STO64233-,00 . . . on Jan. 8, 2002.

Fisher, Dennis, "Sun unveils open alternative to Passport", Sep. 26, 2001, printed from http://zdnet.com/filters/printerfriendly/0,6061,2814885-54,00.html on Jan. 9, 2002.

Garvey et al., "Sun Leads Authentication Alliance", Sep. 27, 2001, printed from http://www.informationweek.com/story/IWK20010927S0001 on Jan. 9, 2002.

Goldreich, Oded, "The Foundations of Modern Cryptography", May 2, 1998, Department of Computer Science and Applied Mathematics, Weizmann Institute of Science, Rehovot, Israel, Version Nr. 3.1, pp. 0-41.

Gong et al., "Going Beyond the Sandbox: An Overview of the New Security Architecture in the Java TM Development Kit 1.2", USENIX Symposium on Internet Technologies and Systems-Dec. 8-11, 1997, pp. 103-112.

Haller, et al. "Description of the S/KEY One-Time Password System", printed on Jan. 9, 2002 from http://math.lanl.gov/~aric/Skey/skey.txt, 5 pages.

Hawblitzel, et al., "Implementing Multiple Protection Domains in Java", Technical Report 97-1660, Department of Computer Science, Cornell University.

Heiss, J. et al., "Java Card™ Technology Grows Up Smart", printed on Apr. 22, 2000 at http://java.sun.com/features/1999/01/javacard.html, 5 pages.

Islam, N. et al., "A Flexible Security Model for Using Internet Content", IBM Thomas J. Watson Research Center Papers, 'Online!', Jun. 28, 1997.

"Kerberos: The Network Authentication Protocol", printed from http://web.mit.edu/kerberos/www/ on Jan. 9, 2002.

"Liberty Alliance Project- The Liberty Alliance Project", printed from http://www.projectliberty.org/ on Jan. 8, 2002.

"Liberty Alliance Project-Industry Leaders to Form Network Identity and Liberty Alliance Project", printed from http://www.projectliberty.org/release.html on Jan. 8, 2002.

"Liberty Alliance Project-FAQ", printed from http://projectliberty.org.faq.html on Jan. 8, 2002.

Lindholm, et al., "The JAVA™ Virtual Machine Specification", Sep. 20, 1996.

Naor, et al., "Universal One-Way Hash Functions and their Cryptographic Applications", Mar. 13, 1995, pp. 1-14.

Schneider, Professor Fred B., "Authentication-Lamport hash and biometrics", Mar. 4, 1999, CS 513—System Security, Lecture 12, printed from http://www.cs.cornell.edu/html/cs513-sp99/NL12.html on Jan. 9, 2002.

Sun Microsystems, Inc., "Java Card™ Runtime TM Environment (JRCE) 2.1 Specification, Draft 2", Dec. 14, 1998, US XP002138793 cited in the application p. 6-2 p. 6-10.

Sun Microsystems, Inc., "How to write a Java Card applet: A developer's guide", printed on Apr. 22, 2000 from http://www.javaworld.com.javaworld/jw-07-1999/f_jw-070javacard_p.htlm, 15 pages.

Sun Microsystems, Inc. "Smart Cards: A primer", printed on Apr. 22, 2000 from http://www.javaworld.com/javaworld/jw-12-1997/f_jw-12-javadev$_{13}$ p.html, 13 pages.

Sun Microsystems, Inc., "Sun's Java Card™ Technology Extends its Industry Leadership", printed Apr. 22, 2000 from http://java.sun.com/pr/1999/11/pr991116-01.html 1, 5 pages.

Sun Microsystems, Inc., "Understanding Java Card 2.0", printed on Apr. 22, 2000 from http:www.javaworld.com/javaworld/jw-03-1998/f_jw-03-javadev_p/html, 12 pages.

Sun Microsystems, Inc., "Java Card™ Applet Developer's Guide", Aug. 19, 1998, Revision 1.12.

Sun Microsystems, Inc., "Java Card™ 2.0 Application Programming Interfaces", Oct. 13, 1997, Revision 1.0 Final.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

Sun Microsystems, Inc., "Java Card™ 2.1 Application Programming Interface", Jun. 7, 1999, Final Revision 1.1.

Sun Microsystems, Inc., "Java Card™ 2.1 Runtime Environment (JRCE) Specification", Jun. 7, 1999, Final Revision 1.1.

Sun Microsystems, Inc., "Java Card™ 2.1 Virtual Machine Specification", Jun. 7, 1999, Final Revision 1.1.

Sun Microsystems, Inc., "Release Notes—Java Card™ 2.1 Specifications", Jun. 7, 1999, Final Revision 1.1.

Sun Microsystems, Inc., "The K Virtual Machine (KVM)", White Paper, Jun. 8, 1999.

Thomas, David J., "Smart and Smarter: The Emergence of Java Card™ Technology", printed on Apr. 22, 2000 from http://java/sun.com/features/1998/04/javacard.html, 8 pages.

Wu, Ming-Chuan et al., "Encoded Bitmap Indexing for Data Warehouses", Data Engineering, 1998. Proceedings, 14th International Conference on Feb. 23-27, 1998. pp. 220-230.

Phillip Hallam-Baker, "Security Assertions Markup Language", May 14, 2001, ver. 0.7, pp. 1-24.

International Search Report, PCT/US 03/24227, International filing date Aug. 1, 2003, date Search Report mailed Feb. 9, 2004.

* cited by examiner

ENHANCED PRIVACY PROTECTION IN IDENTIFICATION IN A DATA COMMUNICATIONS NETWORK

CROSS-REFERENCE TO RELATED APPLICATIONS

This application is related to the following:

U.S. patent application Ser. No. 10/243,858, filed Sep. 13, 2002, in the names of inventors Jon Bostrom, Aaron Cooley, and Eduard K. de Jong, entitled "Provisioning for Digital Content Access Control", commonly assigned herewith;

U.S. patent application Ser. No. 10/243,287, filed Sep. 13, 2002, in the names of inventors Jon Bostrom, Aaron Cooley, and Eduard K. de Jong, entitled "Provisioning for Digital Content Access Control", commonly assigned herewith;

U.S. patent application Ser. No. 10/243,474, filed Sep. 13, 2002, in the names of inventors Jon Bostrom, Aaron Cooley, and Eduard K. de Jong, entitled "Repository for Digital Content Access Control", commonly assigned herewith;

U.S. patent application Ser. No. 10/243,218, filed Sep. 13, 2002, in the names of inventors Jon Bostrom, Aaron Cooley, and Eduard K. de Jong, entitled "Synchronizing for Digital Content Access Control", commonly assigned herewith;

U.S. patent application Ser. No. 10/243,355, filed Sep. 13, 2002, in the names of inventors Jon Bostrom, Aaron Cooley, and Eduard K. de Jong, entitled "Accessing for Digital Content Access Control", commonly assigned herewith;

U.S. patent application Ser. No. 10/687,415, filed Oct. 15, 2003, in the name of inventor Eduard K. de Jong, entitled "Rights Locker For Digital Content Access Control", commonly assigned herewith;

U.S. patent application Ser. No. 10/687,217, filed Oct. 15, 2003, in the name of inventor Eduard K. de Jong, entitled "Accessing In A Rights Locker System For Digital Content Access Control", commonly assigned herewith;

U.S. patent application Ser. No. 10/687,459, filed Oct. 15, 2003, in the name of inventor Eduard K. de Jong, entitled "Embedded Content Requests In A Rights Locker System For Digital Content Access Control", commonly assigned herewith;

U.S. patent application Ser. No. 10/687,488, filed Oct. 15, 2003, in the name of inventor Eduard K. de Jong, entitled "Rights Maintenance In A Rights Locker System For Digital Content Access Control", commonly assigned herewith;

U.S. patent application Ser. No. 10/669,160, filed Sep. 22, 2003, in the name of inventor Eduard K. de Jong, entitled "Controlled Delivery Of Digital Content In A System For Digital Content Access Control", commonly assigned herewith;

U.S. patent application Ser. No. 10/668,867, filed Sep. 22, 2003, in the name of inventor Eduard K. de Jong, entitled "Accessing For Controlled Delivery Of Digital Content In A System For Digital Content Access Control", commonly assigned herewith;

U.S. patent application Ser. No. 10/014,823, filed Oct. 29, 2001, in the names of inventors Eduard K. de Jong, Albert Y. Leung, and Moshe Levy, entitled "Enhanced Quality of Identification in a Data Communications Network", commonly assigned herewith;

U.S. patent application Ser. No. 10/014,893, filed Oct. 29, 2001, in the names of inventors Eduard K. de Jong, Albert Y. Leung, and Moshe Levy, entitled "Identification And Privacy In The World Wide Web", commonly assigned herewith;

U.S. patent application Ser. No. 10/014,934, filed Oct. 29, 2001, in the names of inventors Eduard K. de Jong, Albert Y. Leung, and Moshe Levy, entitled "Portability and Privacy with Data Communications Network Browsing", commonly assigned herewith;

U.S. patent application Ser. No. 10/033,373, filed Oct. 29, 2001, in the names of inventors Eduard K. de Jong, Albert Y. Leung, and Moshe Levy, entitled "Managing Identification in a Data Communications Network", commonly assigned herewith; and U.S. patent application Ser. No. 10/040,293, filed Oct. 29, 2001, in the names of inventors Eduard K. de Jong, Albert Y. Leung, and Moshe Levy, entitled "Privacy and Idenfication in a Data Communications Network", commonly assigned herewith.

FIELD OF THE INVENTION

The present invention relates to the field of computer science. More particularly, the present invention relates to a system and method for managing identification in the World Wide Web.

BACKGROUND OF THE INVENTION

The advent of the World Wide Web (WWW) has made much more information available for use by anyone with a computer having an Internet connection. Unfortunately, current methods make it relatively easy to identify a particular user with specific data about the user, thus raising privacy concerns.

One problem with identification and privacy on the Web concerns how Web browsers obtain user data. Typically, Web browsers obtain user data from one or more cookies stored on a local hard disk. The cookies may contain sensitive user information. FIG. 1A is a flow diagram that illustrates a typical method for obtaining user information from a cookie. At 100, a Web browser accesses a Web site that uses a cookie. At 105, a determination is made regarding whether a cookie is present on the user computer's local disk. If a cookie is not present, at 110 the browser generates a cookie with the Web server Universal Resource Locator (URL) and Web server-provided user data. If a cookie is present, at 115 the browser uses the cookie on the user computer's local disk.

FIG. 1B is a block diagram that illustrates a cookie. A cookie 120 includes a server identifier and user data. The user data contains information about a user, such as the user's name and address.

Unfortunately, the privacy afforded by this approach is low because it is relatively easy to determine the identity of the user associated with the user data merely by examining the cookie contents.

Another problem with identification and privacy on the Web concerns user authentication. User authentication on the Web is typically accomplished using a username and password. FIG. 2 is a flow diagram that illustrates a typical method for performing user authentication using a username and a password. At 200, a user visits a service provider Web site. At 205, the service provider Web site authenticates the user based on a static username and password. This form of user authentication typically includes filling out a form for data that is deemed relevant for the services being rendered on the Web. At 210, a determination is made regarding whether the user authentication was successful. If the user authentication was unsuccessful, service is refused at 215. If the user authentication was successful, service is provided at 220. The privacy protection and security afforded by this approach are low.

Furthermore, the accuracy and appropriateness of the data gathered on the forms is not guaranteed. For example, if the service provider form completed by the user prompts for a drivers license number, the service provider typically does not determine whether the number entered by the user is appropriate for the service request (e.g. entering a fishing license number when prompted for a drivers license is inappropriate). And the service provider typically does not determine whether the entered drivers license actually belongs to the person who entered the number.

FIG. 3 illustrates how such user authentication problems are addressed using a "bricks and mortar" approach. FIG. 3 is a flow diagram that illustrates a typical method for paying for goods and services in person. At 300, a purchaser writes a check to pay for goods or services. At 305, a vendor requires credentials that will be appropriate for the method of user authentication needed to accept payment. Examples of such credentials include a driver's license and an ATM card. The user authentication provides a level of trust regarding the identity of the purchaser. Different levels of user authentication are afforded different types of transactions. For example, if the purchaser attempts to buy a relatively inexpensive item, the vendor might accept a check for payment without user authentication. If the purchaser attempts to buy a moderately priced item, the vendor might require one form of identification such as a driver's license. If the purchaser attempts to buy a relatively expensive item, the vendor might require additional forms of identification. Once the purchaser provides the required forms of user authentication (310), the vendor uses the required forms of user authentication to verify the truthfulness, accuracy and completeness of the credentials (315). If the vendor cannot satisfactorily verify the credentials, the transaction is rejected at 325. If the credentials are satisfactorily verified, the sale is completed at 330.

FIG. 4 is a block diagram that illustrates maintaining user-specific information on the World Wide Web. Each Internet user 400-425 accesses Web sites of service providers via a service provider Web server (435-460). Each Web server 435-460 authenticates the user by prompting for a username and a password. Each Web server 435-460 also maintains a separate set of user data for each (username, password) combination. The user data contains information about each user. For example, one Web site may store the zip code associated with the username so that the current weather at that zip code is presented whenever the user logs in to the Web site. Another Web site might maintain a list of items purchased at the Web site, so that information about similar products can be displayed when the user visits the site again.

Maintaining separate user authentication schemes for each Web site means that users must remember their username and password for each site. Oftentimes, an individual will use the same username and password for each Web site. Thus, once the users' username and password for one web site are known, the same username and password can be used to access information for the same user at another Web site. Moreover, individuals often base their username and password on personal information such as social security number or birthday. This makes passwords vulnerable to attack by hackers.

FIG. 5 is a block diagram that illustrates a centralized user authentication system. At 540 a user accesses a server access portal 505. At 545, the service access portal 505 collects user authentication data. If the user has already enrolled, the user is prompted for a username and password and ticket generator 520 interfaces with a user authentication database 524 to authenticate the user based on the username and password. Ticket generator 520 may be a Kerberos™ ticket generator. Ticket generator 520 interfaces with the user authentication database 525 to perform user authentication and to generate a user authentication token at 565. If the user has not yet enrolled, the user is prompted for user data and a chosen password at 545 and this information is sent to a user data generator 530. User data generator 530 interfaces with a user database 535 to store the user data. User data generator 530 also interfaces with the user authentication database 525 to provide user authentication information for the user. At 560, user data generator 530 interfaces with ticket generator 520 to generate a user authentication token. At 565 the user authentication token is returned to the service provider 505.

At 570, the user authentication token is returned to the user 500. The service provider 505 uses the user authentication token as a cookie or session identifier in subsequent communications (575, 580) between the user and the service provider. These communications may include requests 585 for user data stored in user database 535. Such requests 585 are received by user data retriever 515. Data retriever 515 retrieves the user data from user database 535 and returns the user data at 590.

Unfortunately, the service provider using this mechanism is a single point of control. A user has no control over where and when user data is obtained and where and when the service provider uses the user data. All user data is in the open once the user has identified himself.

FIG. 6 is a block diagram that illustrates a mechanism that provides a single logon for access to multiple Web sites. Global authenticator 305 authenticates a user 600-625 by prompting for a (username, password) combination. Once the user 600-625 is authenticated, the user can access each member Web site 635-660 without having to sign on to each particular Web site 635-660. Global authenticator 630 also maintains a profile for each username in global customer database 665.

As shown in FIG. 6, a user may visit multiple member Web sites once logged in via global authenticator 630. Thus, global customer database 665 must include information for a user that is relevant to all sites visited. For example, if a user visits a financial Web site and a medical plan Web site, global customer database 665 will include medical information as well as financial information. Moreover, global authenticator 630 may be configured to monitor or track an individual's Web activity such as the Web sites visited. Commingling potentially inappropriate data and the ability to monitor Web activity raise privacy concerns.

An additional problem with the using the World Wide Web is the lack of ways to create a trail of what a service provider accepts as valid user authentication. A user either logs in using a username and password that any person or program could have entered and is granted access to multiple services indefinitely, or the user enters the wrong username and password and gets nothing.

Accordingly, what is needed is a solution that protects privacy in a system where information about a user is required to deliver services. A further need exists for such a solution that enables service providers to exchange information about a person without revealing inappropriate or unnecessary information. A further need exists for such a solution that manages user transactions on an open network such as the Internet while maintaining privacy. A further need exists for such a solution that manages trust in user data and creates a trail of assessments of the trust and the process of how the assessments were made. A further need exists for such a solution that protects user data stored in cookies.

BRIEF DESCRIPTION OF THE INVENTION

A method for managing identification in a data communications network includes receiving a user-controlled secure storage device and enrolling the user with an authority network site. The enrolling includes providing information requested by the authority network site. The method also includes receiving user data in response to the enrolling, storing the user data in the user-controlled secure storage device, enabling the user-controlled secure storage device to release the user data and using the user data at a service provider network site to obtain a service.

According to another aspect, a method for enhanced privacy protection in identification in a data communications network includes enrolling for a service on the data communications network, receiving a randomized identifier (ID) in response to the enrolling, storing the randomized ID and using the randomized ID to obtain services on the data communications network. An apparatus for obtaining a service on a data communications network includes an enrollment authority configured to accept an enrollment request. The enrollment authority is further configured to return enrollment results in response to the enrollment request. The enrollment results include user data and the enrollment results may be used obtaining a service from a service provider.

According to another aspect, a method for enhanced quality of identification in a data communications network includes obtaining a user identifier that includes an identification server ID and an identification randomized ID. The identification server ID identifies an identification server peer group. The identification server peer group includes at least one server that maintains a mapping between an identification randomized ID and a user authentication peer group capable of authenticating a user associated with a particular randomized ID, and a mapping between the identification randomized ID and user information. The method also includes requesting authorization of the user by presenting the user identifier to a corresponding identification server peer group. Each server in the identification server peer group is configured to search for one or more matching entries including the randomized ID.

According to another aspect, a method for controlling user access to distributed resources on a data communications network includes receiving a resource request. The request includes a rights key credential that includes at least one key to provide access to a resource on the data communications network. The rights key credential also includes a resource identifier that includes a resource server peer group ID and a randomized ID. The resource server peer group ID identifies a resource server peer group. The resource server peer group includes at least one server that maintains a mapping between a randomized ID and the at least one key. The method also includes providing access to the resource using the at least one key.

According to another aspect, a method for browsing a data communications network includes requesting user data from a user-controlled secure device if a network site that requires the user data is accessed. The request is performed prior to requesting the user data from another device. The method also includes sending the user data to a network server associated with the network site if the user data is received from the user-controlled secure device. According to another aspect, a method for servicing data communications network information units includes receiving user data associated with a network site, using the user data if the user data includes static user data and reconstructing the user data before using the user data if the user data includes dynamic user data.

According to another aspect, an apparatus for browsing a data communications network includes a network browser configured to request user data from a user-controlled secure device if a network site that requires the user data is accessed. The request occurs prior to requesting the user data from another device. The network browser is further configured to send the user data to a network server associated with the network site if the user data is received from the user-controlled secure device.

According to another aspect, an apparatus for browsing a data communications network includes a smart card configured to receive a request for user data. The smart card is further configured to return the user data if the user data is found and if returning user data for the request is enabled and if the user data includes static user data. The smart card is further configured to reconfigure the user data if the user data is found and if returning user data for the request is enabled and if the user data includes dynamic user data.

According to another aspect, an apparatus for servicing data communications network information units includes a network server configured to receive user data associated with a network site. The network server is further configured to use the user data if the user data includes static user data. The network server is further configured to reconstruct the user data before using the user data if the user data includes dynamic user data.

According to another aspect, a method for obtaining a service on a data communications network, the method includes enrolling with an authority and using the enrollment results to obtain a service from a service provider. The enrolling creates enrollment results that include user data. The service provider is capable of communicating with the authority to verify the enrollment results.

According to another aspect, an apparatus for obtaining a service on a data communications network includes an enrollment authority configured to accept an enrollment request. The enrollment authority is further configured to return enrollment results in response to the enrollment request. The enrollment results include user data, for use in obtaining a service from a service provider. According to another aspect, an apparatus for obtaining a service on a data communications network, the apparatus includes a service provider configured to accept a service request and enrollment results obtained from an enrollment authority. The service provider is capable of communicating with the authority to verify the enrollment results and the service provider is configured to provide the service based upon the enrollment results and a response from the enrollment authority.

According to another aspect, a method for protecting privacy on a data communications network includes receiving a user identifier and specific user data associated with the user identifier. The specific user data includes data about a network user. The method also includes creating generalized user data based on the specific user data and associating the generalized user data with the user identifier. The method also includes returning the user identifier and the generalized user data. According to another aspect, a method for protecting privacy on a data communications network, the method includes storing user logon information for at least one service provider server on a user-controlled secure device. The at least one service provider server includes at least one network server that is capable of providing a service to a user. The method also includes logging on to the device, providing access to the at least one service provider server.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF A PREFERRED EMBODIMENT

Figure 1A:
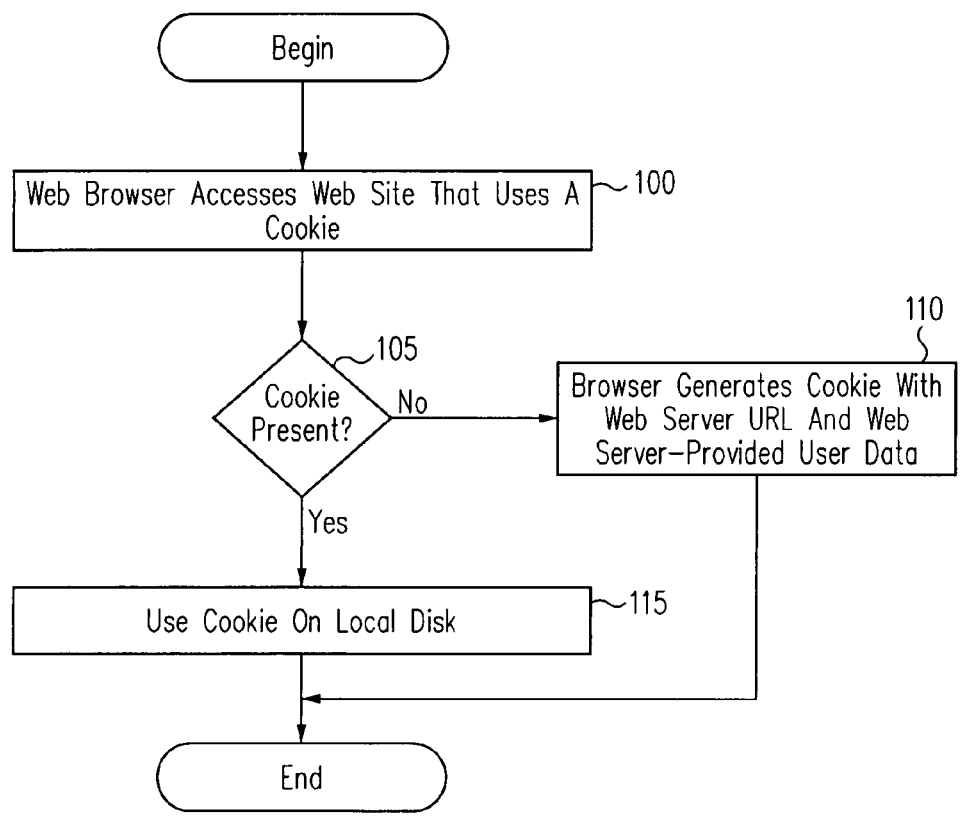
FIG. 1A is a flow diagram that illustrates a typical method for obtaining user information from a cookie.
Figure 1B:
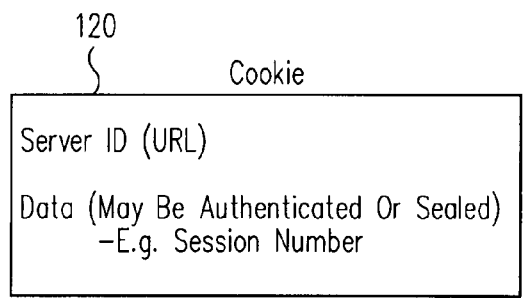
FIG. 1B is a block diagram that illustrates a cookie.
Figure 2:
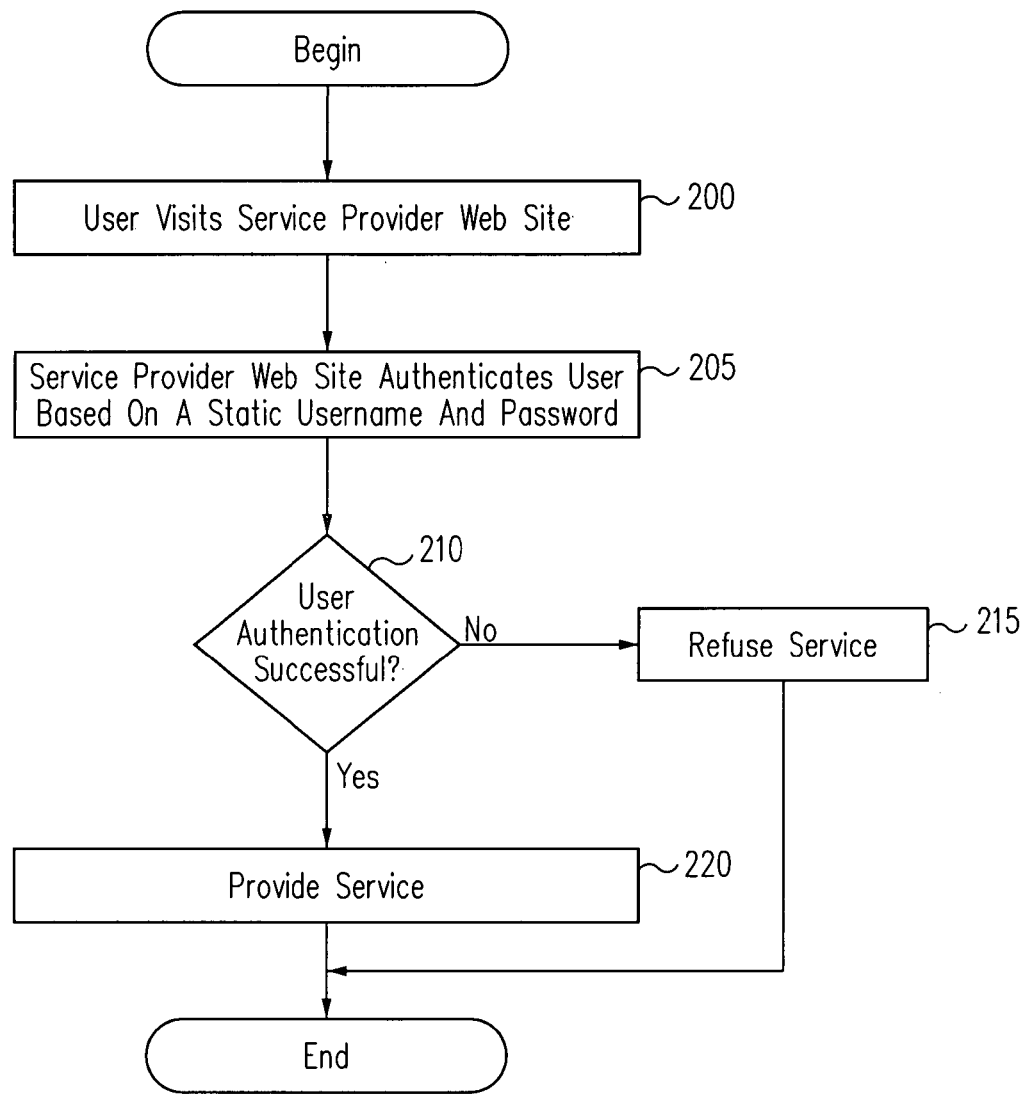
FIG. 2 is a flow diagram that illustrates a typical method for performing user authentication using a username and a password.
Figure 3:
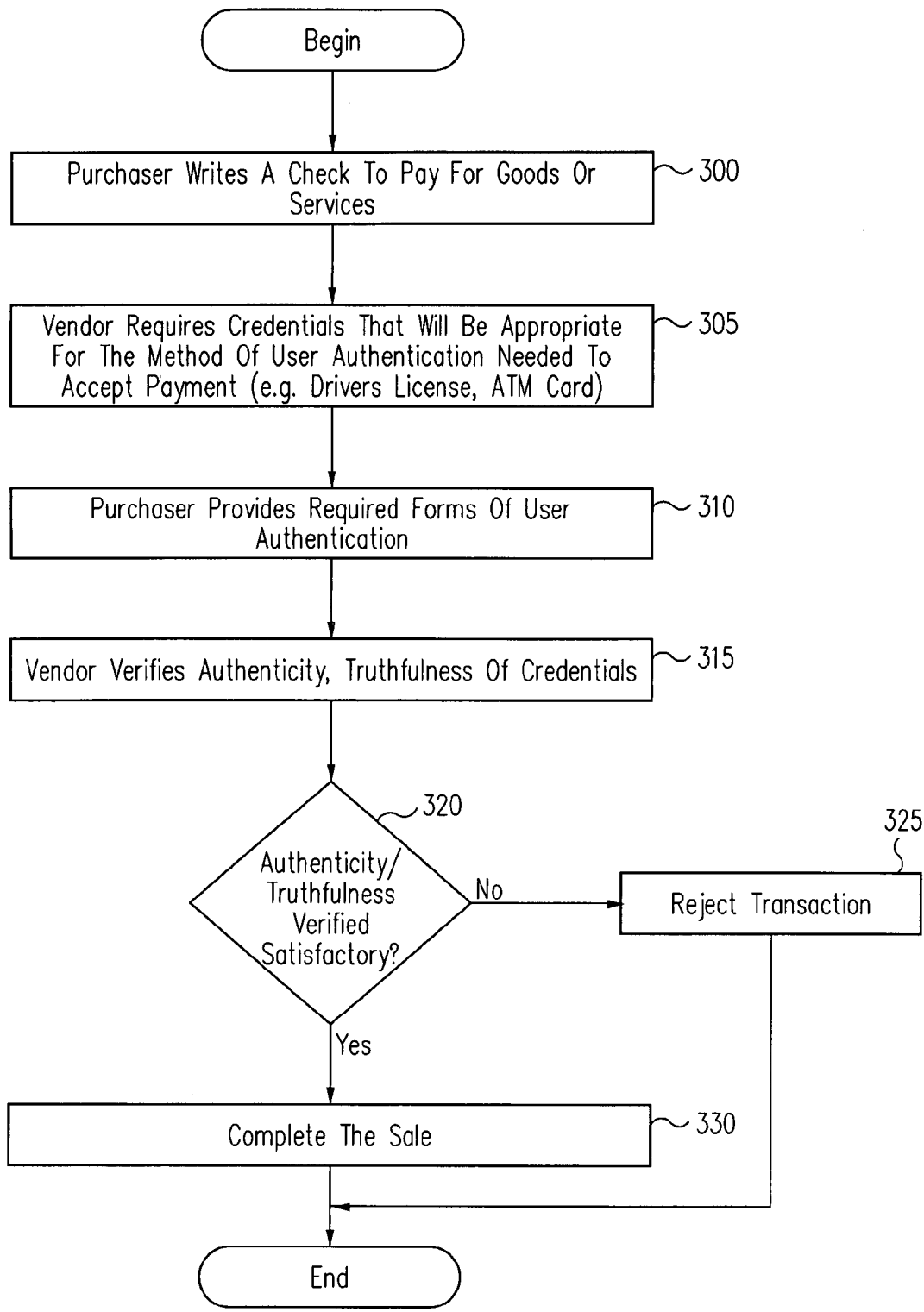
FIG. 3 is a flow diagram that illustrates a typical method for paying for goods and services in person.
Figure 4:
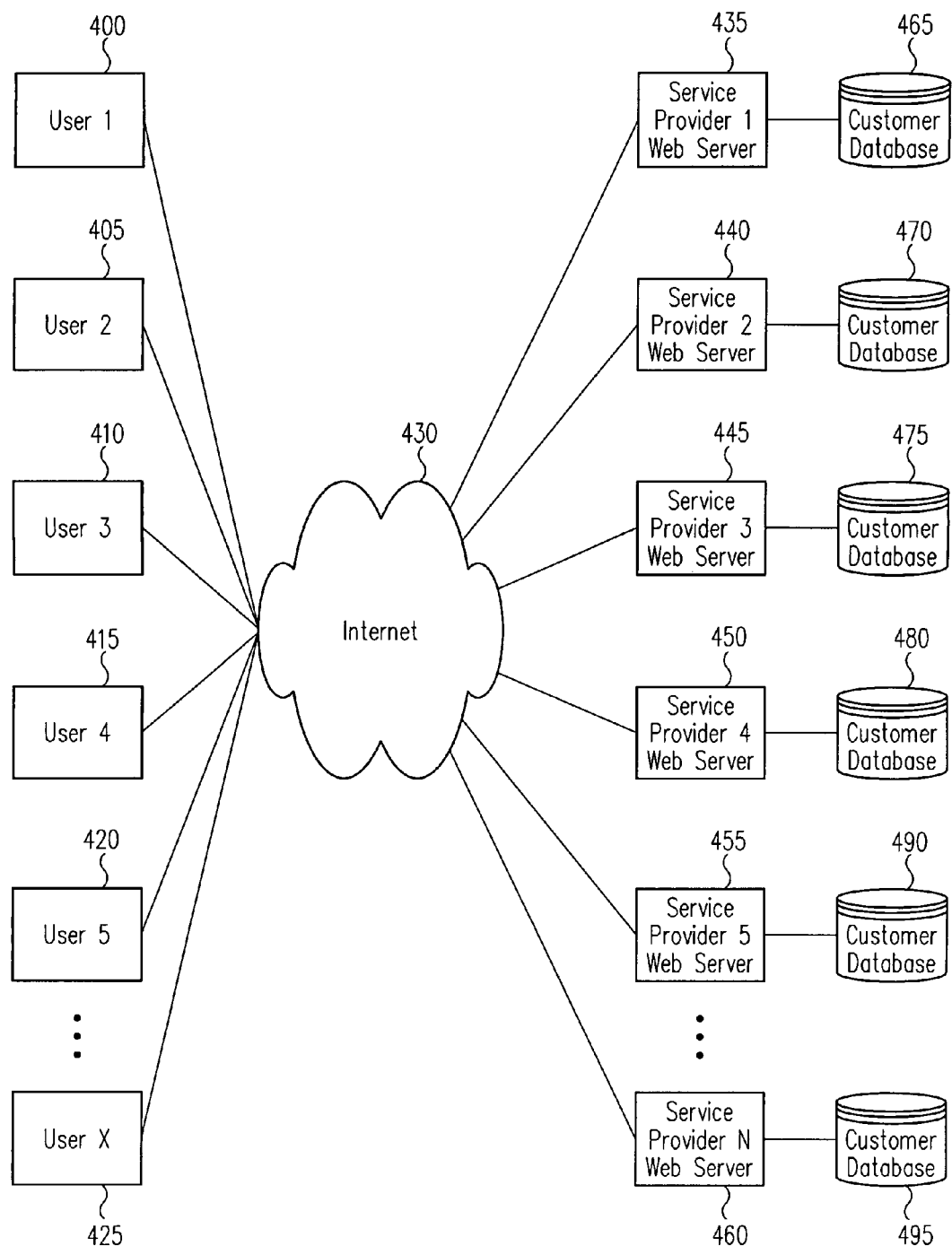
FIG. 4 is a block diagram that illustrates maintaining user-specific information on the World Wide Web.
Figure 5:
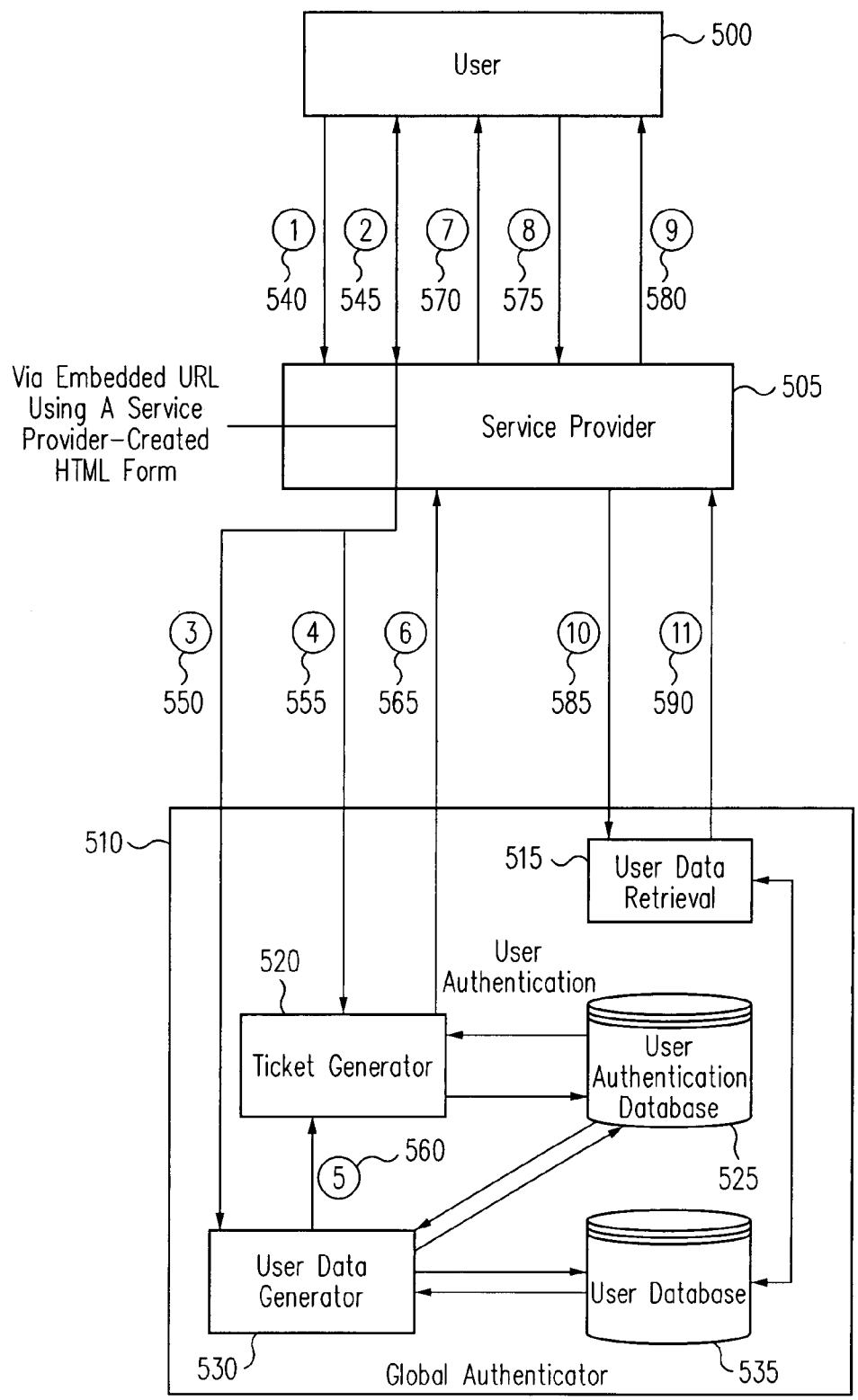
FIG. 5 is a block diagram that illustrates a centralized user authentication system.
Figure 6:
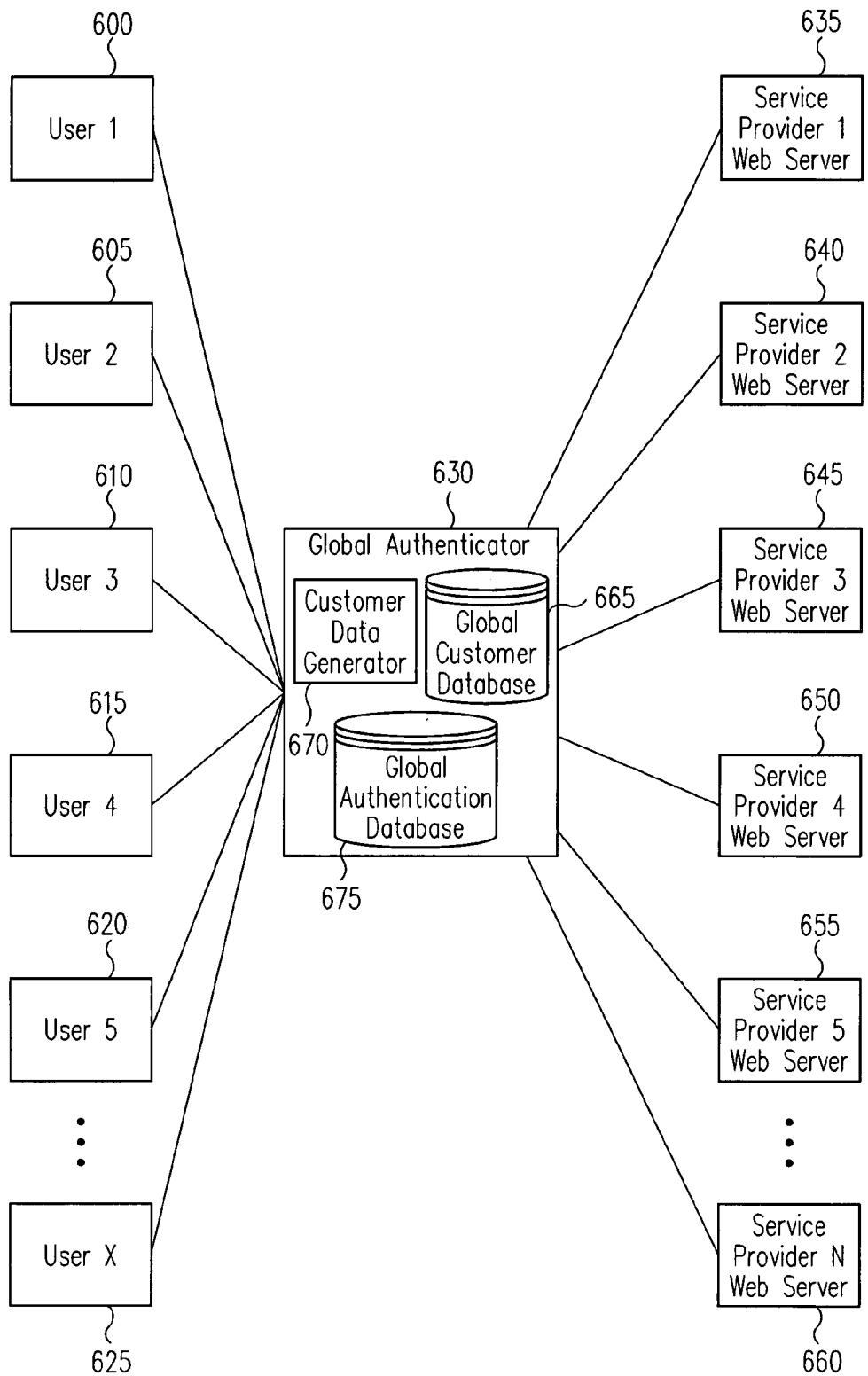
FIG. 6 is a block diagram that illustrates a mechanism that provides a single logon for access to multiple Web sites.

Embodiments of the present invention are described herein in the context of a method and apparatus for identification and privacy in the World Wide Web. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

Embodiments of the present invention are described with reference to the World Wide Web. Any data communications network may be configured like the World Wide Web.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 7:
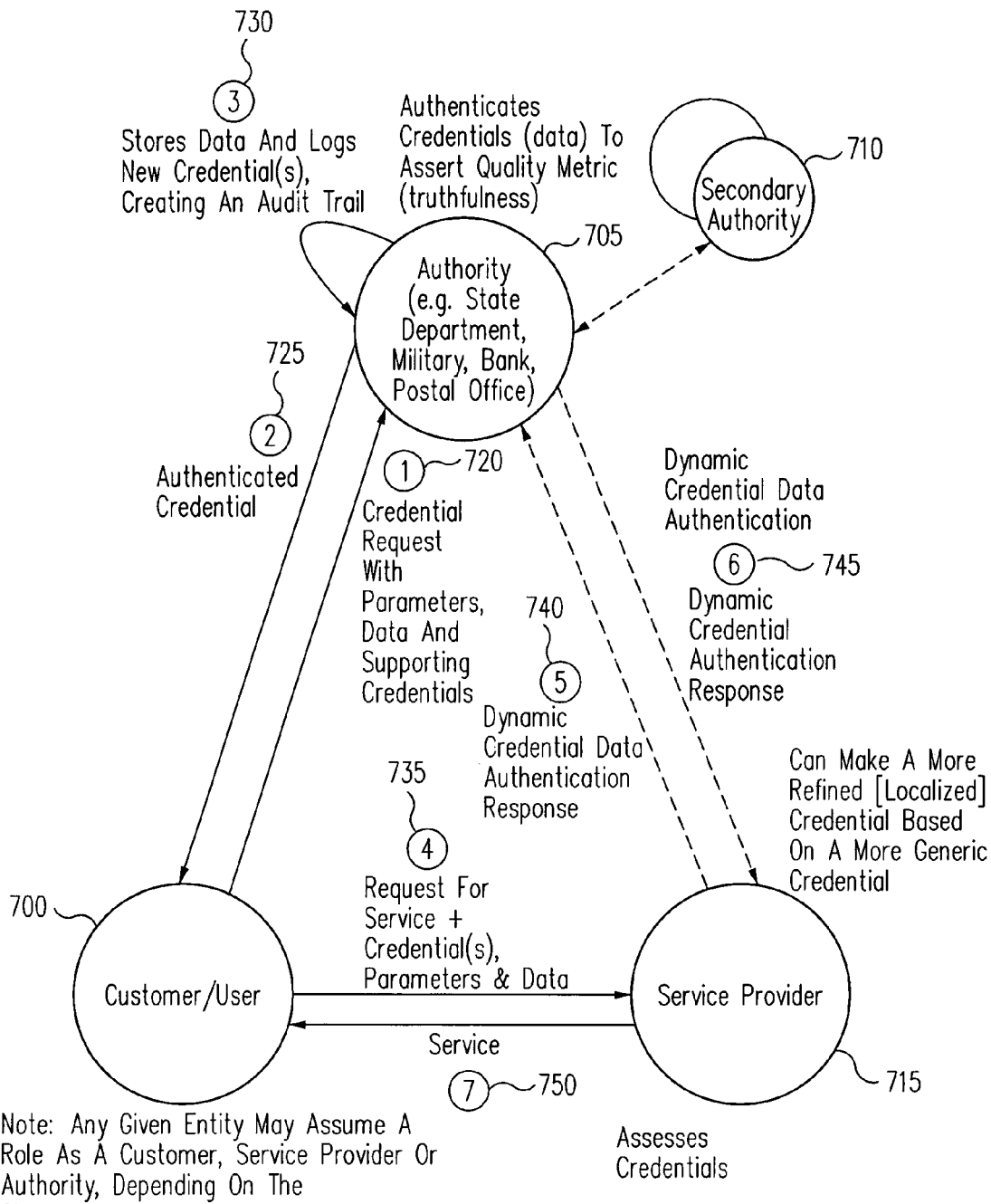
FIG. 7 is a block diagram that illustrates conducting secure transactions on the World Wide Web using user data authenticated by an authority in accordance with one embodiment of the present invention.

Turning now to FIG. 7, a block diagram that illustrates conducting secure transactions on the World Wide Web using user data authenticated by an authority in accordance with one embodiment of the present invention is presented. Three entities are represented: a customer or user 700, an authority 705 and a service provider 715. User 700 represents an entity that requests and receives a service from a service provider. Service provider 715 represents an entity that provides a service. Authority 705 represents an entity that authenticates credentials or other user data to assert an indication of a quality metric or level of truthfulness, accuracy and completeness of the credential or other user data.

The issuer of a credential performs data authentication of the credential. A credential is a certificate presented to a service provider as an indication of what the presenter is entitled, along with a service request.

According to embodiments of the present invention, a user first enrolls with an authority and receives an authenticated credential in return. The user then presents the credential and a service request to a service provider. Accepting a credential is not unconditional. The service provider examines the request and the credential and either denies service or grants the service. In more detail, at 720 a user 700 communicates with an authority 705 to issue a credential request. The request may include associated parameters and data. The associated parameters and data may relate to, by way of example, the identity of a user authentication server 710 capable of performing at least part of the user authentication required for issuance of the requested credential. The request may also include supporting credentials. The authority 705 authenticates the credential or credentials to assert an indication of a quality metric or indication of truthfulness, accuracy and completeness of the credential or credentials. The authority 705 may cooperate with a secondary authority 710 in performing user authentication. At 725, the authority returns an authenticated credential to the user 700.

Using a credential to obtain a service begins with a service request. As indicated by reference numeral 735, the user 700 communicates with a service provider 715 to issue a service request. The request may include credentials and associated credential parameters and data. The service provider 715 assesses the credential request and supporting information. The service provider 715 may cooperate with an authority 705 to perform dynamic credential authentication (740, 745). The authority 705 may also cooperate with a secondary authority 710 in performing user authentication. At 750, the service provider provides the requested service.

Figure 8:
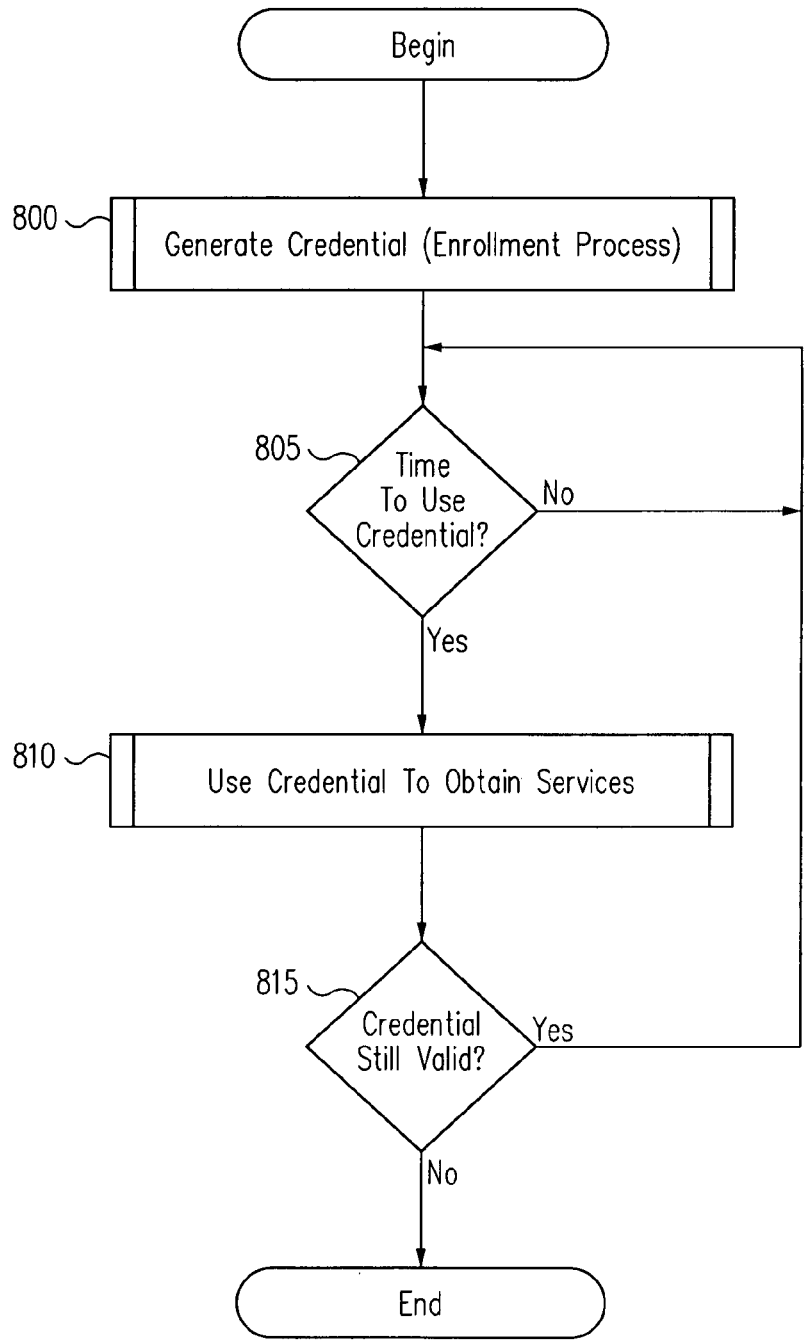
FIG. 8 is a flow diagram that illustrates a method for conducting secure transactions on the World Wide Web using user data authenticated by an authority in accordance with one embodiment of the present invention.

Turning now to FIG. 8, a flow diagram that illustrates a method for conducting secure transactions on the World Wide Web using user data authenticated by an authority in accordance with one embodiment of the present invention is presented. At 800 a credential is generated. The credential is created by presenting a credential request and supporting data to an authority. The supporting data may include credentials created earlier by the same authority, or by another authority. The credentials may be non-digital as well. For example, a driver's license or birth certificate may be used. Depending upon the type of authentication required, the credentials may be all digital, all non-digital or a combination of digital and non-digital credentials.

According to one embodiment of the present invention, a credential may be created with limitations placed on its use. For example, the credential may be created for one-time use, for use a limited number of times or for use at a specific location.

According to another embodiment of the present invention, the credential may be stored on a Web server, smart card, personal digital assistant (PDA), cell phone or the like.

Referring again to FIG. 8, at 805 a determination is made regarding whether it is time to use the credential. An example of a time to use the credential is when the credential is needed to obtain a service. Once it is time to use the credential, at 810 the credential or a reference to the credential is presented to a service provider, which can then render a service. The service may be specified directly or indirectly by information contained in the credential. The service provider may accept the credential data after performing a cryptographical data authentication. At 815, a determination is made regarding whether the credential is still valid. This process of using a credential to obtain a service continues until the credential is no longer valid.

Figure 9A:
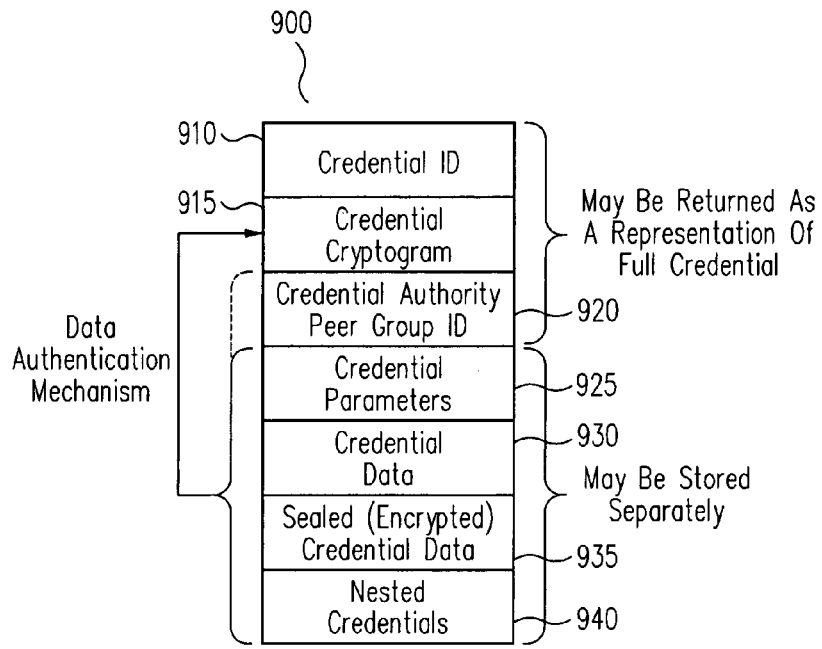
FIG. 9A is a block diagram that illustrates a credential in accordance with one embodiment of the present invention.
Figure 9B:
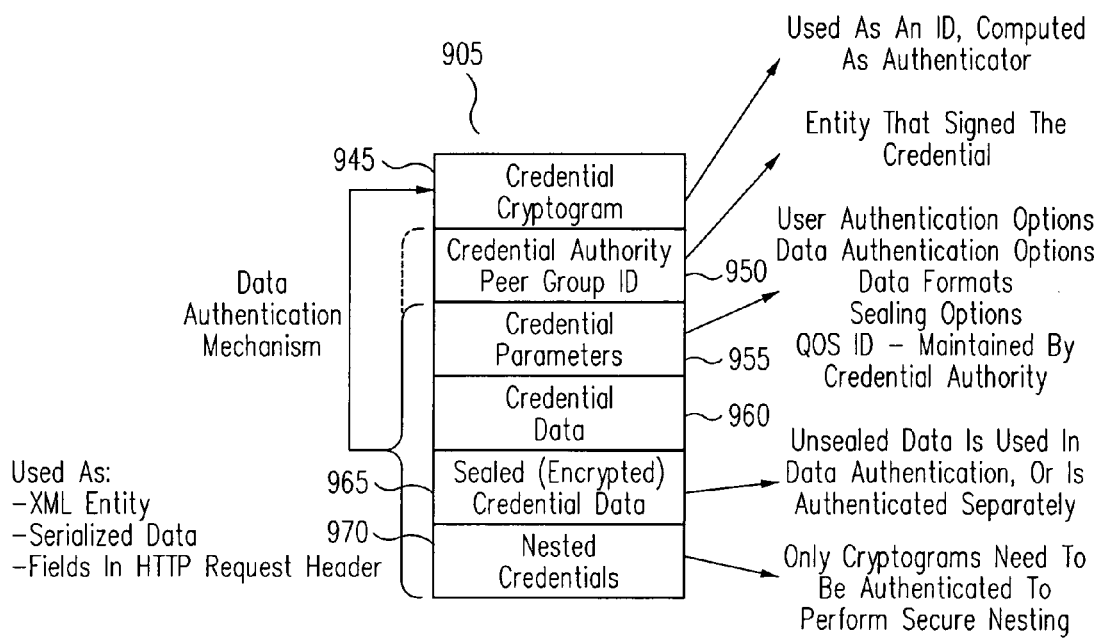
FIG. 9B is a block diagram that illustrates a credential that uses a cryptogram as an identifier in accordance with one embodiment of the present invention.

FIGS. 9A and 9B illustrate two credential data formats in accordance with embodiments of the present invention. Referring to FIG. 9A, credential 900 includes a credential identifier 910, a credential cryptogram 915, a credential authority peer group ID 920, credential parameters 925, credential data 930, sealed credential data 935 and nested credentials 940. According to one embodiment of the present invention, credential identifier 910 comprises a unique identifier assigned to a user. According to one embodiment of the present invention, credential identifier 910 comprises a randomized identifier assigned to the user.

Credential cryptogram 915 is used to authenticate credential items 925, 930, 935 and 940. Preferably, credential cryptogram 915 is also used to authenticate credential authority peer group ID 920. This data authentication may use a key and an algorithm as specified by the credential authority or authorities. The keys and the data authentication algorithm may be specified as a credential parameter 925.

According to one embodiment of the present invention, the entire credential cryptogram (915, 945) is used as the credential ID. According to other embodiments of the present invention, a subset of the cryptogram is used as the credential ID.

Credential authority peer group ID 920 identifies the entity that provided data authentication for the credential 900. The entity that provided data authentication may comprise a single server. Alternatively, the entity that provided data authentication may comprise multiple credential authority servers, one of which maintains credential data corresponding to the credential ID. Credential authority servers comprising a particular credential authority peer group cooperate to locate credential data corresponding to the credential ID.

Credential parameters 925 refer to named parameter data. Credential parameters may include, by way of example, data authentication mechanisms or user authentication mechanisms. Credential parameters may also specify the identity of a user authentication server capable of performing at least part of the user authentication required for issuance of the requested credential. The credential parameters 925 may also specify a credential data format and mechanisms used to seal or unseal credential data. The credential parameters 925 may also include a quality of service (QoS) identifier. The QoS identifier indicates the verification performed by issuer of the credential during user enrollment. The verification may include user authentication. The verification may also include assessing the quality of any supporting credentials. The verification may also include assessing the truthfulness, accuracy and completeness of the credential data.

Credential data 930 comprise data associated with the credential. Sealed credential data 935 comprise encrypted credential data. Nested credentials 940 comprise one or more additional credentials. Note that only credential cryptogram 915 must be authenticated to perform secure nesting.

The combination of the credential ID 910, the credential cryptogram 915 and the credential authority peer group ID 920 may be used to represent the entire credential 900. The rest of the credential (reference numerals 925, 930, 935 and 940) may be stored separately. For example, the credential ID 910, credential cryptogram 915 and credential authority peer group ID 920 may be stored in a secure device such as a smart card, while the rest of the credential (reference numerals 925, 930, 935 and 940) is stored on a Web server.

FIG. 9B is similar to FIG. 9A except that FIG. 9A includes a separate credential ID 910, whereas the credential illustrated by FIG. 9B uses the credential cryptogram 945 as an identifier.

Credential data elements 910-940 may be stored together. Alternatively, some credential elements 910-920 may be used to represent a full credential and other credential elements 925-940 may be stored separately.

Turning now to FIG. 9B, a block diagram that illustrates a credential that uses a cryptogram as an identifier in accordance with one embodiment of the present invention is presented. FIG. 9B is similar to FIG. 9A except that credential cryptogram 945 in FIG. 9B is also used as an identifier.

Figure 10:
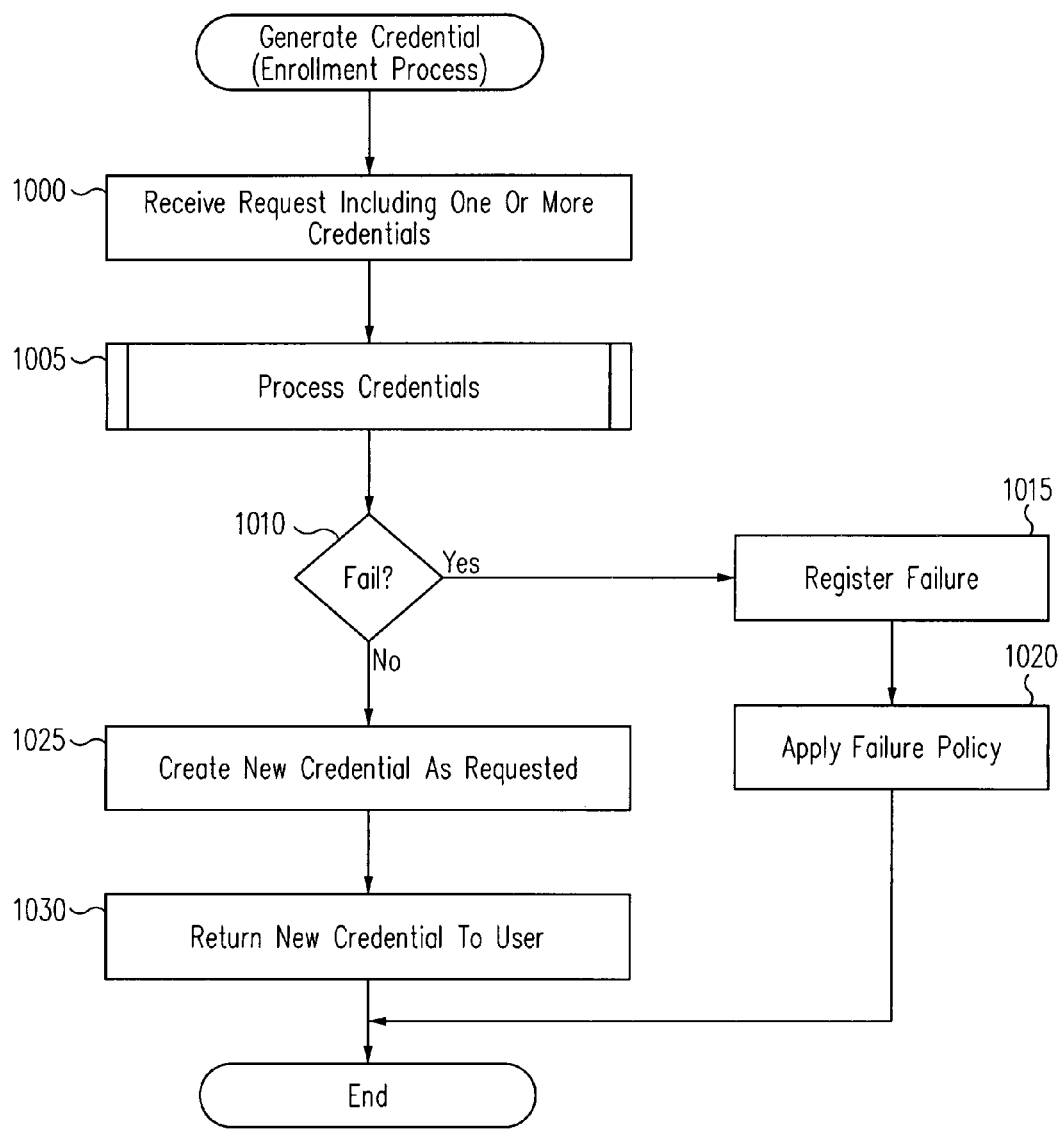
FIG. 10 is a flow diagram that illustrates a method for generating a credential in accordance with one embodiment of the present invention.

Turning now to FIG. 10, a flow diagram that illustrates a method for generating a credential in accordance with one embodiment of the present invention is presented. FIG. 10 provides more detail for reference numeral 800 of FIG. 8. At 1000, a credential authority receives a credential request including one or more supporting credentials. The supporting credentials may include credentials created previously by the credential authority. The supporting credentials may also include credentials created previously by another credential authority. At 1005, the credentials are processed. At 1010, a determination is made regarding whether the credentials were processed successfully. If the credentials were not processed successfully, a failure is registered at 1015 and a failure policy is applied at 1020. The failure policy specifies actions to be performed when a failure is detected. An exemplary failure policy performs a user notification function when the error is detected.

Still referring to FIG. 10, if the credentials were processed successfully, a new credential is created at 1025 and at 1030 the credential is returned to the user that requested it. According to one embodiment of the present invention, the entire credential is returned to the user. According to another embodiment of the present invention, unique identifying information of the credential is returned and the rest of the credential is stored separately. For example, an embodiment using the credential format of FIG. 9A would return the credential ID 910, the credential cryptogram 915 and the credential authority peer group ID 920. An embodiment using the credential format of FIG. 9B would return the credential cryptogram 945 and the credential authority peer group ID 950.

Figure 11:
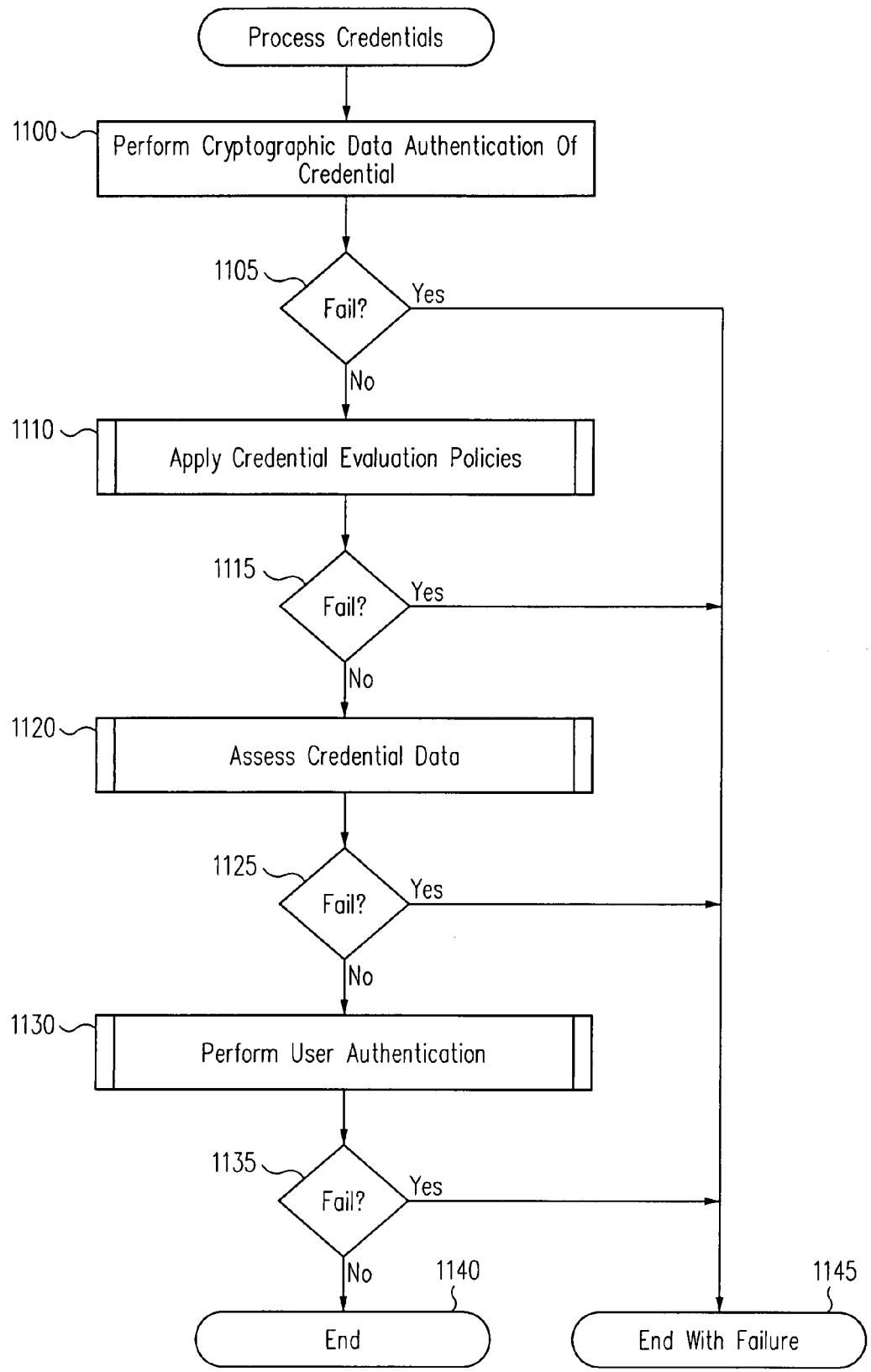
FIG. 11 is a flow diagram that illustrates a method for processing a credential in accordance with one embodiment of the present invention.

Turning now to FIG. 11, a flow diagram that illustrates a method for processing a credential in accordance with one embodiment of the present invention is presented. FIG. 11 provides more detail for reference numeral 1005 of FIG. 10. At 1100, cryptographic data authentication of the credential is performed. Using the credential format of FIG. 9A as an example, credential cryptogram 915 is used to authenticate credential fields 925, 930, 935 and 940. Alternatively, a particular data authentication mechanism may also authenticate the credential peer group ID 920. Using the credential format of FIG. 9B as an example, credential cryptogram 945 is used to authenticate credential fields 955, 960, 965 and 970. Again, a particular data authentication mechanism may also authenticate the credential authority peer group ID 950. At 1105, a determination is made regarding whether the credential cryptogram authenticates the credential data. If the credential cryptogram does not authenticate the credential data, the process ends with a failure indication at 1145.

Referring again to FIG. 11, at 1110 successful cryptographic data authentication is followed by the application of credential evaluation policies to (1) obtain the credential data if it is stored separately, (2) decrypt encrypted credential data and (3) determine credential data validity. At 1120 the credential data is assessed to ensure that the credential data is proper in terms of the type of credential data presented, the content of the credential data and the required quality of service (QoS). At 1130 user authentication is performed to ensure the credentials are associated with the user who is actually making the credential request. If the result of reference numerals 1100, 1110, 1120 or 1130 is a failure, the process ends with a failure indication at 1145. Otherwise, the process ends successfully at 1140.

Figure 12:
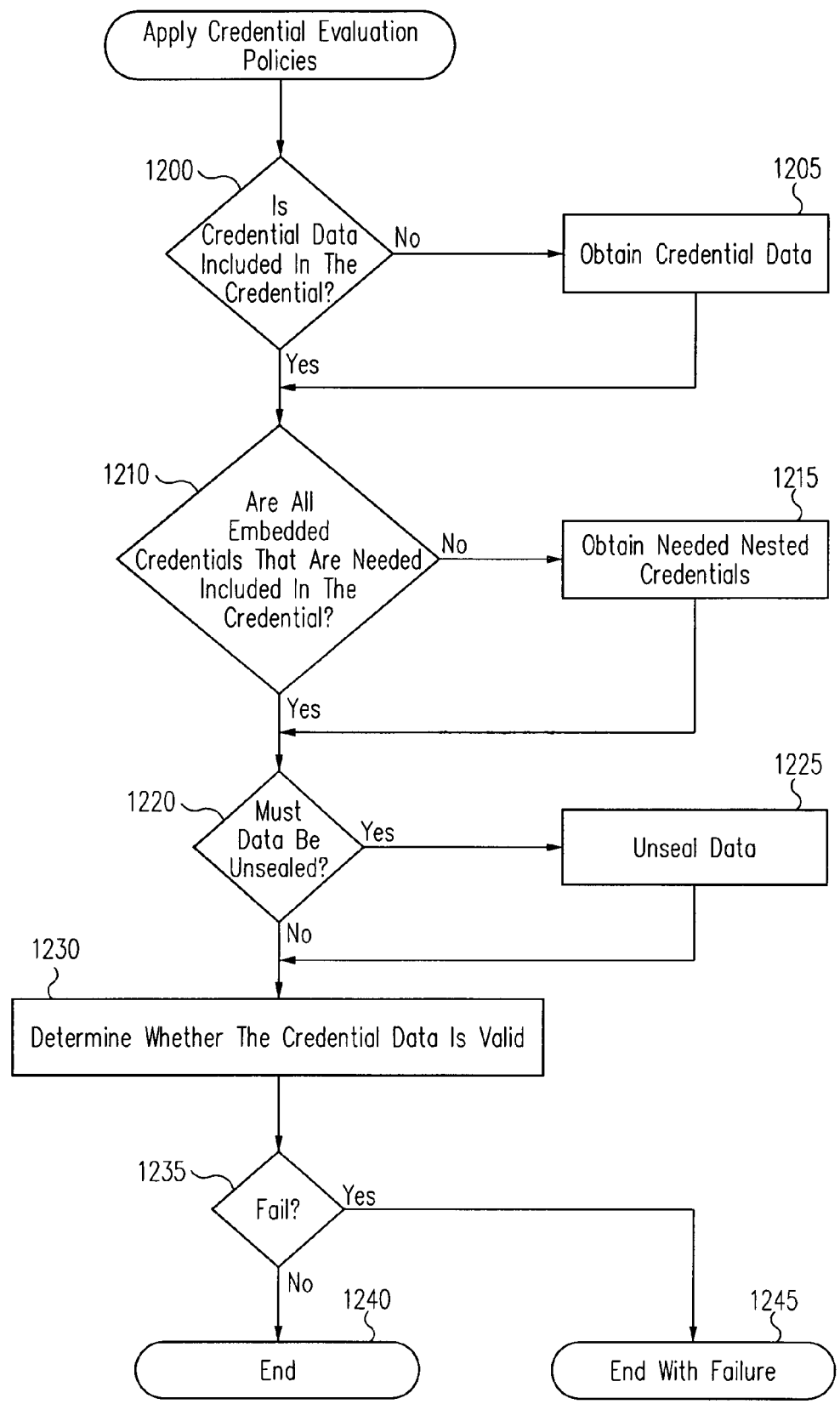
FIG. 12 is a flow diagram that illustrates a method for applying credential evaluation policies in accordance with one embodiment of the present invention.

Turning now to FIG. 12, a flow diagram that illustrates a method for applying credential evaluation policies in accordance with one embodiment of the present invention is presented. FIG. 12 provides more detail for reference numeral 1110 of FIG. 11. As discussed above, the unique identifying information of a credential may be stored separately from the rest of the credential data. Thus, at 1200 a determination is made regarding whether credential data is included in the credential. If credential data is not included in the credential, the credential data is obtained at 1205. If credential data is included in the credential, a determination is made at 1210 regarding whether all embedded credentials that are needed are included in the credential. If not all such credentials are included, the needed credentials are obtained at 1215. If all needed credentials are included, a determination is made at 1220 regarding whether any data in the credential must be unsealed. The credential data to be unsealed may include nested credential data. If data must be unsealed, it is unsealed at 1225. If no data needs to be unsealed, at 1230 a determination is made regarding whether the credential data is valid. If the data is invalid, the process ends with a failure indication at 1245. If the data is valid, the process ends successfully at 1240.

Figure 13:
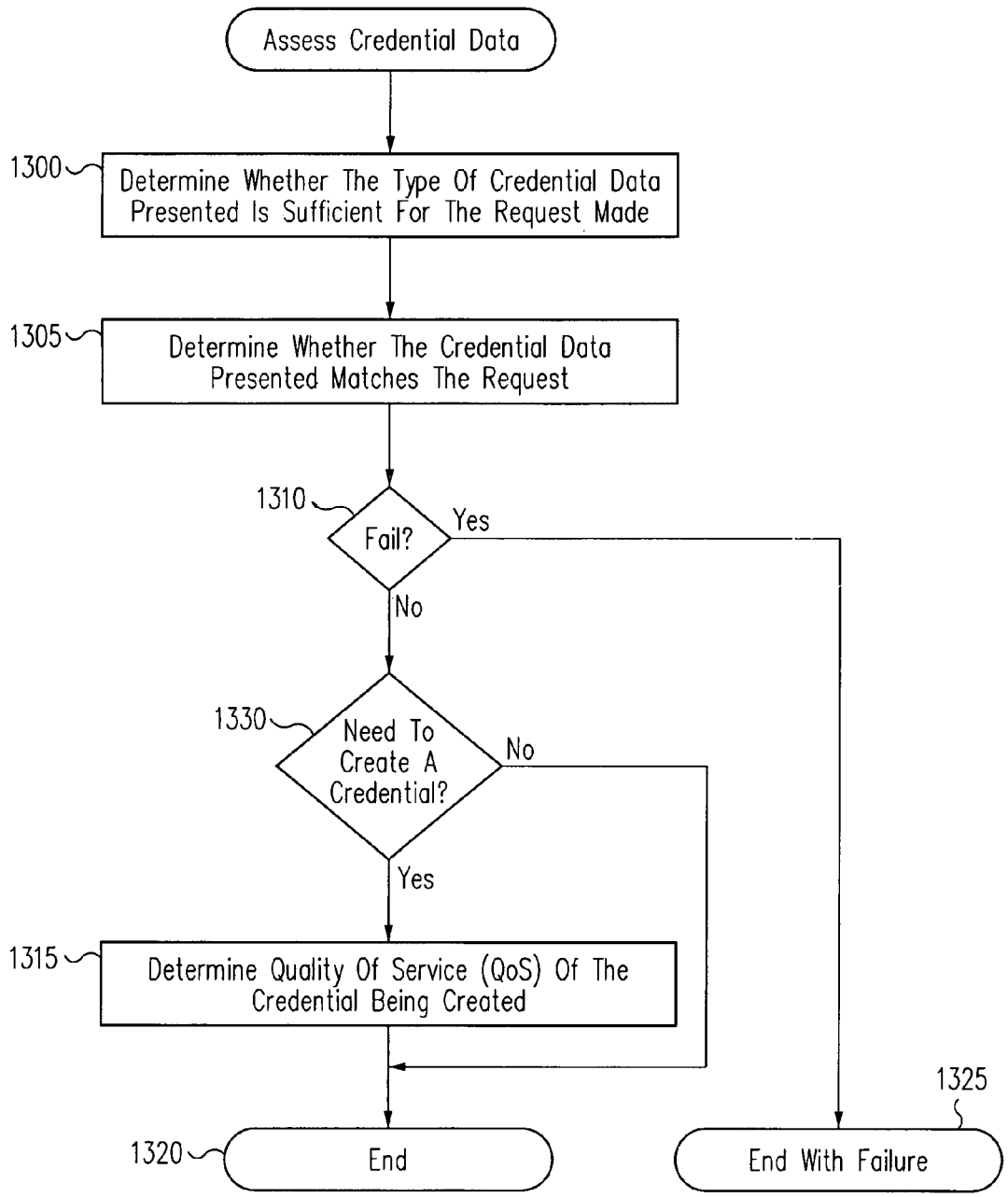
FIG. 13 is a flow diagram that illustrates a method for assessing credential data in accordance with one embodiment of the present invention.

Turning now to FIG. 13, a flow diagram that illustrates a method for assessing credential data in accordance with one embodiment of the present invention is presented. FIG. 13 provides more detail for reference numeral 1120 of FIG. 11. At 1300, a determination is made regarding whether the type of credential data presented is sufficient for the request made. In other words, the credential is evaluated for completeness. For example, if the credential authority requires a driver's license for a particular credential request, a determination is made regarding whether the credential data includes a driver's license. If the credential data does not include a driver's license, the credential data is insufficient for the request. If the credential data is insufficient, the request is rejected. Alternatively, the user could be prompted for the required credential data.

Still referring to FIG. 13, at 1305 a determination is made regarding whether the credential data presented matches the request. The content of the credential data is evaluated. For example, suppose the credential-granting policy for a particular credential requires a valid driver's license. In this case, whether the credential request includes a driver's license is determined at 1300, whereas whether the driver's license is expired is determined at 1305. If this determination ends unsuccessfully, a failure indication is returned at 1325. The process illustrated by FIG. 13 is used to assess credentials both by an authority during the enrollment process, and by a service provider in the process of providing a service. An authority creates a credential and therefore must assign values to credential data such as the QoS indicator. A service provider provides a service and does not need to create a credential (unless the service provider is actually an authority that provides credentials as a service). Thus, at 1330 a determination is made regarding whether a credential needs to be created. If a credential needs to be created, at 1315 the quality of service (QoS) of the credential being created is determined.

As part of validating credential data, an authority or service provider may require a certain level of user authentication. User authentication determines whether the credentials are associated with or belong to the user that is actually making the request, as opposed to someone else masquerading as the real user. User authentication may include, by way of example, asking for additional biometrics such as a fingerprint or retinal scan or the like. User authentication may also include a password challenge delivered to a cell phone known to belong to the user.

The QoS is a way of transferring information about how a credential was created to other entities that use or access the credential. The QoS is a reference to a policy statement established by an authority or group of authorities. For example, the QoS parameter of the credential may indicate the authority checked the user's drivers license or birth certificate. A different QoS might indicate the authority checked the user's drivers license, birth certificate and social security card.

A credential may include a QoS indicator that indicates the level of user authentication performed by the entity that authenticated the credential. A service provider may determine that the QoS indicated in a credential is insufficient to grant a service request. If so, the service provider may require additional user authentication. The Credential may also contain information regarding a user authentication server that is capable of performing additional user authentication.

According to another embodiment of the present invention, a logon credential includes a nested credential that asserts a particular process for user authentication. In other words, a logon credential includes a nested credential that includes a QoS for user authentication. The logon credential has its own QoS parameter embedded as part of its credential parameter. The logon credential also has a predetermined lifetime. For example, the QoS parameter of the logon credential could require a particular form of additional user authentication (such as a fingerprint or other biometrics) at predetermined intervals or events.

According to one embodiment of the present invention, a first credential is used to make a new credential having a more limited scope. For example, a first credential that grants access to view a web page or information unit may be used to create a second credential that provides access to a second Web page directly referenced by the first Web page for only 10 minutes. The same first credential might be used to create a third credential that provides access to any other Web pages referenced directly from the current Web page. More examples of using one or more credentials to create another credential are presented below with reference to FIG. 39.

Figure 14:
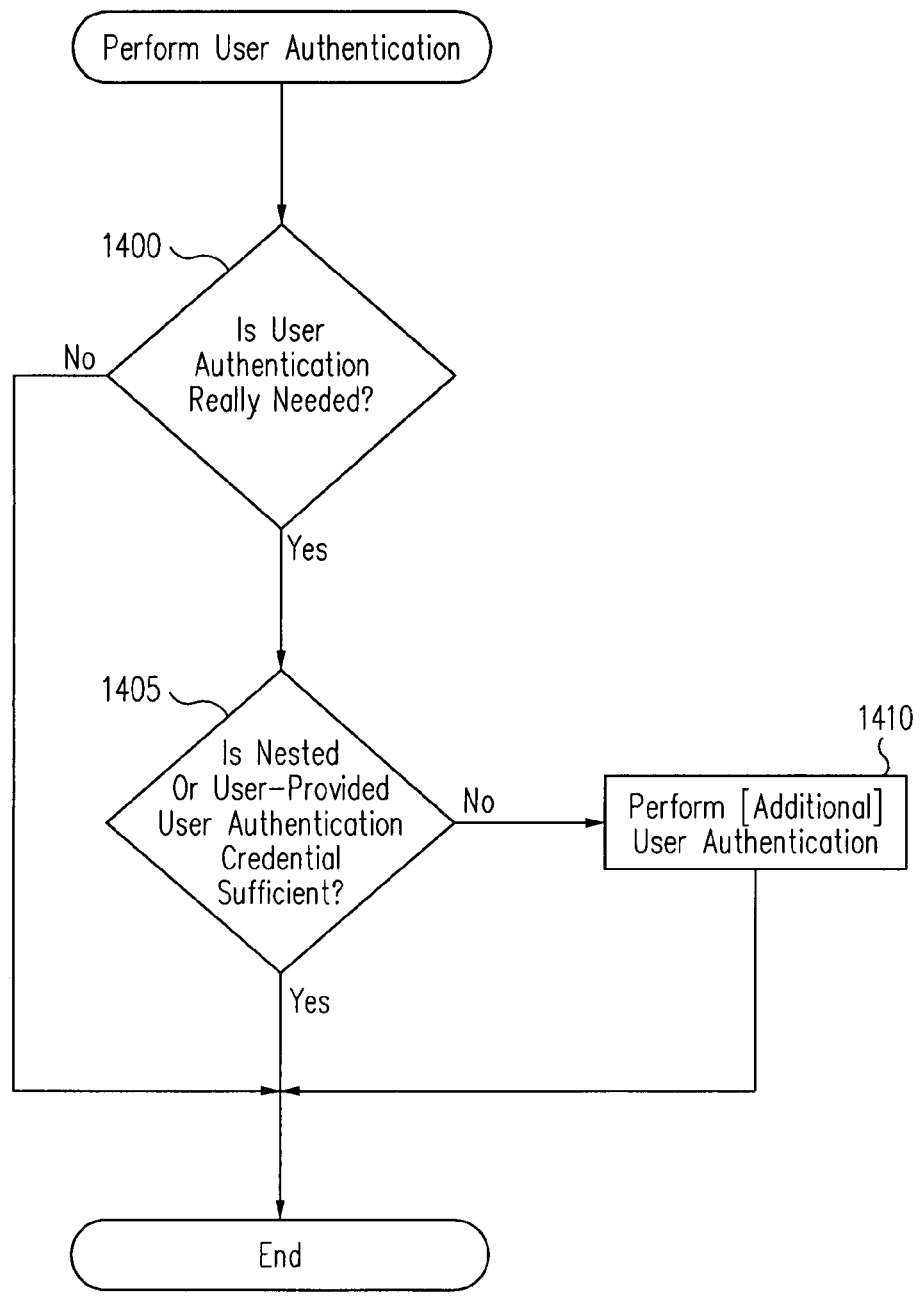
FIG. 14 is a flow diagram that illustrates a method for performing user authentication in accordance with one embodiment of the present invention.

Turning now to FIG. 14, a flow diagram that illustrates a method for performing user authentication in accordance with one embodiment of the present invention is presented. FIG. 14 provides more detail for reference numeral 1130 of FIG. 11. At 1400, a determination is made regarding whether user authentication is required. This determination is based upon the user-provided user authentication credential and the required QoS. If the user-provided user authentication credential provides a QoS that is less than the required QoS, additional user authentication is required. If user authentication is required, at 1405 a determination is made regarding whether user-provided or nested credentials are sufficient to satisfy the required QoS if creating a credential, or as required by a service provider. If these credentials are insufficient, user authentication is performed at 1410.

Figure 15:
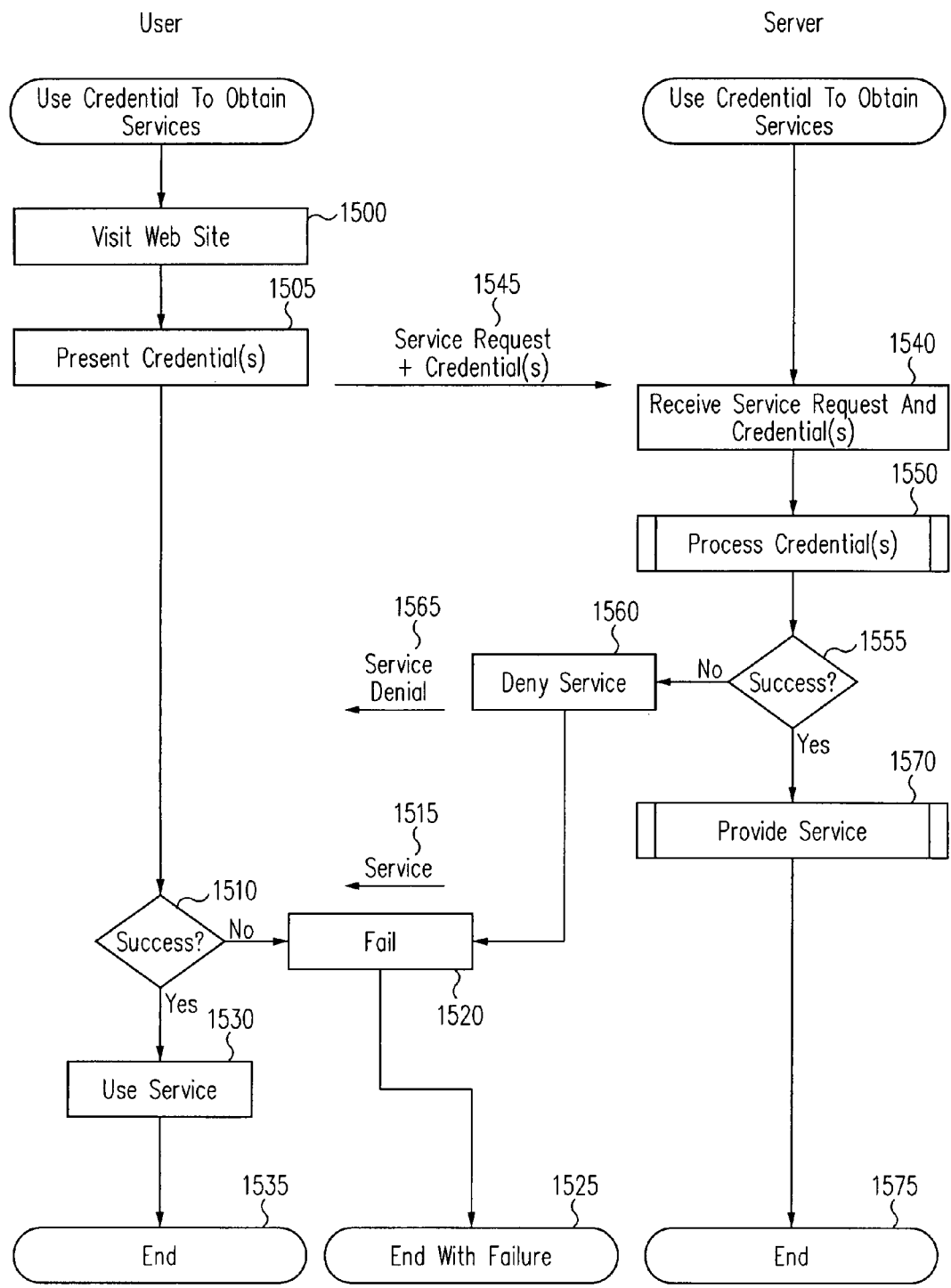
FIG. 15 is a flow diagram that illustrates a method for using a credential to obtain services in accordance with one embodiment of the present invention.

Turning now to FIG. 15, a flow diagram that illustrates a method for using a credential to obtain services in accordance with one embodiment of the present invention is presented. FIG. 15 provides more detail for reference numeral 810 of FIG. 8, including actions performed by a user and a server. At 1500, a user visits a Web site. At 1505, a service request and one or more credentials associated with the user are presented to the service provider server. At 1540, the server receives the service request and credentials. At 1550, the service provider processes the credentials as described above with respect to FIG. 11. At 1555, the server determines whether the credentials were processed successfully. If the credentials were processed unsuccessfully, the requested service is denied at 1560 and a service denial 1565 is sent to the user that requested the service. If the credentials were processed successfully, the service is provided at 1570. At 1510, the user determines whether the service request was successful. If the service request was unsuccessful, a failure indication is made at 1520 and the process ends at 1525. If the service request was successful, the service is used at 1530.

FIGS. 16-33 illustrate embodiments of the present invention that use user data stored in secure user data storage to enhance privacy on the World Wide Web. FIGS. 17-23 illustrate embodiments of the present invention that use user data stored in secure user data storage. FIGS. 24-30A illustrate embodiments of the present invention that employ a credential format for user data. The credential format is as was illustrated above with respect to FIGS. 9A and 9B. FIGS. 30B-33 illustrate embodiments of the present invention that use a smart card for secure user data storage.

Figure 16:
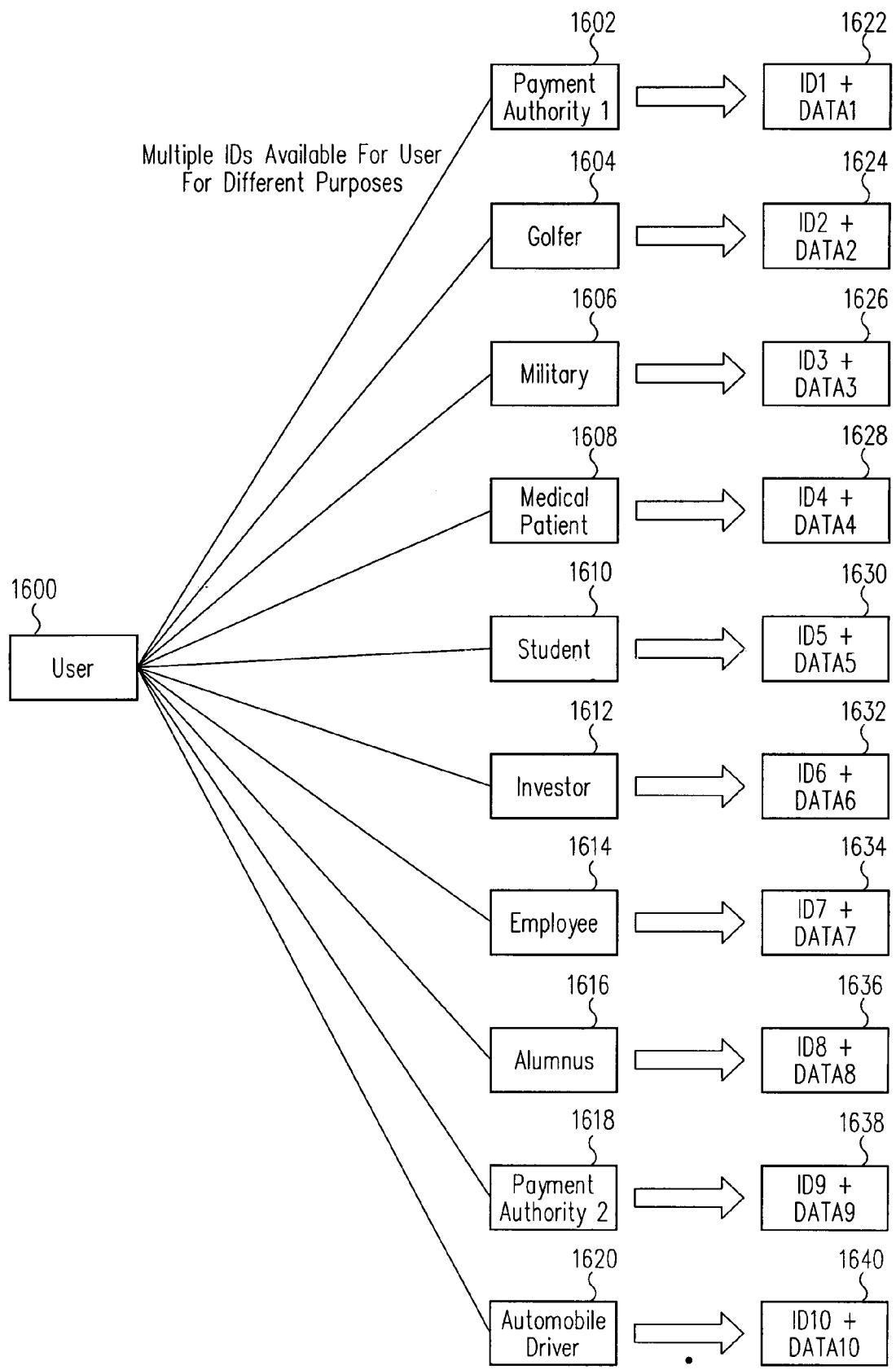
FIG. 16 is a block diagram that illustrates assigning multiple identities to an individual in accordance with one embodiment of the present invention.

Turning now to FIG. 16, a block diagram that illustrates assigning multiple identities to an individual in accordance with one embodiment of the present invention is presented. As shown in FIG. 16, an individual 1600 may have multiple identities for different purposes. An individual 1600 may be a customer of a payment authority such as a credit card (1602, 1618), a golfer 1604, a member of the military 1606 and a medical patient 1608. An individual may also be a student 1610, an investor 1612, an employee 1614, a university alumnus 1616 and an automobile driver 1620. Each of identities 1602-1620 is tied to relevant data. For example, relevant data for golfer identity 1604 may include the golfer's handicap 1624. Relevant data for medical patient identity 1608 may include a patient's medical history 1628. However, the golfer identity 1604 does not need to know any medical history information 1628 and the medical patient identity 1608 does not need to know about golf handicaps 1624.

Still referring to FIG. 16, some or all of the relevant data for an identity may be the same as relevant data for another identity. For example, some relevant data (such as degree program) for student identity 1610 may be the same as relevant data for alumnus identity 1616.

Figure 17:
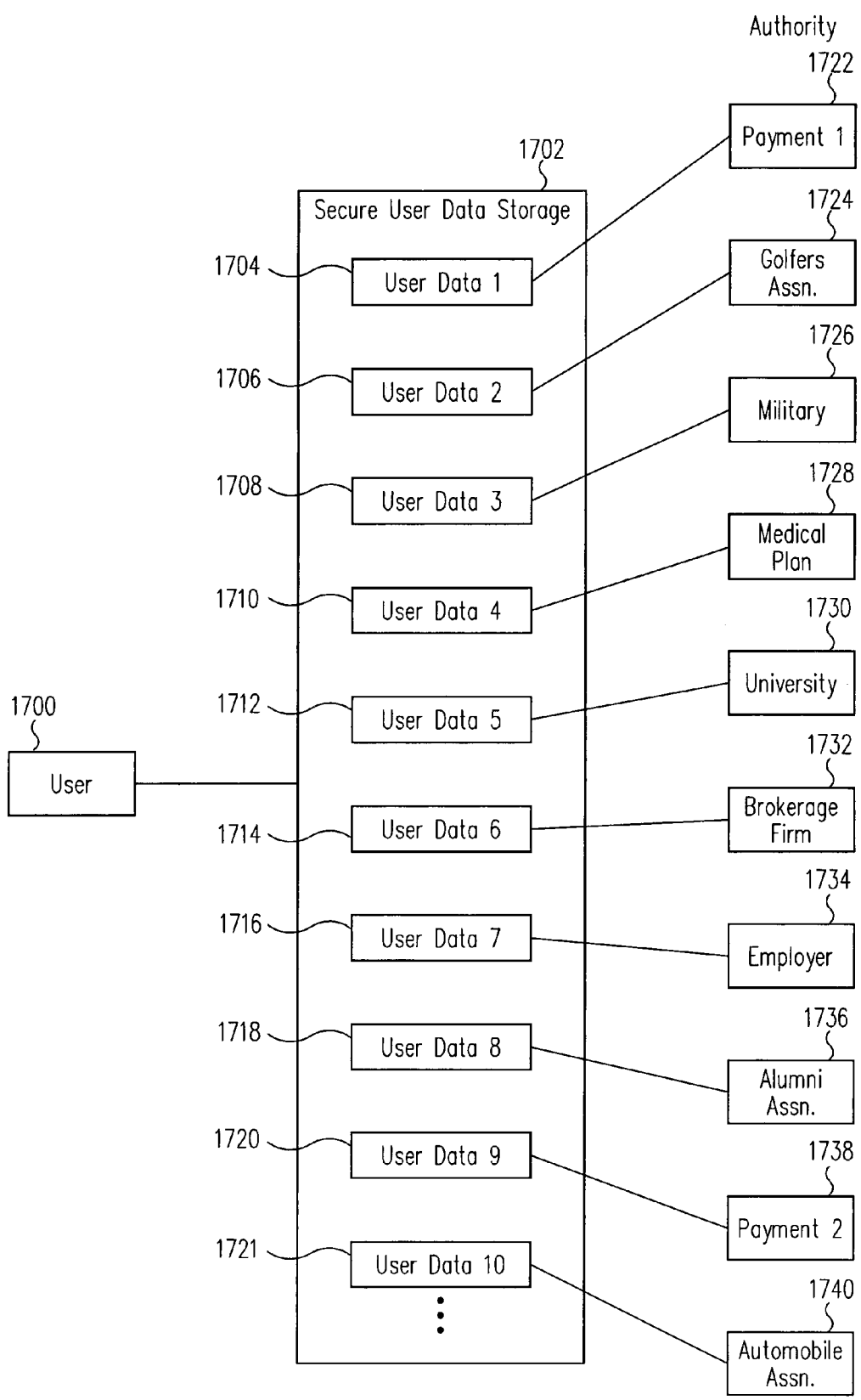
FIG. 17 is a block diagram that illustrates assigning multiple sets of user data for identities in accordance with one embodiment of the present invention.

Turning now to FIG. 17, a block diagram that illustrates assigning multiple sets of user data for identities in accordance with one embodiment of the present invention is presented. As shown in FIG. 17, the user data 1704-1721 is stored in secure user data storage 1702. Secure user data storage 1702 is controlled by a user (user-controlled). The user data 1704-1721 may include encrypted data and/or authenticated data. Secure user data storage 1702 may comprise a portable device such as a cell phone, PDA or smart card or the like. Secure user data storage 1702 may also comprise a file on a Web server or other computer.

According to one embodiment of the present invention, a portion of the user data is bit-mapped. The user data may be bit-mapped based upon, by way of example, based on membership in a group or category. For example, a portion of a user's data may be bit-mapped according to categories of books that the user is interested in.

Figure 18:
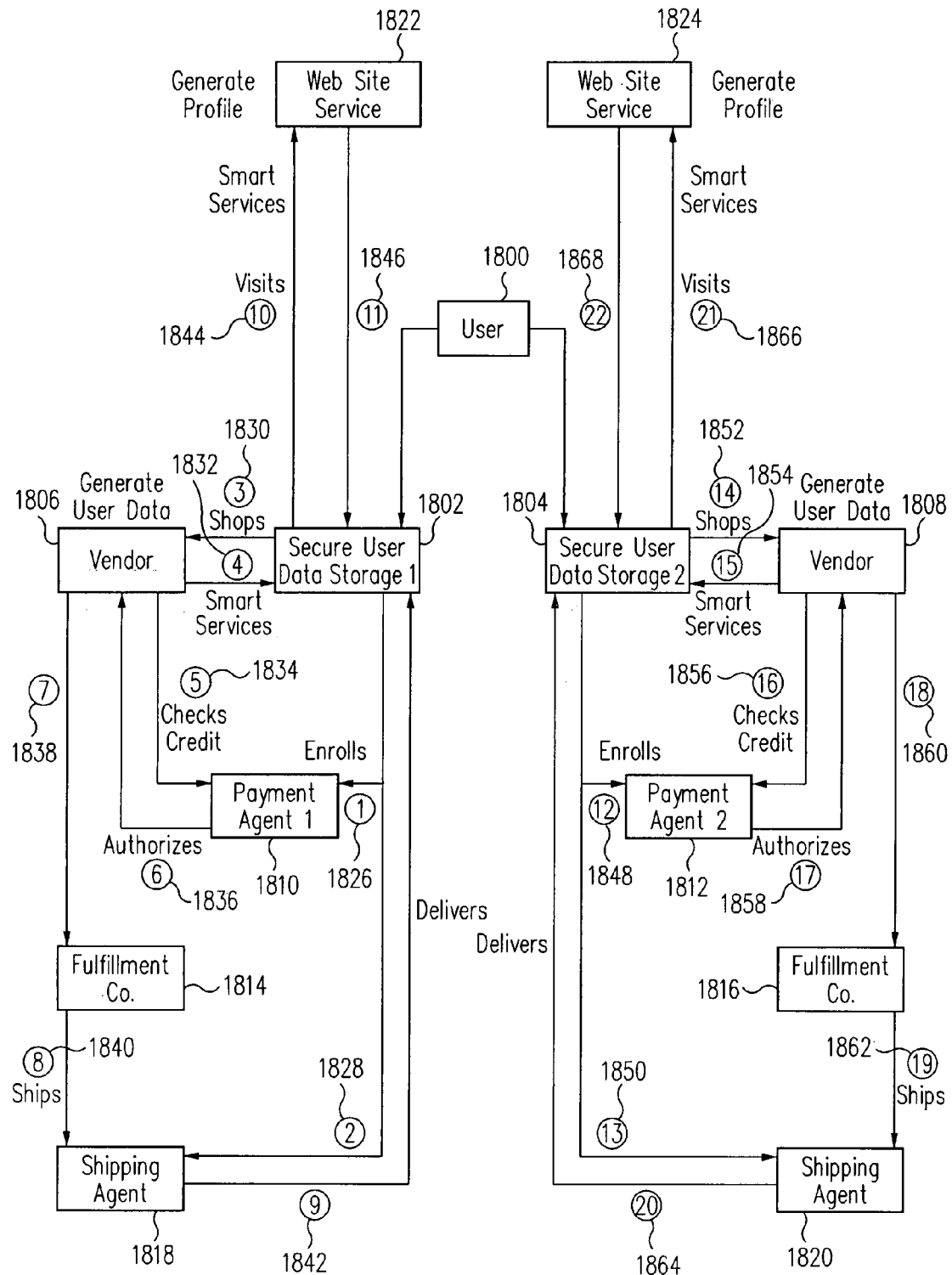
FIG. 18 is a block diagram that illustrates conducting transactions between multiple parties on an open network while maintaining privacy in accordance with one embodiment of the present invention.

Turning now to FIG. 18, a block diagram that illustrates conducting transactions between multiple parties on an open network while maintaining privacy in accordance with one embodiment of the present invention is presented. FIG. 18 illustrates buying a product from a vendor Web site. Secure user data storage 1802 stores multiple sets of user data for identities as illustrated previously with respect to reference numeral 1702 of FIG. 17. Secure user data storage 708 may reside on a desktop computer, a smart card, a PDA or the like. At 1826, a user enrolls with payment agent 1 (1810) at the payment agent's Web site. User data specific to the enrollment of that user is stored in secure user data storage 1802. Payment agent 1 (1810) determines whether user authentication is required. If user authentication is required, payment agent 1 (1810) also determines the required level of user authentication. In addition, payment agent 1 (1810) determines whether user data specific to the enrollment of the user must be encrypted.

According to embodiments of the present invention, user enrollment data includes user authentication information used for subsequent visits to a service provider Web site. In other words, the service provider-specific user or a reference to the user data is presented to the service provider Web site whenever the user data set is used to visit the same service provider Web site. The user authentication requirements of a particular service provider Web site will determine whether additional user authentication is required. For example, the stored user authentication data may suffice for a repeat visit to an Internet-based email site, but signing into a military Web site may require additional user authentication measures such as biometrics each time the site is visited, regardless of the stored user authentication data.

Still referring to FIG. 18, at 1828, the same user data set is used to enroll with shipping agent 1818. Thus, the shipping agent Web site 1818 performs any required data authentication and/or encryption of the user data and returns the user data to secure user data storage 1802. At this point, secure user data storage 1802 includes a user data set that has been used to enroll with two Web sites (1810, 1818). At 1830, the user data set is used to shop for items at the Web site of Vendor A (1806). Once items are selected for purchase, Vendor A 1806 sends the user data to payment agent 1 (1810) for payment authorization. Payment agent 1 (1810) decrypts user data if required user data is encrypted. Payment agent 1 (1810) uses the data in conjunction with vendor-provided transaction details to determine whether the purchase is authorized. At 1832, payment agent 1 (1810) sends an authorization indication to Vendor A 1806. Next, Vendor A 1806 creates a fulfillment record that includes order information and the shipping information from the secure user data storage 1802. At 1838, Vendor A 1806 sends the fulfillment record to Fulfillment Company 1814 and the Fulfillment Company 1814 fulfills the order using shipping information from the fulfillment record originating from the user data. At 1840, the fulfillment company 1814 transfers the purchased goods to the shipping agent 1818. At 1842, the shipping agent delivers the goods to the address in the shipping information from secure data storage 1 (1802).

Many other devices or subsystems (not shown) may be connected in a similar manner. Also, it is not necessary for all of the devices shown in FIG. 7 to be present to practice the present invention, as discussed below. Furthermore, the devices and subsystems may be interconnected in different ways from that shown in FIG. 7. Code to implement the present invention may be operably disposed in a system memory or stored on storage media such as a fixed disk, floppy disk or CD-ROM.

According to one embodiment of the present invention, a Web site maintains a profile for the user. One exemplary use of a profile is to track the activity of a user at a particular Web site. The profile maintains information regarding the nature of the user activities with Vendor A 1806. For example, the profile may maintain information regarding the frequency of visits, the items previously purchased, the items examined but not purchased, the preferred shipping method and the preferred payment method, allowing Vendor A 1806 to provide intelligent services tailored to the buying pattern of a particular user data set.

The same process described above with regard to user data sets in secure user data storage 1 (1802) applies to user data sets in secure user data storage 2 (1804) as well.

Figure 19:
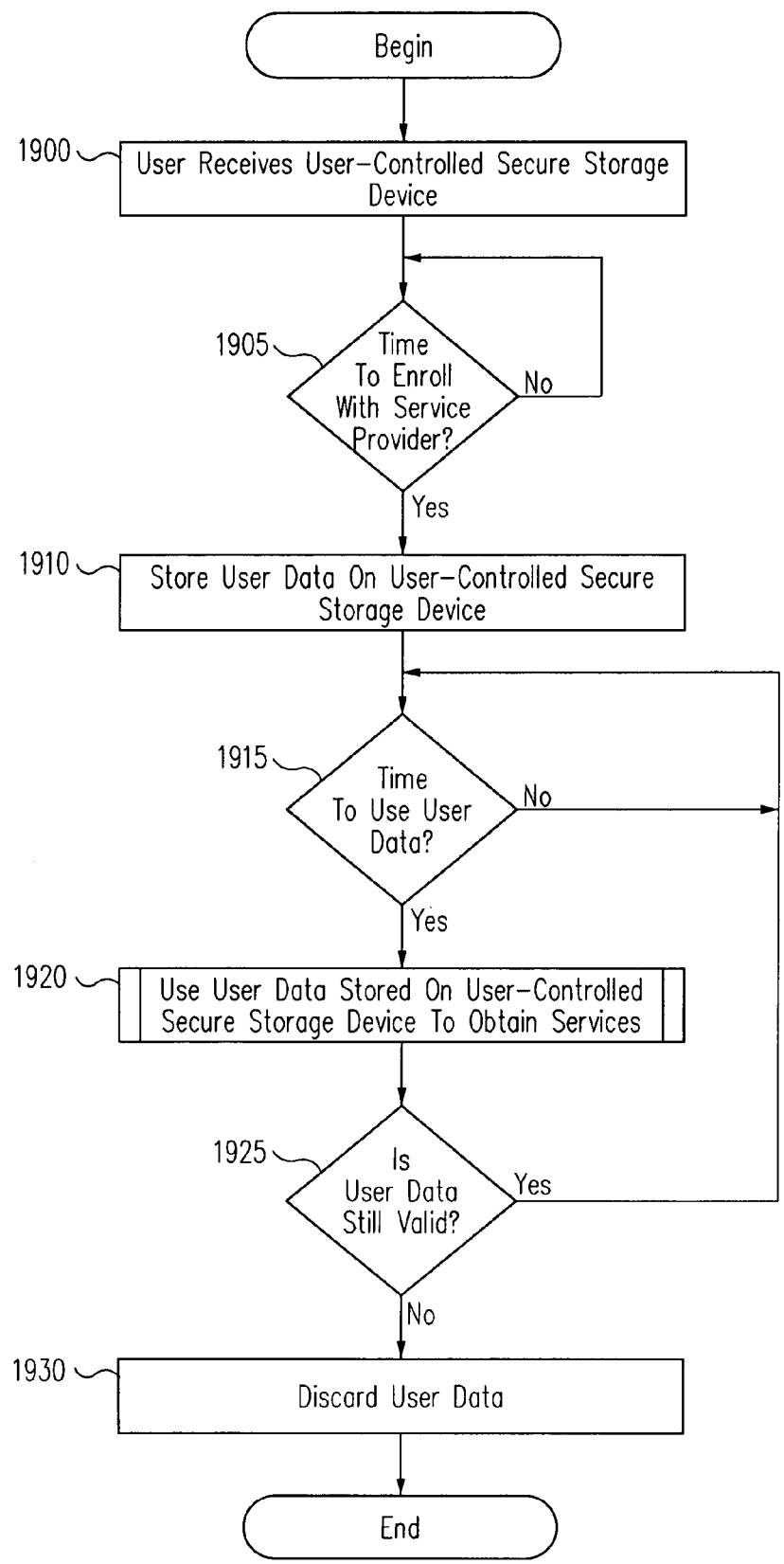
FIG. 19 is a flow diagram that illustrates a method for conducting transactions between multiple parties on an open network while maintaining privacy in accordance with one embodiment of the present invention.

Turning now to FIG. 19, a flow diagram that illustrates a method for conducting transactions between multiple parties on an open network while maintaining privacy in accordance with one embodiment of the present invention is presented. At 1900, a user receives a user-controlled storage device, or a key to control access to such a device on the Web. At 1905, a determination is made regarding whether it is time to enroll with a service provider. When it is time to enroll with a service provider, at 1910 user data resulting from the enrollment process is stored on a user-controlled secure storage device. Some user data may be encrypted. Additionally, some user data may be cryptographically authenticated. At 1915, a determination is made by the user regarding whether it is time to use the user data stored on the user-controlled secure storage device. When it is time to use the user data, at 1920 the user data stored on the user-controlled secure storage device is used to obtain one or more services. At 1925, a determination is made regarding whether the user data is still valid. If the user data is still valid, execution continues at 1915. If the user data is no longer valid, it is discarded at 1930.

According to one embodiment of the present invention, user data required to obtain a new service is obtained by dynamically combining the request for new service with at least one user data set obtained from a previous enrollment. For example, a user that shops at a first book vendor Web site may exhibit one or more preferences for books belonging to certain categories, based both on the books purchased at the Web site and on the books examined but not purchased. The first book vendor may save this information in a profile. The user may want to use all or part of this information when the user shops at a second book vendor Web site. Accordingly, a service request made by the user for service at the second book vendor Web site is automatically combined with the profile information used when shopping at the first book vendor Web site, thus creating a new profile for use by the user when shopping at the second book vendor Web site.

Figure 20:
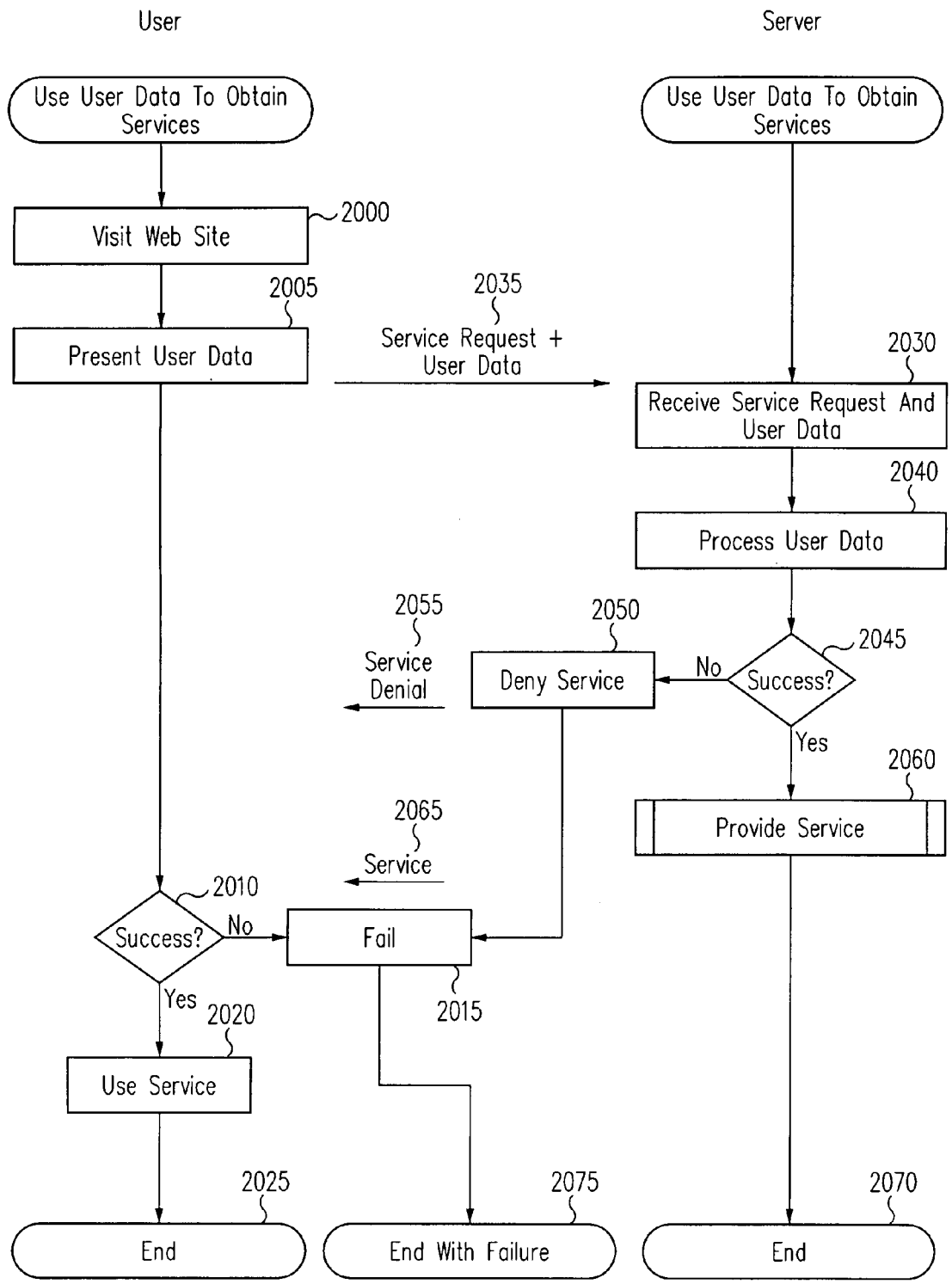
FIG. 20 is a flow diagram that illustrates a method for using user data stored on a user-controlled device to obtain services in accordance with one embodiment of the present invention.

Turning now to FIG. 20, a flow diagram that illustrates a method for using user data stored on a user-controlled device to obtain services in accordance with one embodiment of the present invention is presented. FIG. 20 provides more detail for reference numeral 1920 of FIG. 19. At 2000, a user visits a Web site. At 2005, a service request and associated user data are presented to the service provider server. At 2030, the server receives the service request and associated user data. At 2040, the service provider processes the user data to determine whether the user data provided is sufficient to grant the request. At 2045, the server determines whether the user data was processed successfully. If the user data was processed unsuccessfully, the requested service is denied at 2050 and a service denial 2055 is sent to the user that requested the service. If the user data was processed successfully, the service is provided at 2060. At 2010, the user determines whether the service request was successful. If the service request was unsuccessful, a failure indication is made at 2015 and the process ends at 2075. If the service request was successful, the service is used at 2025.

Figure 21:
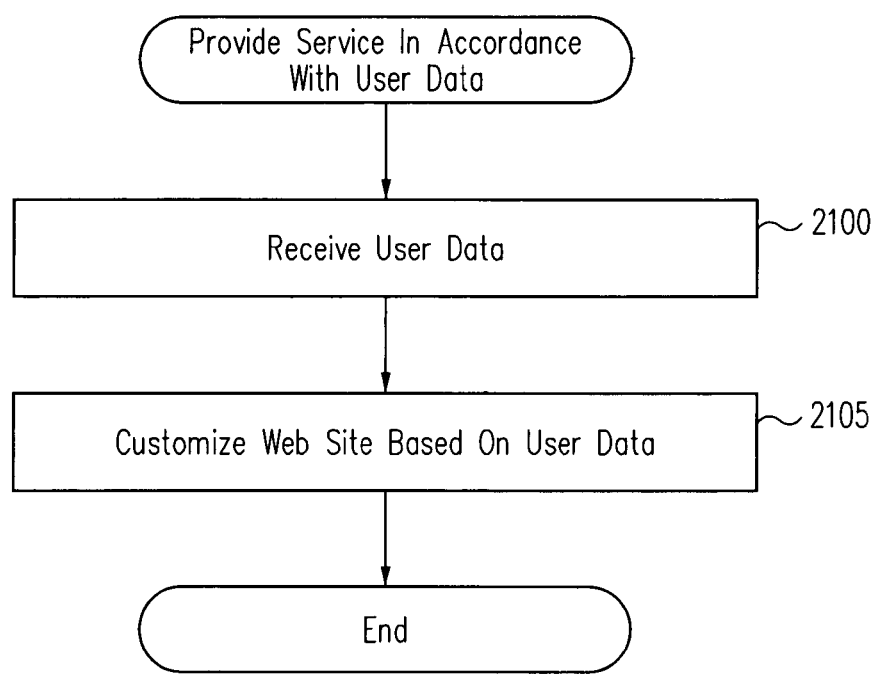
FIG. 21 is a flow diagram that illustrates a method for providing a service in accordance with one embodiment of the present invention.
Figure 22:
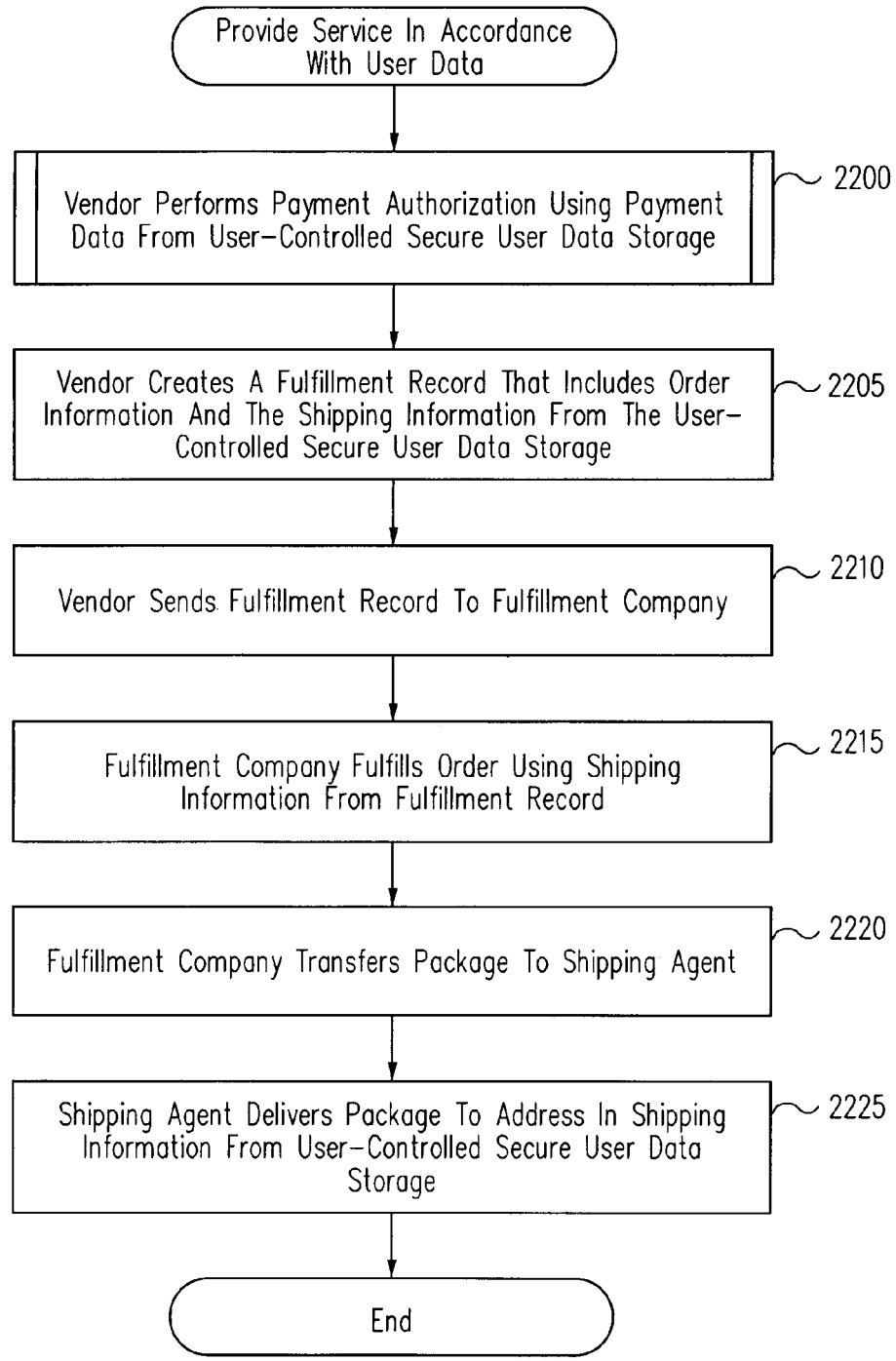
FIG. 22 is a flow diagram that illustrates a method for providing a service in accordance with user data in accordance with one embodiment of the present invention.

FIGS. 21 and 22 provide more detail for reference numeral 2060 of FIG. 20. FIG. 21 illustrates providing a service by customizing a Web site based on user data stored on a user-controlled device, while FIG. 22 illustrates providing a service by using the user data stored on a user-controlled device to purchase a product and have the product delivered to the user. The examples of providing a service are not intended to be limiting in any way. Those of ordinary skill in the art will recognize that many other forms of service may be provided.

Turning now to FIG. 21, a flow diagram that illustrates a method for providing a service in accordance with one embodiment of the present invention is presented. FIG. 21 provides more detail for reference numeral 2060 of FIG. 20. At 2100, user data is received. At 2105, one or more Web pages at a Web site are customized based on the user data stored on a user-controlled device.

Turning now to FIG. 22, a flow diagram that illustrates a method for providing a service in accordance with user data in accordance with one embodiment of the present invention is presented. FIG. 22 provides more detail for reference numeral 2060 of FIG. 20. At 2200 a vendor performs payment authorization using payment data from a user-controlled secure device. At 2205 the vendor creates a fulfillment record that includes order information and the shipping information from the user-controlled secure device. At 2210, the vendor sends a fulfillment record to a fulfillment company. At 2215, the fulfillment company fulfills the order using shipping information from the fulfillment record originating from the user data. At 2220, the fulfillment company transfers the purchased goods to the shipping agent. At 2225, the shipping agent delivers the goods to the address in the shipping information from the user-controlled secure device.

Figure 23:
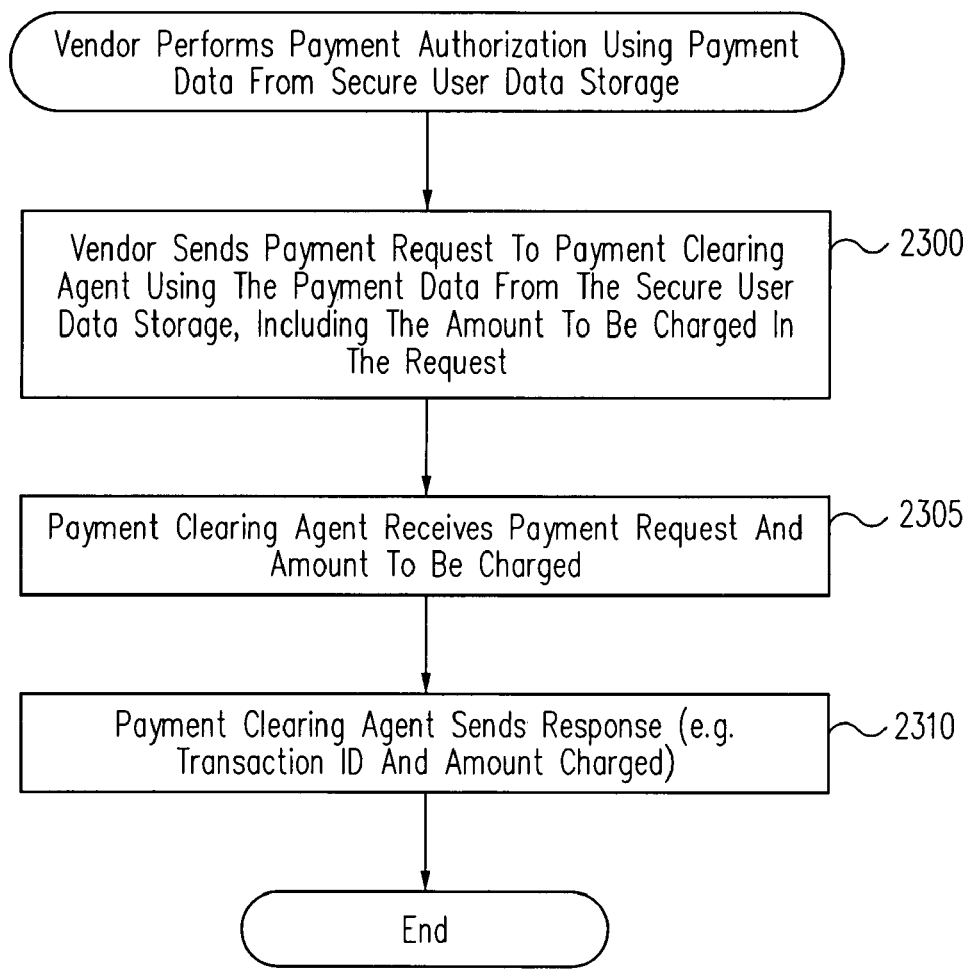
FIG. 23 is a flow diagram that illustrates a method for performing payment authorization using payment data from a secure device in accordance with one embodiment of the present invention.

Turning now to FIG. 23, a flow diagram that illustrates a method for performing payment authorization using payment data from a secure device in accordance with one embodiment of the present invention is presented. FIG. 23 provides more detail for reference numeral 2200 of FIG. 22. At 2300, the vendor sends a payment request to a payment-clearing agent using the payment data originating from the secure device, including transaction details such as the amount to be charged in the request. At 2305, the payment-clearing agent receives the payment request and the amount to be charged. At 2310, the payment-clearing agent sends a response. For example, the payment clearing agent may send a transaction ID and the amount charged. Depending upon the contents of the response, all or part of the response may comprise a cryptographically encrypted message.

FIGS. 24-30A illustrate embodiments of the present invention that employ a credential format for user data. The credential format is as was illustrated above with respect to FIGS. 9A and 9B. Use of the credential format is presented for illustrative purposes only. Those of ordinary skill in the art will recognize that other formats may be used.

Figure 24:
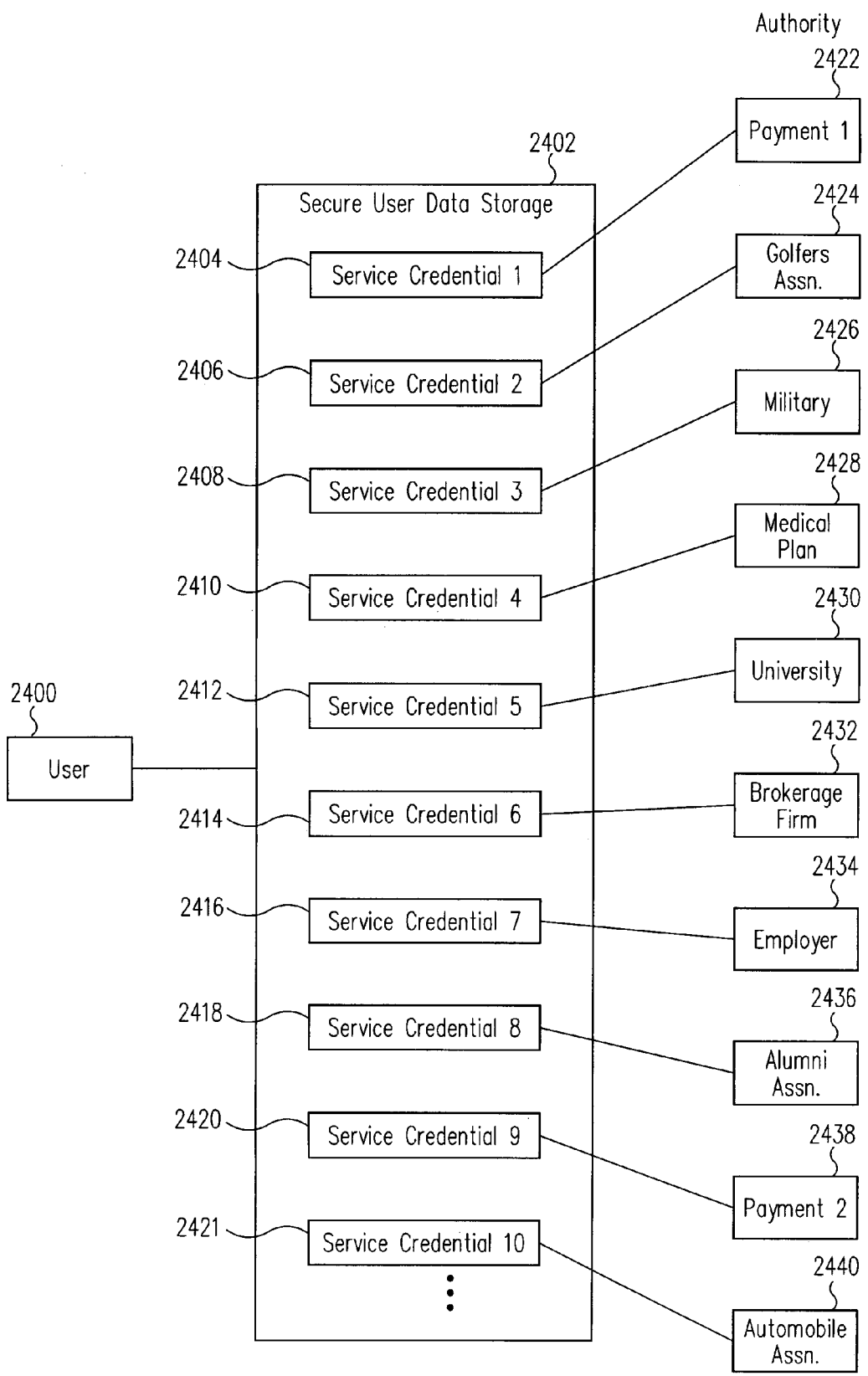
FIG. 24 is a block diagram that illustrates assigning multiple credentials for identities in accordance with one embodiment of the present invention.

Turning now to FIG. 24, a block diagram that illustrates assigning multiple credentials for identities in accordance with one embodiment of the present invention is presented. FIG. 24 is similar to FIG. 17, except that service credentials 2404-2421 are stored in the secure device 2402. In other words, the service credentials 2404-2421 of FIG. 24 are based upon and contain, directly or indirectly, the user data 1704-1721 of FIG. 17.

Figure 25:
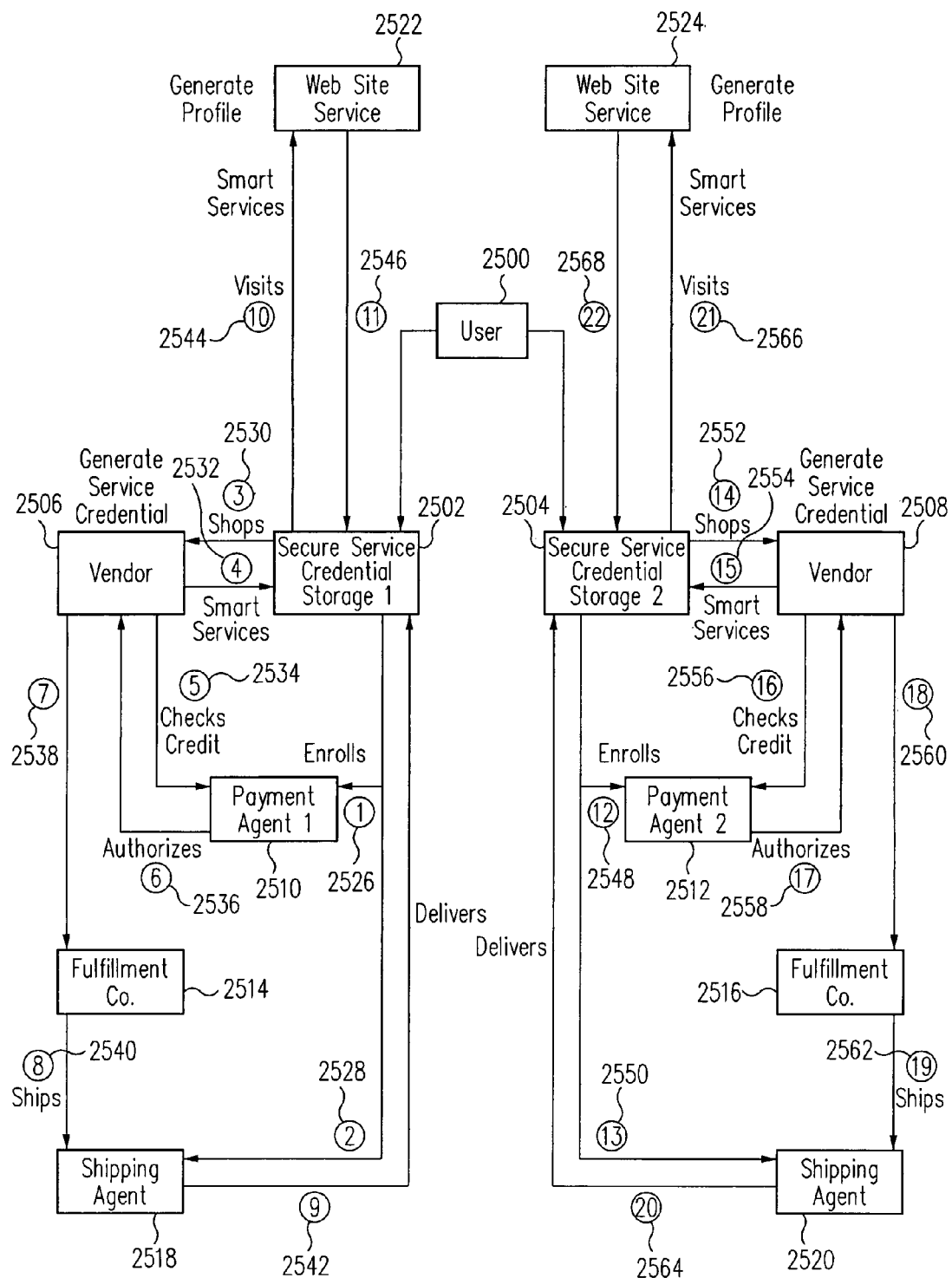
FIG. 25 is a block diagram that illustrates conducting transactions between multiple parties using service credentials on an open network while maintaining privacy in accordance with one embodiment of the present invention.

Turning now to FIG. 25, a block diagram that illustrates conducting transactions between multiple parties using service credentials on an open network while maintaining privacy in accordance with one embodiment of the present invention is presented. FIG. 25 illustrates buying a product from a vendor Web site. Secure service credential storage 2502 stores multiple sets of service credential for identities as illustrated previously with respect to reference numeral 2402 of FIG. 24. Secure service credential storage 2502 may reside on a desktop computer, a smart card, a PDA or the like. At 2526, a user enrolls with payment agent 1 (2510) at the payment agent's Web site. A service credential specific to the enrollment of that user is stored in secure service credential storage 2502. Payment agent 1 (2510) determines whether user authentication is required. If user authentication is required, payment agent 1 (2510) also determines the required level of user authentication. In addition, payment agent 1 (2510) determines whether user data included in the service credential specific to the enrollment of the user must be encrypted.

According to embodiments of the present invention, user data includes user authentication information used for subsequent visits to a service provider Web site. In other words, the authority-specific authentication data or a reference to the data is presented to the service provider Web site whenever the service credential is used to visit the same service provider Web site. The user authentication requirements of a particular service provider Web site will determine whether additional user authentication is required. For example, the stored user authentication data may suffice for a repeat visit to an Internet-based email site, but signing into a military Web site may require additional user authentication measures such as biometrics each time the site is visited, regardless of the stored user authentication data.

Still referring to FIG. 25, at 2528, the user 2500 enrolls with shipping agent 2518, providing specific data such as a shipping address. Data provided at 2528 when enrolling with shipping agent 2518 may differ in whole or in part from data provided when enrolling with payment agent 2510 at 2526. Thus, the shipping agent Web site 2518 performs any required data authentication and/or encryption of the service credential and returns the service credential to secure service credential storage 2502. At this point, secure service credential storage 2502 includes a service credential set that has been created by enrolling with two Web sites (2510, 2518) functioning as authorities. At 2530, the service credential set is used to obtain service such as shopping at the Web site of Vendor A (2506). Once items are selected for purchase, Vendor A 2506 sends the service credential obtained from the secure service credential storage to payment agent 1 (2510) for payment authorization. Payment agent 1 (2510) decrypts any data contained in a service credential if any required data is encrypted. Payment agent (2510) uses data contained in the service credential in conjunction with vendor-provided transaction details to determine whether the purchase is authorized. At 2532, payment agent 1 (2510) sends an authorization indication to Vendor A 2506. Next, Vendor A 2506 creates a fulfillment message that includes order information and the shipping information obtained from the secure service credential storage 2502. According to one embodiment of the present invention, the fulfillment message comprises a fulfillment credential. At 2538, Vendor A 2506 sends the fulfillment message to Fulfillment Company 2514 and the Fulfillment Company 2514 fulfills the order using shipping information from the fulfillment message. At 2540, the Fulfillment Company 2514 transfers the purchased goods to the shipping agent 2518. At 2542, the shipping agent delivers the goods to the address in the shipping information originating from secure data storage 1 (2502).

Figure 26:
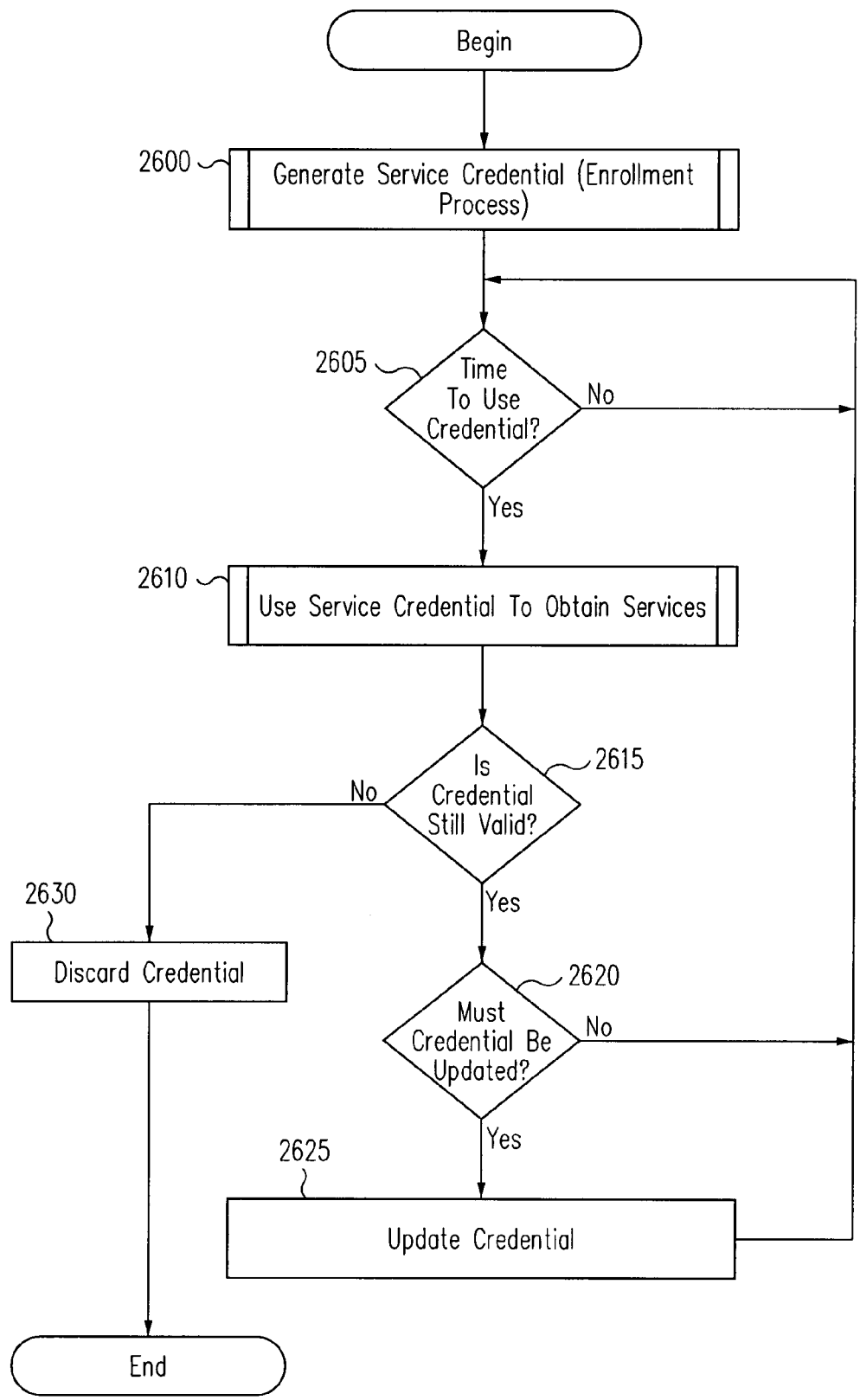
FIG. 26 is a flow diagram that illustrates a method for conducting transactions between multiple parties using service credentials on an open network while maintaining privacy in accordance with one embodiment of the present invention.

Turning now to FIG. 26, a flow diagram that illustrates a method for conducting transactions between multiple parties using service credentials on an open network while maintaining privacy in accordance with one embodiment of the present invention is presented. At 2600, a service credential is generated. At 2605, a determination is made regarding whether it is time to use the credential. When it is time to use the service credential, at 2610 the service credential is used to obtain services. At 2615, a determination is made regarding whether the service credential is still valid. If the service credential is still valid, at 2620 a determination is made regarding whether the service credential must be updated. If the service credential must be updated, it is updated at 2625. Execution continues at 2605 when the service credential is still valid. If the service credential is no longer valid, it is discarded at 2630.

Figure 27:
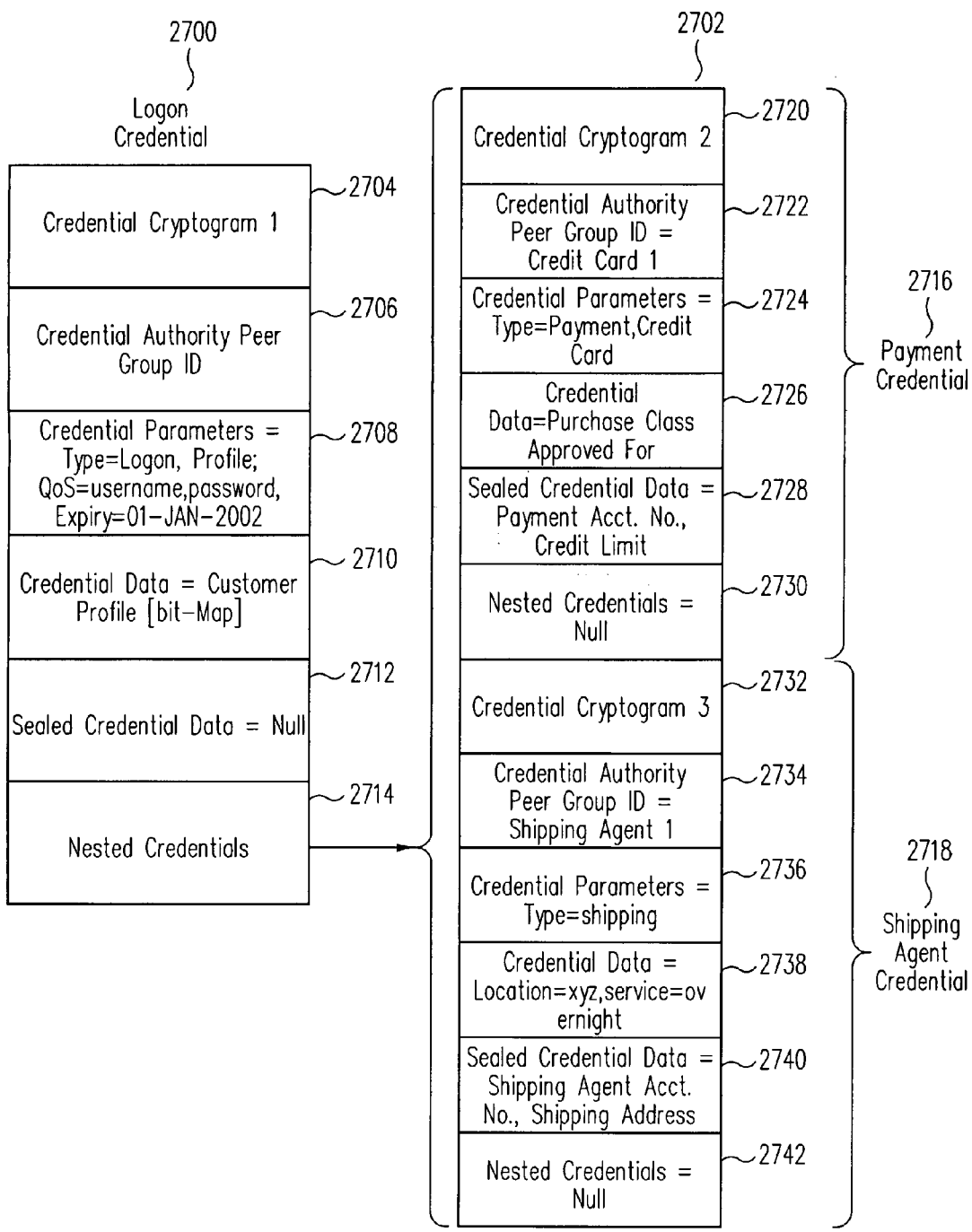
FIG. 27 is a block diagram that illustrates using nested credentials in accordance with one embodiment of the present invention.

Turning now to FIG. 27, a block diagram that illustrates using nested credentials in accordance with one embodiment of the present invention is presented. FIG. 27 illustrates using the credential format of FIG. 9B for the example discussed with reference to FIG. 25. In this example, a user on Jan. 1, 2002 initiates a Web experience. Login credential 2700 allows the user access to the Web. Logon credential 2700 includes two credential parameters 2808. The "Type" parameter indicates the credential is a "Logon" credential, and credential data is a user profile. The "QoS" parameter indicates a (username, password) combination has been used to authenticate a user. The "expiry" parameter also indicates the credential expires on Jan. 1, 2002. The credential data 2710 includes a bit-mapped customer profile and there is no sealed credential data 2712. Logon credential 2700 also includes nested credentials 2714. Reference numeral 2702 illustrates an expanded view of nested credentials 2714.

The nested credentials (2714, 2702) include a payment credential 2716 and a shipping agent credential 2718. The payment credential parameters 2724 indicate the credential is a credit card payment credential. The credential data 2726 includes the purchase class for which the holder of the credential is approved. Examples of a purchase class include, by way of example, a hotel payment or a book payment for a specific maximum value. The sealed credential data 2728 includes the card holder details such as the account number and the actual credit limit.

The shipping agent credential parameters 2736 indicate the credential is a "shipping" credential. The credential data 2738 includes the customer's nearest shipping agent location and the type of service. The sealed credential data 2740 includes the shipping agent account number and the shipping address.

Figure 28A:
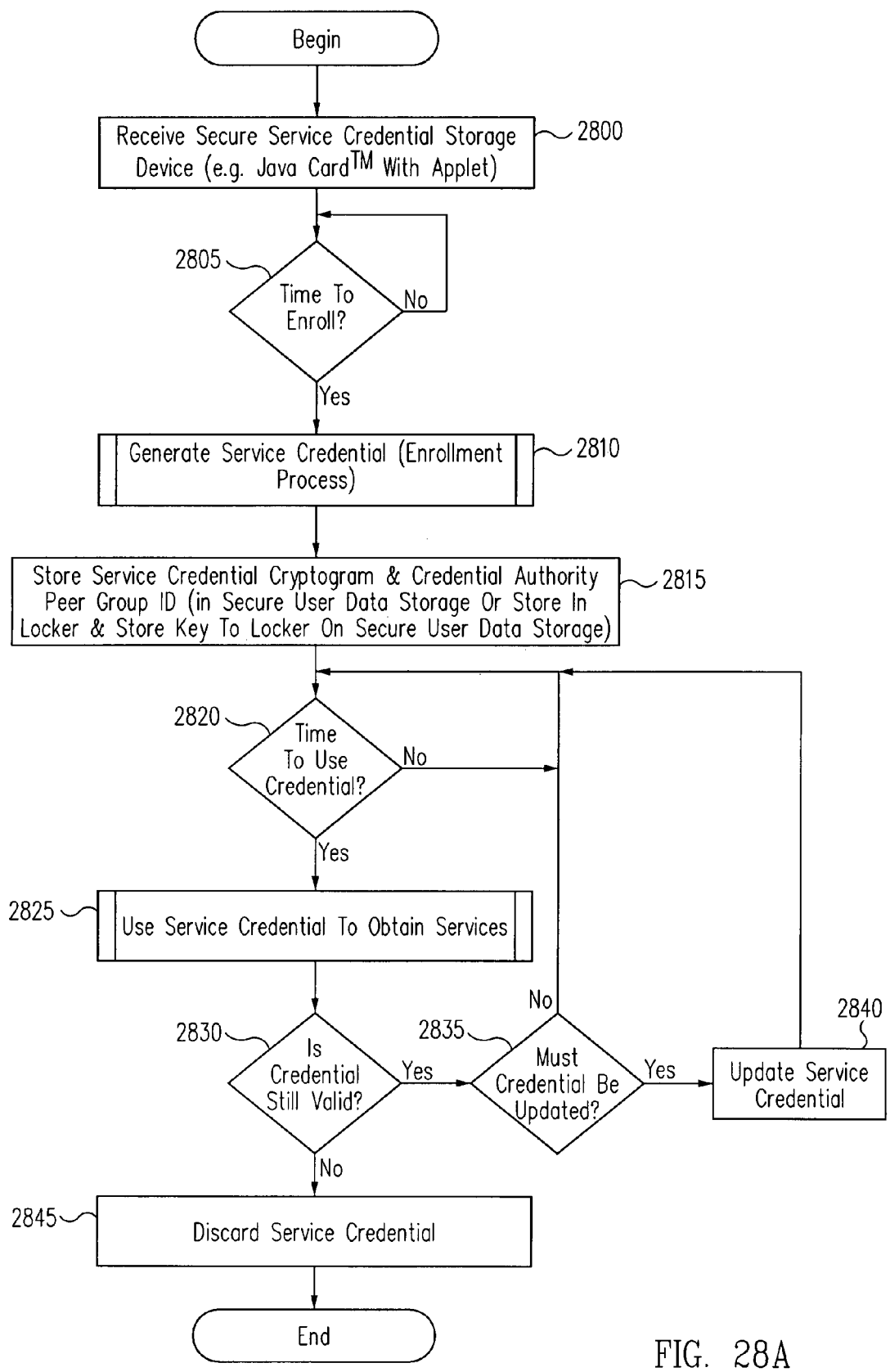
FIG. 28A is a flow diagram that illustrates a method for conducting transactions between multiple parties using service credentials on an open network while maintaining privacy in accordance with one embodiment of the present invention.

Turning now to FIG. 28A, a flow diagram that illustrates a method for conducting transactions between multiple parties using service credentials on an open network while maintaining privacy in accordance with one embodiment of the present invention is presented. At 2800, a secure service credential storage device is received. At 2805, a determination is made regarding whether it is time to enroll with an authority. When it is time to enroll, at 2810 a service credential is generated based on user information provided in the enrollment request. At 2815, the credential cryptogram and credential authority peer group ID are stored. They may be stored in a user-controlled personal device. Examples of user-controlled personal devices include, by way of example, a smart card, a cell phone, a personal digital assistant (PDA) or the like. Alternatively, they may be stored in a Web locker and the digital key to the locker may be stored in a secure device. At 2820, a determination is made regarding whether it is time to use the service credential. When it is time to use the service credential, at 2825 the service credential is used to obtain services. At 2830, a determination is made regarding whether the service credential is still valid. If the service credential is still valid, at 2835 a determination is made regarding whether the service credential must be updated. If the service credential must be updated, it is updated at 2840. Execution continues at 2820 when the credential is still valid. If the credential is no longer valid, it is discarded at 2845.

Figure 28B:
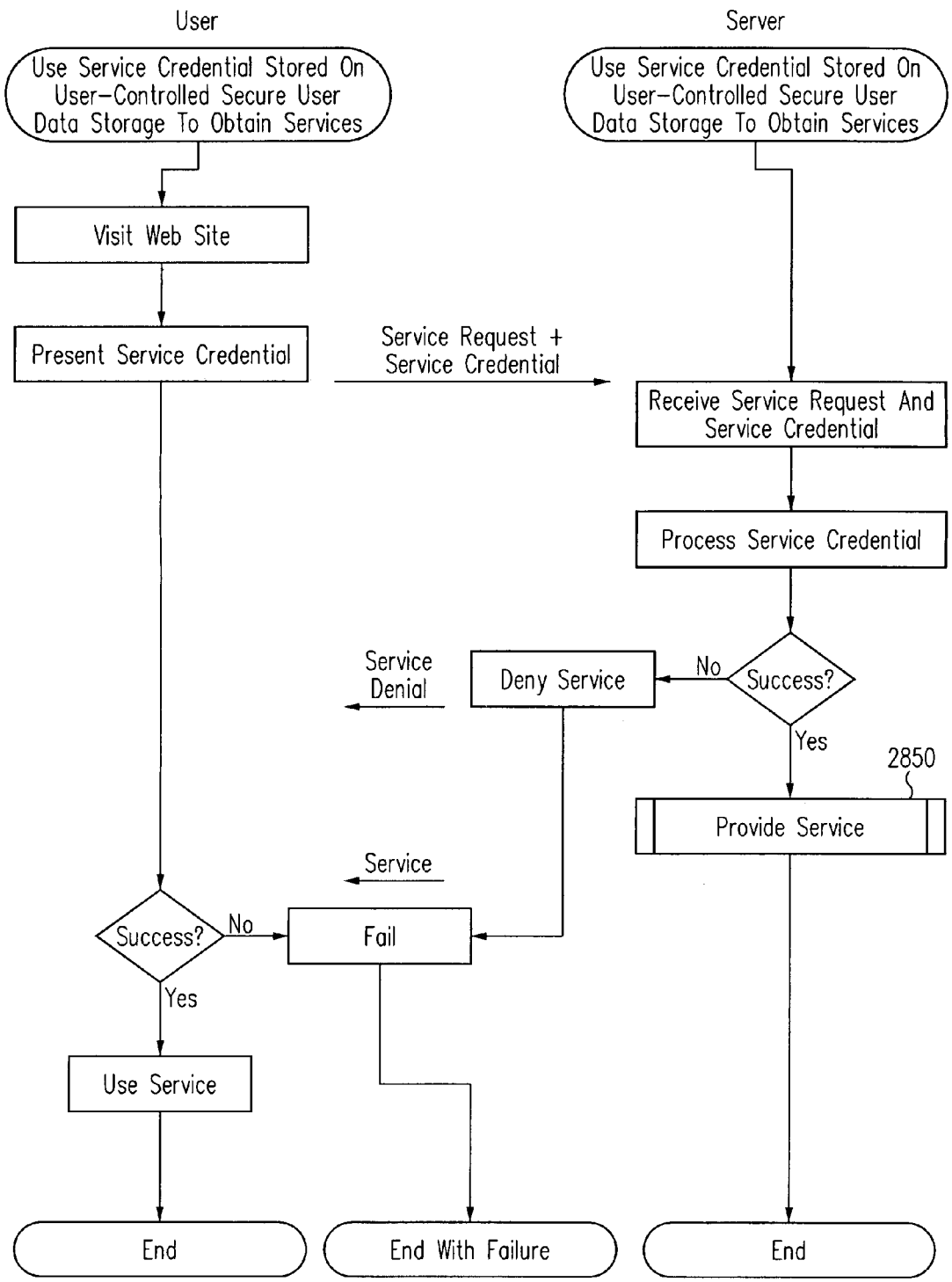
FIG. 28B is a flow diagram that illustrates a method for using a service credential stored on a user-controlled device to obtain services in accordance with one embodiment of the present invention.
Figure 29:
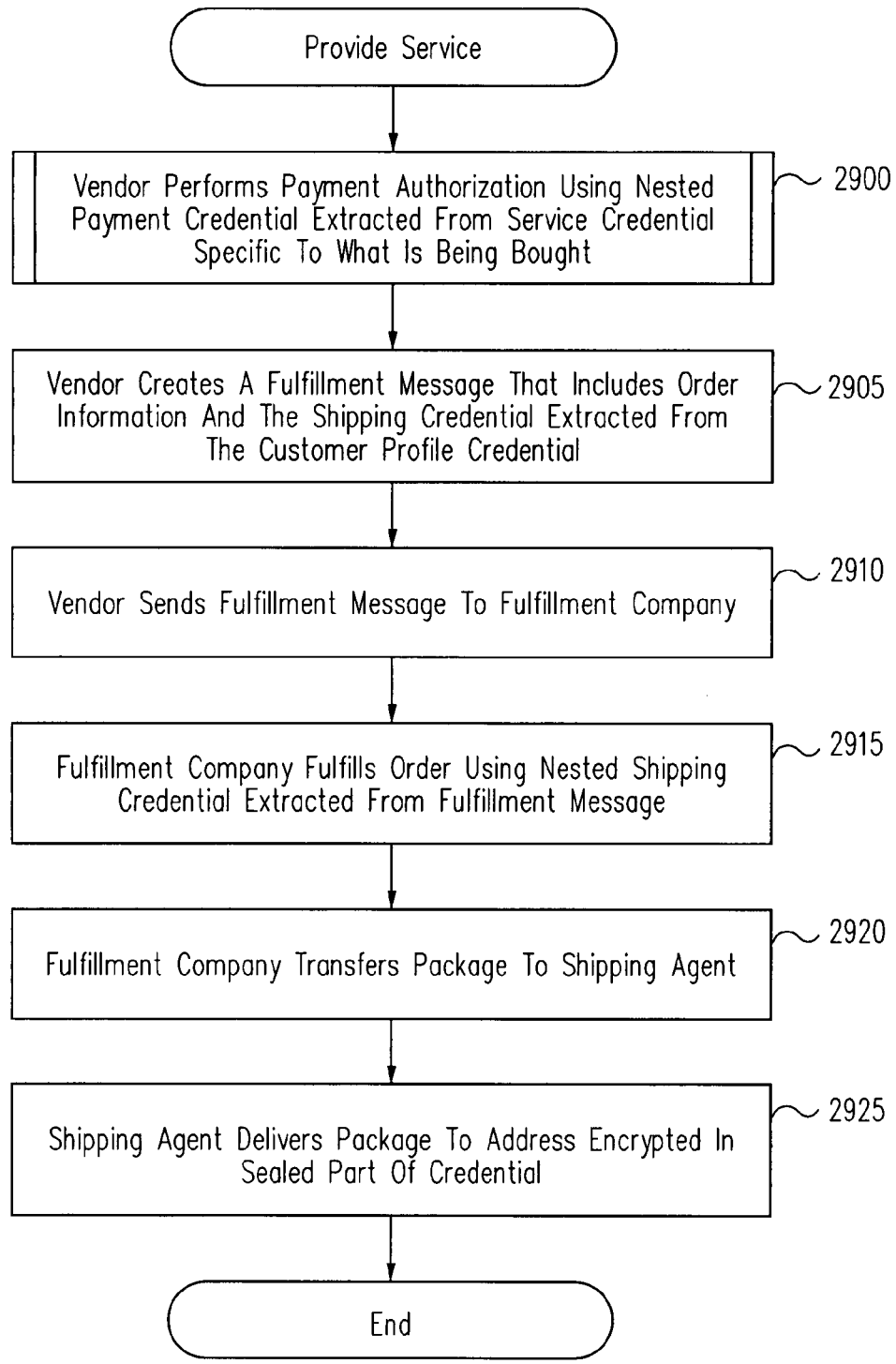
FIG. 29 is a flow diagram that illustrates a method for providing a service in accordance with one embodiment of the present invention.

Turning now to FIG. 28B, a flow diagram that illustrates a method for using a service credential stored on a user-controlled device to obtain services in accordance with one embodiment of the present invention is presented. FIG. 28B provides more detail for reference numeral 2825 of FIG. 28A. FIG. 28B is similar to FIG. 20 except that FIG. 28B illustrates using a service credential whereas FIG. 20 illustrates using user data Turning now to FIG. 29, a flow diagram that illustrates a method for providing a service in accordance with one embodiment of the present invention is presented. FIG. 29 provides more detail for reference numeral 2850 of FIG. 28B. At 2900, a vendor performs payment authorization using a nested payment credential extracted from a customer service credential specific to what is being bought. At 2905, the vendor creates a fulfillment message that includes order information and the shipping credential extracted from the customer service credential. According to one embodiment of the present invention, the fulfillment message comprises a fulfillment credential. At 2910 the vendor sends the fulfillment message to the fulfillment company. At 2915, the fulfillment company fulfills the order using the nested shipping credential extracted from the fulfillment message. At 2920, the fulfillment company transfers the purchased goods to the shipping agent. At 2925, the shipping agent delivers the goods to the address encrypted in the sealed part of the credential.

The use of the credential format in the above example is not intended to be limiting in any way. Those of ordinary skill in the art will recognize that other data formats may be used.

According to one embodiment of the present invention, rather than using a fulfillment company to fulfill the order, after the fulfillment message is created (reference numeral 2905 of FIG. 29), the fulfillment message is stored on a secure service credential storage device. According to one embodiment of the present invention, the fulfillment message is stored on a portable device such as a PDA, cell phone or smart card. According to another embodiment of the present invention, a digital key to a Web locker that contains the fulfillment credential is stored on the device. The user then brings the secure service credential storage device to the vendor's store and presents the service credential to the vendor in person. The vendor processes the credential and performs any required user authentication. Once the user is properly authenticated, the vendor presents the purchased item to the customer.

Figure 30A:
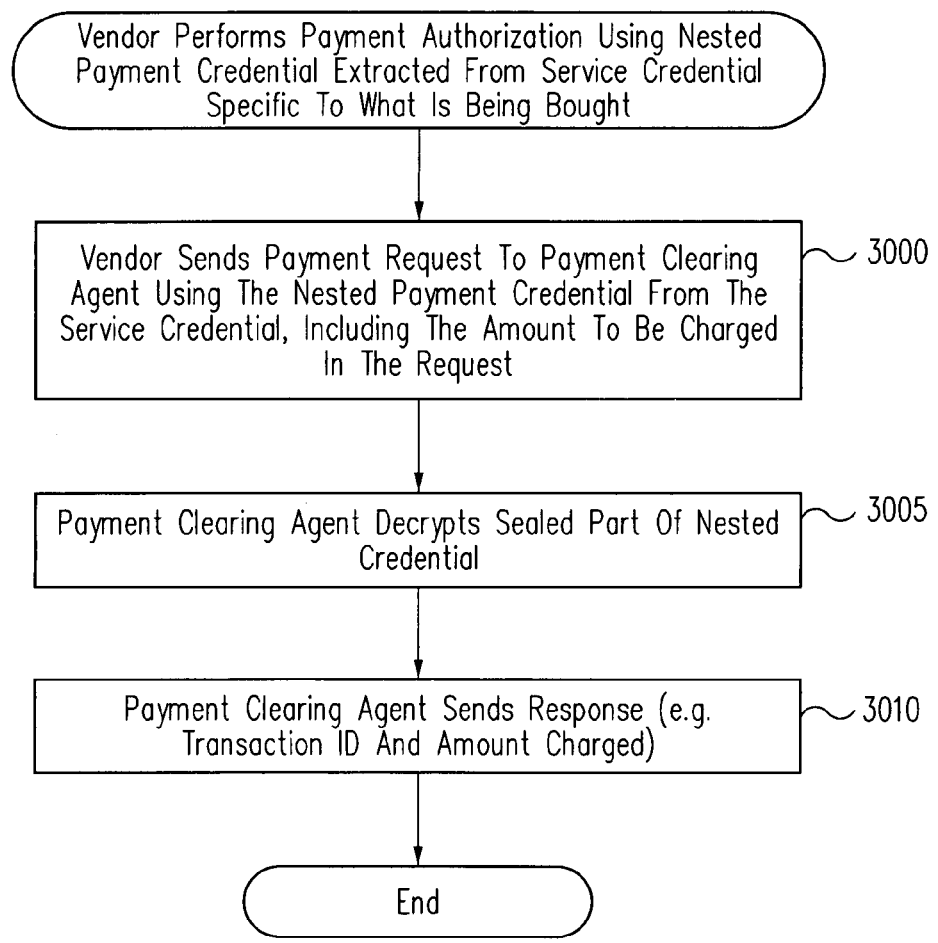
FIG. 30A is a flow diagram that illustrates a method for performing a payment authorization using nested payment credentials extracted from a service credential in accordance with one embodiment of the present invention.

Turning now to FIG. 30A, a flow diagram that illustrates a method for performing a payment authorization using nested payment credentials extracted from a service credential in accordance with one embodiment of the present invention is presented. FIG. 30A provides more detail for reference numeral 2900 of FIG. 29. At 3000, the vendor sends a payment request to the payment-clearing agent using the nested payment credential from the service credential, including in the request transaction details such as the amount to be charged. At 3005, the payment-clearing agent decrypts the sealed part of the nested credential. At 3010, the payment-clearing agent sends a response. For example, the clearing agent may send a response that includes a transaction identifier and the amount charged. Depending upon the contents of the response, all or part of the response may comprise a cryptographically encrypted message.

FIGS. 30B-33 illustrate embodiments of the present invention that use a smart card for secure user data storage.

Resource-constrained devices are generally considered to be those that are relatively restricted in memory and/or computing power or speed, as compared to typical desktop computers and the like. Although the particular implementation discussed below is described in reference to a smart card, the invention can be used with other resource-constrained devices including, but not limited to, cellular telephones, boundary scan devices, field programmable devices, personal digital assistants (PDAs) and pagers, as well as other miniature or small footprint devices. The invention can also be used on non-resource constrained devices.

For the purpose of this disclosure, the term "processor" may be used to refer to a physical computer or a virtual machine.

Figure 30B:
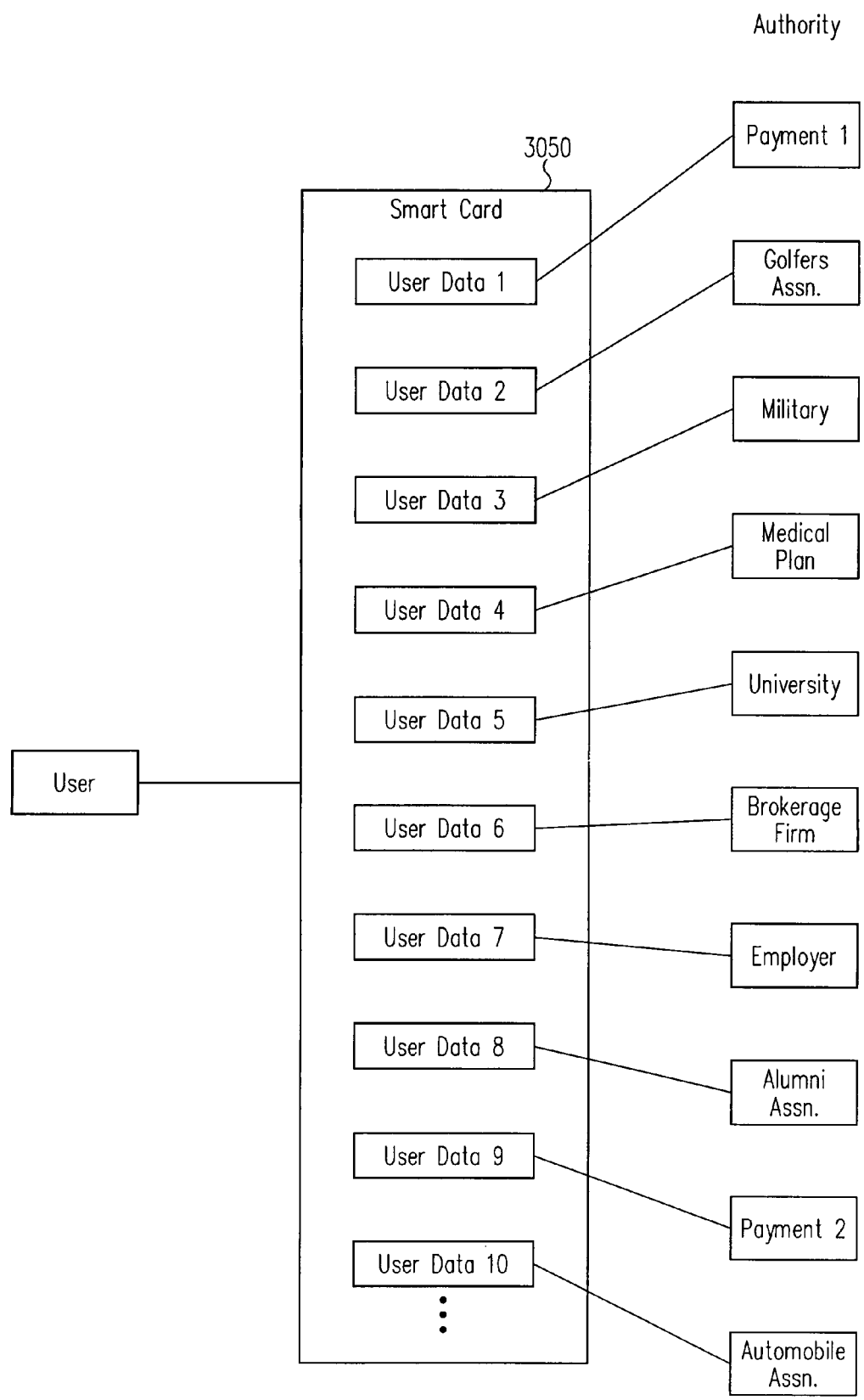
FIG. 30B is a block diagram that illustrates assigning multiple sets of user data for identities in accordance with one embodiment of the present invention.

Turning now to FIG. 30B a block diagram that illustrates assigning multiple sets of user data for identities in accordance with one embodiment of the present invention is presented. FIG. 31A is similar to FIG. 17, except a smart card 3050 is used for secure data storage (reference numeral 1702 of FIG. 17).

Figure 31:
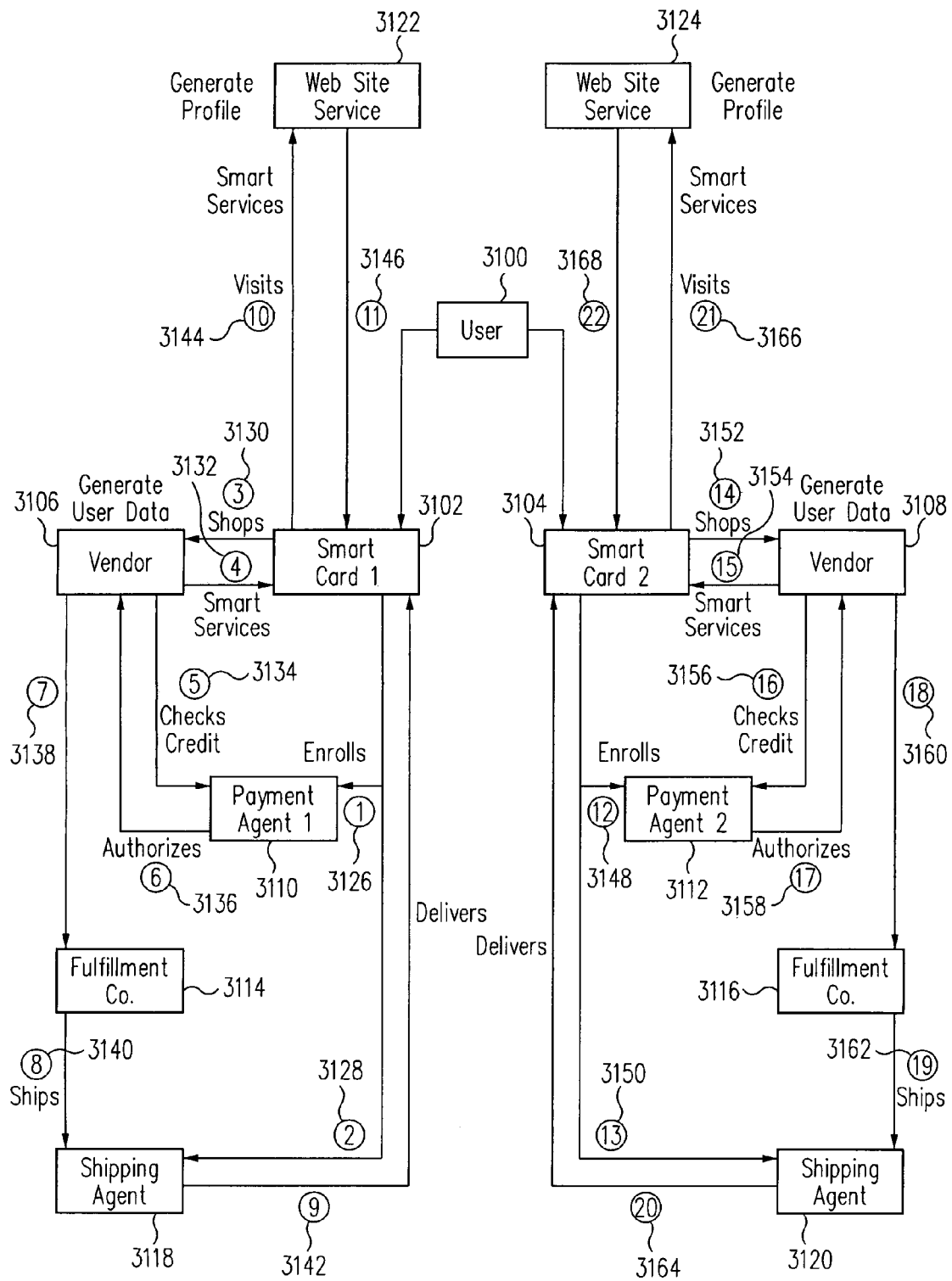
FIG. 31 is a block diagram that illustrates conducting transactions between multiple parties using a smart card on an open network while maintaining privacy in accordance with one embodiment of the present invention.

Turning now to FIG. 31, a block diagram that conducting transactions between multiple parties using a smart card on an open network while maintaining privacy in accordance with one embodiment of the present invention is presented. FIG. 31 is similar to FIG. 18, except a smart card (3102, 3104) is used for secure user data storage (reference numerals 1802 and 1804 of FIG. 18).

Figure 32:
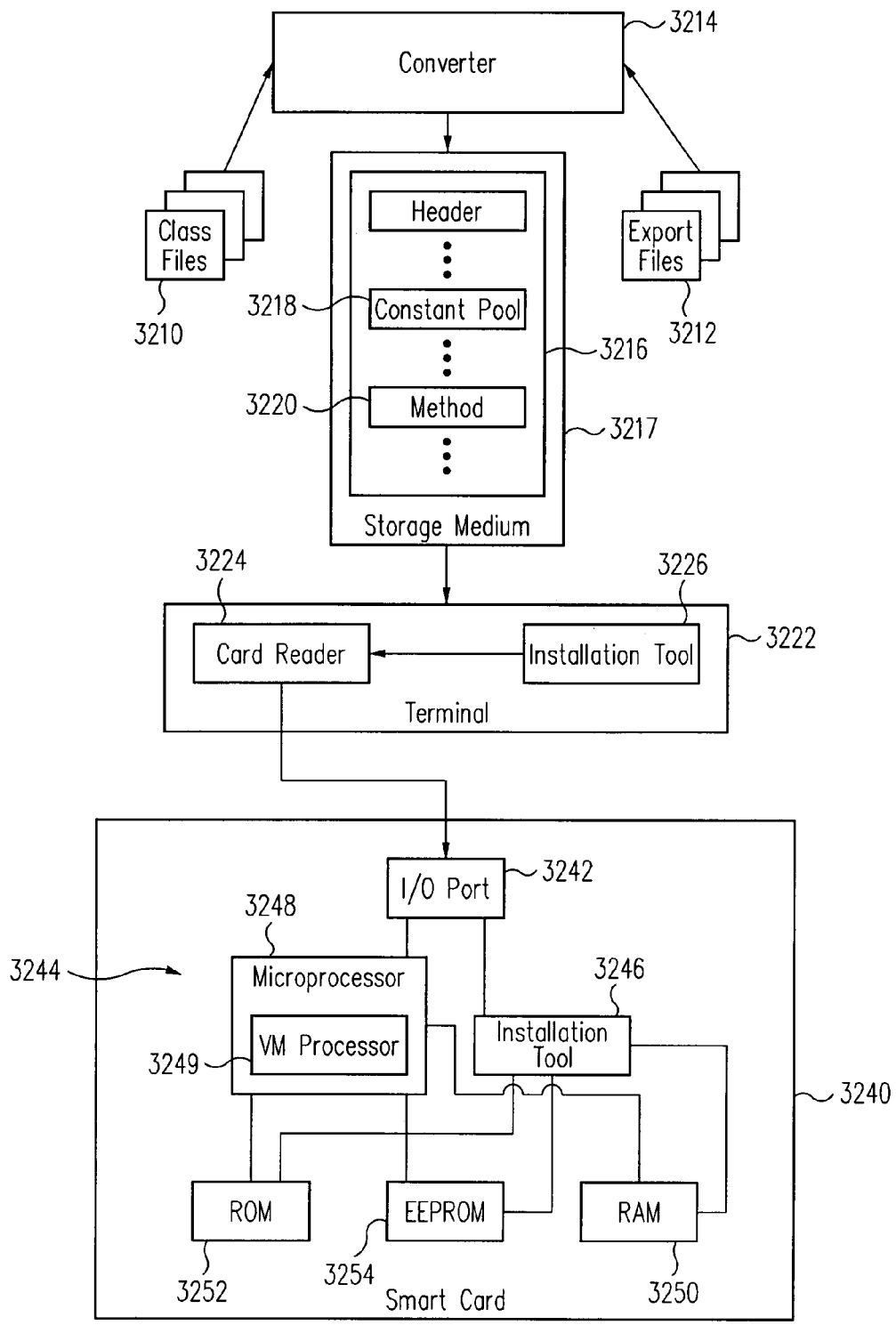
FIG. 32 is a block diagram that illustrates development of an applet as may be used to provide a secure user access control function for a resource-constrained device such as a smart card.

Turning now to FIG. 32, a block diagram that illustrates development of an applet as may be used to provide a secure user access control function for a resource-constrained device such as a smart card is presented. Development of an applet for a resource-constrained device such as a smart card 3240 begins in a manner similar to development of a Java™ program. In other words, a developer writes one or more Java™ classes and compiles the source code with a Java™ compiler to produce one or more class files 3210. The applet can be run, tested and debugged, for example, on a workstation using simulation tools to emulate the environment on the card 3240. When the applet is ready to be downloaded to the card 3240, the class files 3210 are converted to a converted applet (CAP) file 3216 by a converter 3214. The converter 3214 can be a Java™ application being executed by a desktop computer. The converter 3214 can accept as its input one or more export files 3212 in addition to the class files 3210 to be converted. An export file 3212 contains naming or linking information for the contents of other packages that are imported by the classes being converted.

In general, the CAP file 3216 includes all the classes and interfaces defined in a single Java™ package and is represented by a stream of 8-bit bytes. All 16-bit and 32-bit quantities are constructed by reading in two or four consecutive 8-bit bytes, respectively. Among other things, the CAP file 3216 includes a constant pool component (or "constant pool") 3218 which is packaged separately from a methods component 3220. The constant pool 3218 can include various types of constants including method and field references which are resolved either when the program is linked or downloaded to the smart card 3240 or at the time of execution by the smart card. The methods component 3220 specifies the application instructions to be downloaded to the smart card 3240 and subsequently executed by the smart card.

After conversion, the CAP file 3216 can be stored on a computer-readable medium 3217 such as a hard drive, a floppy disk, an optical storage medium, a flash device or some other suitable medium. Or the computer-readable medium can be in the form of a carrier wave, e.g., a network data transmission, or a radio frequency (RF) data link.

The CAP file 3216 then can be copied or transferred to a terminal 3222 such as a desktop computer with a peripheral card reader 3224. The card reader 3224 allows information to be written to and retrieved from the smart card 3240. The card reader 3224 includes a card port (not shown) into which the smart card 3240 can be inserted. Once inserted, contacts from a connector press against the surface connection area on the smart card 3240 to provide power and to permit communications with the smart card, although, in other implementations, contactless communications can be used. The terminal 3222 also includes an installation tool 3226 that loads the CAP file 3216 for transmission to the card 3240.

The smart card 3240 has an input/output (I/O) port 3242 that can include a set of contacts through which programs, data and other communications are provided. The card 3240 also includes an installation tool 3246 for receiving the contents of the CAP file 3216 and preparing the applet for execution on the card 3240. The installation tool 3246 can be implemented, for example, as a Java™ program and can be executed on the card 3240. The card 3240 also has memory, including volatile memory such as RAM 3250. The card 3240 also has ROM 3252 and non-volatile memory, such as EEPROM 3254. The applet prepared by the controller 3244 can be stored in the EEPROM 3254.

In one particular implementation, the applet is executed by a virtual machine 3249 running on a microprocessor 3248. The virtual machine 3249, which can be referred to as the Java Card™ virtual machine, need not load or manipulate the CAP file 3216. Rather, the Java Card™ virtual machine 3249 executes the applet code previously stored as part of the CAP file 3216. The division of functionality between the Java Card™ virtual machine 3249 and the installation tool 3246 allows both the virtual machine and the installation tool to be kept relatively small.

In general, implementations and applets written for a resource-constrained platform such as the smart card 3240 follow the standard rules for Java™ platform packages. The Java™ virtual machine and the Java™ programming language are described in T, Lindholm et al., The Java™ Virtual Machine Specification (1997), and K. Arnold et al., The Java™ Programming Language Second Edition, (1998). Application programming interface (API) classes for the smart card platform can be written as Java™ source files which include package designations, where a package includes a number of compilation units and has a unique name. Package mechanisms are used to identify and control access to classes, fields and methods. The Java Card™ API allows applications written for one Java Card™-enabled platform to run on any other Java Card™-enabled platform. Additionally, the Java Card™ API is compatible with formal international standards such as ISO 7816, and industry-specific standards such as Europay/MasterCard/Visa (EMV).

Although a virtual machine 3249 running on a microprocessor 3248 has been described as one implementation for executing the bytecodes on the smart card 3240, in alternative implementations, an application-specific integrated circuit (ASIC) or a combination of a hardware and firmware can be used instead.

Referring to FIG. 32, controller 3244 uses an installation tool 3246 for receiving the contents of the CAP file 3216 and preparing the applet to be executed by a processor 3248. The installation tool 3246 can be implemented, for example, as a Java™ program that has been suitably converted to execute on the smart card 3240. In the description below, it is assumed that the controller 3244 comprises a virtual machine program 3249 running on a microprocessor 3248. The virtual machine 3249 need not load or manipulate the CAP file 3216. Rather, the virtual machine 3249 executes the applet code in the Cap file 3216. The division of functionality between the virtual machine 3249 and the installation tool 3246 allows both the virtual machine and the installation tool to be kept relatively small. In alternative implementations, the controller 3244 can be hardwired, for example, as an application-specific integrated circuit (ASIC) or it can be implemented as a combination of a hardware and firmware.

Figure 33A:
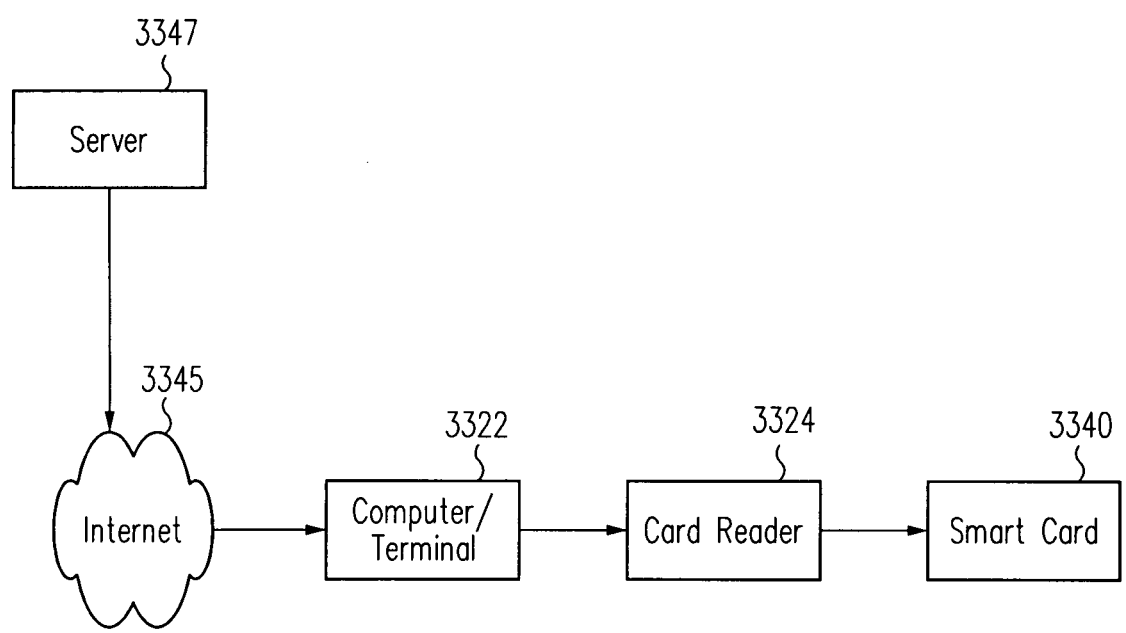
FIG. 33A is a block diagram that illustrates a computer connected to the Internet and equipped with a card reader for receiving a smart card.

As shown in FIG. 33A, a computer 3322 is equipped with a card reader 3324 for receiving the card 3240 of FIG. 32. The computer 3322 may be connected to a data communications network 3345 that communicates with a plurality of other computing devices, such as a server 3347. It is possible to load data and software onto a smart card over the data communications network 3345 using card equipped devices. Downloads of this nature can include applets or other programs to be loaded onto a smart card as well as profile data, digital cash and other information used in accordance with a variety of electronic commerce and other applications. The instructions and data used to control processing elements of the card reader and of the smart card may be stored in volatile or non-volatile memory or may be received directly over a communications link e.g., as a carrier wave containing the instructions and/or data. Further, for example, the network 3345 can be a LAN or a WAN such as the Internet or other network.

Figure 33B:
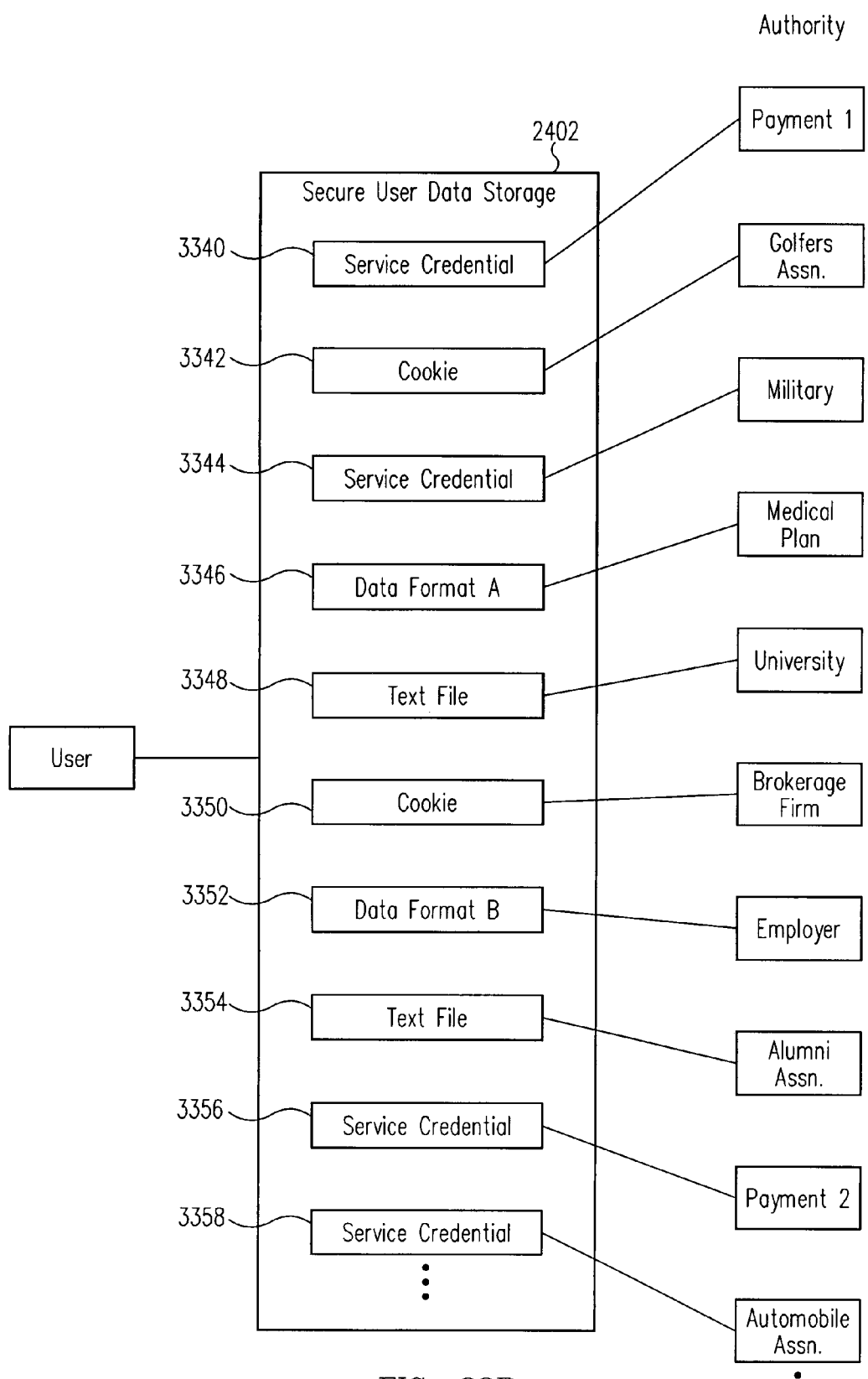
FIG. 33B is a block diagram that illustrates assigning various types of user data for identities in accordance with one embodiment of the present invention.

According to embodiments of the present invention, multiple user data formats may be used to store user data in the same secure user data storage device. As shown in FIG. 33B, secure user data storage device TBD uses five user data formats: service credential (3340, 3344, 3356, 3358), cookie (3342, 3350), data format A (3346), text file (3348, 3354) and data format B (3352). Those of ordinary skill in the art will recognize that other formats are possible.

FIG. 33B is a block diagram that illustrates assigning various types of user data for identities in accordance with one embodiment of the present invention.

Privacy-Protecting Logon Mechanisms

FIGS. 34-41 illustrate embodiments of the present invention that use a randomized user ID to protect a users identity on the World Wide Web.

For the purposes of this disclosure, the term "Randomized ID" refers to a pseudo-random identifier.

Figure 34:
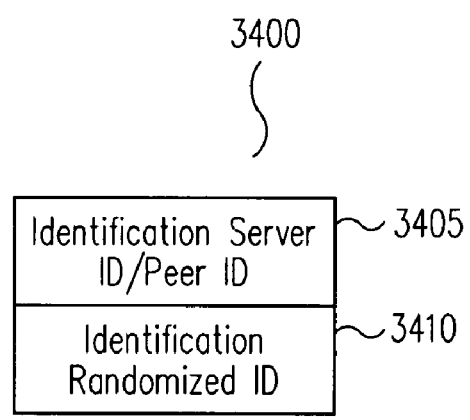
FIG. 34 is a block diagram that illustrates an identifier in accordance with one embodiment of the present invention.

Turning now to FIG. 34, a block diagram that illustrates an identifier in accordance with one embodiment of the present invention is presented. Identifier 3400 includes an identification server ID 3405 and a randomized ID 3410. The identification server ID 3405 identifies a collection of one or more federated identity servers, including one identity server containing additional information associated with the randomized ID 3410. According to embodiments of the present invention, the identification randomized ID 3410 is computed over data that is associated with the ID and that is stored in one of the federated identification servers. According to one embodiment of the present invention, the computation comprises using a cryptographic algorithm, in which case the ID 3410 comprises a cryptogram of the stored data as described previously with respect to reference numeral 915 of FIG. 9A and reference numeral 945 of FIG. 9B.

Figure 35:
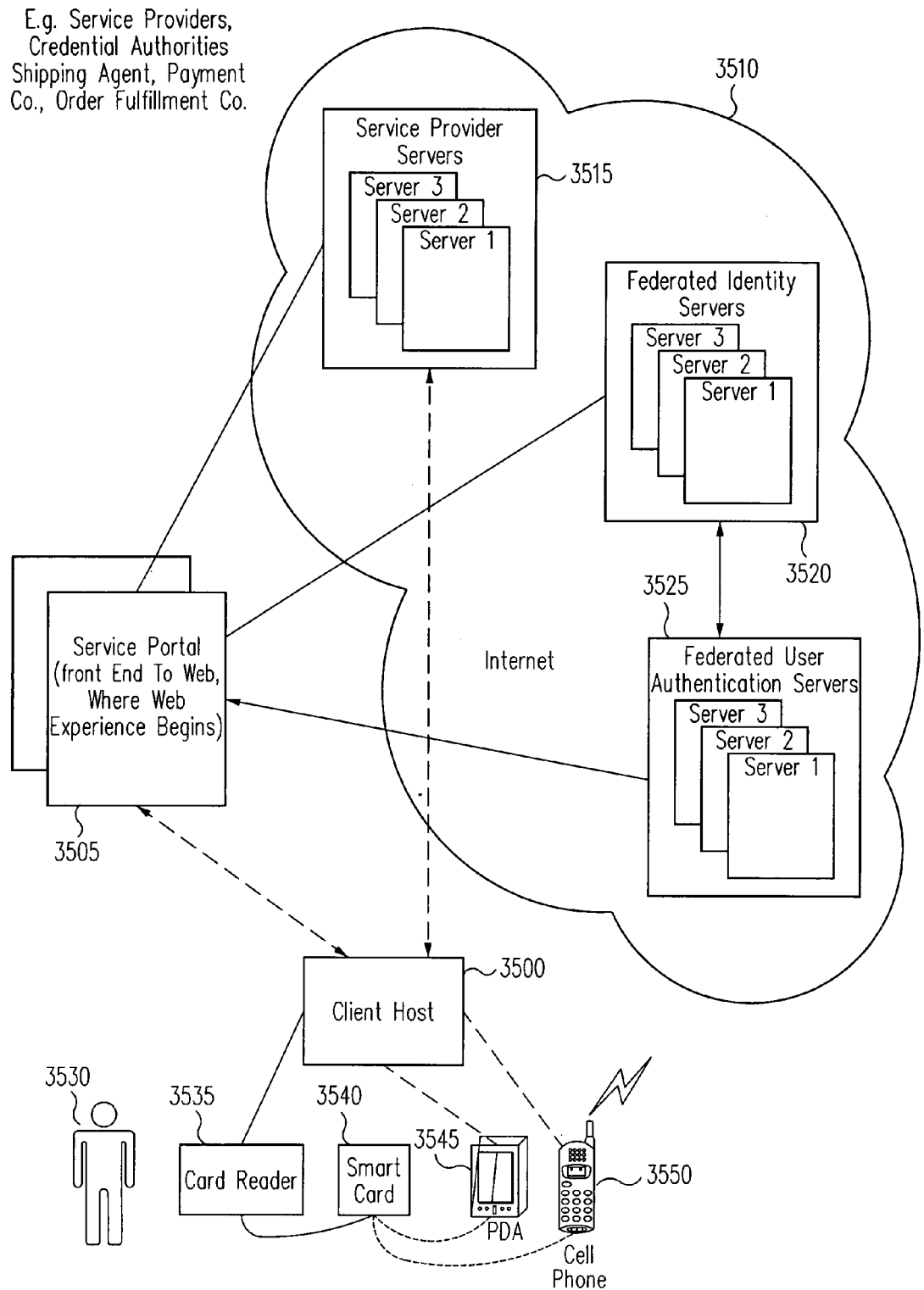
FIG. 35 is a block diagram that illustrates using federated identification servers and federated user authentication servers using a randomized user identifier to gain access to a service while maintaining privacy in accordance with one embodiment of the present invention.

Turning now to FIG. 35, a block diagram that illustrates using federated identification servers and federated user authentication servers using a randomized user identifier to gain access to a service while maintaining privacy in accordance with one embodiment of the present invention is presented. FIG. 35 illustrates two mechanisms by which a user 3530 uses a personal device (3540, 3545, 3550) connected to a client host 3500 to gain access to one or more service provider servers 3515. Both mechanisms use the randomized ID of FIG. 34 to identify a user, thus protecting user privacy. The first mechanism employs a portal 3505 in communication with the client host 3500. The portal performs identification and user authentication functions to enable connecting to a service provider 3515 via a personal device such as a smart card 3540, PDA 3545 or cell phone 3550. The second mechanism allows access to services either directly from a personal device (3540, 3545, 3550) or from a personal device (3540, 3545, 3550) via a client host 3500.

Client host 3500 comprises a terminal or kiosk capable of receiving user input and presenting user information. Client host 3500 provides a user interface to the Web. Client host 3500 may be configured with a card reader to accept a smart card.

Service portal 3505 includes a user interface such as a Web page tailored for starting the Web experience. The service portal 3505 is the place where a user obtains a logon credential. The logon credential may include a timestamp and an indication of the QoS of the user authentication performed. Service providers may require additional user authentication.

Service provider servers 3515 represent all Web servers accessible on the Web, which are referenced through the service portal 3505. Service provider servers 3505 comprise all the services accessible on the Web that do not have their own portal but require that the user be logged on. For the purposes of this disclosure, being "logged on" refers to the requirement for a particular server to process user-specific information such as a user profile in conjunction with rendering a service. For example, service provider servers 3515 may include credential authorities, shipping agents, payment agents, order fulfillment companies and the like. Therefore, service provider servers 3515 may be accessed by the user via the service portal 3505. One or more of the service provider servers 3515 may also be accessed directly using a credential that references a service provider server, either directly or via a nested credential.

Federated identity servers 3520 assert the truthfulness, accuracy and completeness of data to be stored according to the quality statements associated with the data. A QoS may be a reference to a policy statement that indicates the level of verification performed.

Federated user authentication servers 3525 perform user authentication services in a peer group fashion, such as in the Gnutella the peer-to-peer search protocol and JXTA™.

The PDA 3545 and cell phone 3550 may communicate with client host 3500 using protocols including Bluetooth™, IEEE 802.15 and Infrared Data Association (IrDA) Data standards including Fast Infrared (FIR) and Serial Infrared. Those of ordinary skill in the art will recognize that other protocols may be used as well.

The PDA 3545 and cell phone 3550 devices may be equipped with a card reader to accept an external smart card. If equipped with an external card reader and a communications link to a client host 3500 a PDA 3545 or cell phone 3550 may be used as a card reader 3535. Alternatively, the PDA 3545 and cell phone 3550 may be used without an external smart card. Additionally, cell phone 3550 may communicate directly with service provider servers 3515.

According to one embodiment of the present invention, client host 3500 maintains a list of preferred service portals. A connection via a service portal on the preferred list is attempted before connecting via another service portal.

Direct Access to Service Provider Servers

As mentioned previously, service provider servers require that a user be logged on. According to one embodiment of the present invention, the portal acts as an authority or single sign on service server in that it performs user authentication and creates an authenticated logon message. According to one embodiment of the present invention, the logon message comprises a credential as described with reference to FIGS. 9A and 9B. The logon credential is then returned to the user for subsequent use as a single-sign-on token. The user may store the single-sign-on token on a personal device such as a smart card, cell phone or PDA. The logon credential or single-sign-on token enables the user to directly access the service provider server. When needed for access to a server, the user activates access control on the PDA, smart card or cell phone and sends the single-sign-on token to the service provider server. The service provider server may require additional user authentication, depending upon the type of service requested.

Figure 36:
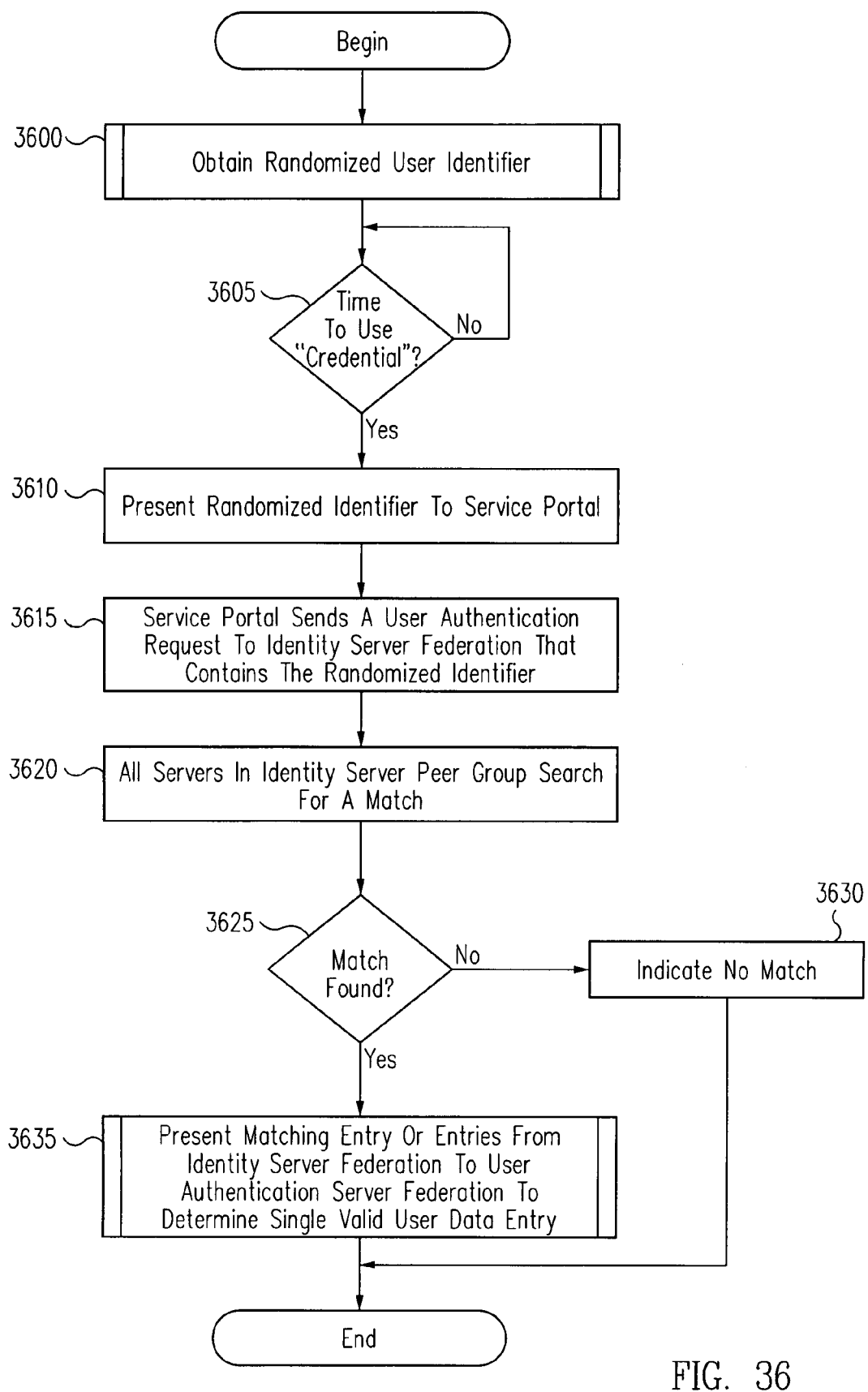
FIG. 36 is a flow diagram that illustrates a method for using federated identification servers and federated user authentication servers using a randomized user identifier to gain access to a service while maintaining privacy in accordance with one embodiment of the present invention.

Turning now to FIG. 36, a flow diagram that illustrates a method for using federated identification servers and federated user authentication servers using a randomized user identifier to gain access to a service while maintaining privacy in accordance with one embodiment of the present invention is presented. At 3600, a randomized user identifier is obtained. At 3605, a determination is made regarding whether it is time to use the credential. When it is time to use the credential, at 3610 the randomized ID is presented to a service portal. At 3615, a service portal sends a user authentication request to the identity server federation that contains the randomized identifier. At 3620, all servers in the identity server peer group search for a match with the randomized identifier. At 3625, a determination is made regarding whether a match was found. If there is no match, an indication is made at 3630. If there is a match, at 3635 matching entries from the identity server federation are presented to a user authentication server federation to determine a single valid user data entry. Depending upon the amount of user authentication required and the capabilities of each user authentication server, multiple user authentication servers may cooperate in providing the required user authentication.

According to one embodiment of the present invention, the federated identity peer group is comprised of sub-groups and each sub-group is assigned a priority value. A randomized ID is searched for according to sub-group priority. The sub-group having the highest priority searches for a randomized ID first. If the randomized ID is not found, the sub-group having the next-highest priority value performs the search.

Figure 37:
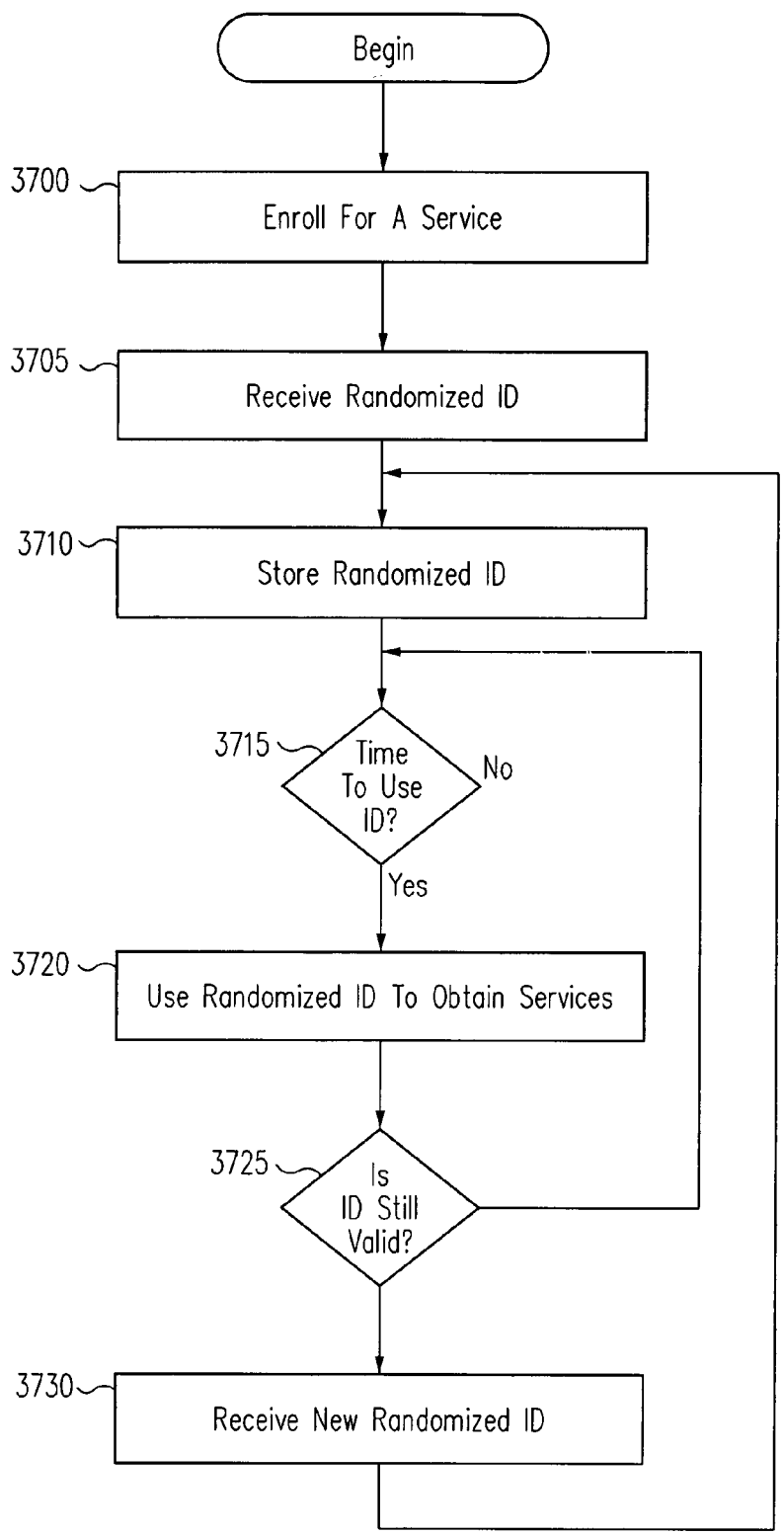
FIG. 37 is a flow diagram that illustrates a method for using federated identification servers and federated user authentication servers using a randomized user identifier to gain access to a service while maintaining privacy in accordance with one embodiment of the present invention.

Turning now to FIG. 37, a flow diagram that illustrates a method for using federated identification servers and federated user authentication servers using a randomized user identifier to gain access to a service while maintaining privacy in accordance with one embodiment of the present invention is presented. At 3700, a user enrolls for a service. At 3705, a randomized ID is received in response to the enrolling. According to one embodiment of the present invention, a printed randomized ID is received. According to another embodiment of the present invention, a barcode representing the randomized ID is received. At 3710, the randomized ID is stored. At 3715, a determination is made regarding whether it is time to use the ID. When it is time to use the ID, at 3720 the randomized ID is used to obtain services.

A policy between the randomized ID creator and the randomized ID user determines whether a randomized ID is valid. According to one embodiment of the present invention, the randomized ID is valid for a predetermined amount of time. According to another embodiment of the present invention, the randomized ID is valid for a predetermined number of uses. In other words, the ID may be used for a predetermined number of times before it becomes invalid. Those of ordinary skill in the art will recognize that other ID validity mechanisms are possible.

Referring again to FIG. 37, at 3725 a determination is made regarding whether the ID is still valid. If the ID is still valid, the ID is used beginning at 3715. If the ID is in the form of a barcode, it is used by scanning the barcode. If the ID is stored in a personal device such as a cell phone, PDA or smart card, the number is communicated from the personal device to the service provider Web server. If the ID is no longer valid, a new ID is received at 3720 and it is used to obtain a service beginning at 3710.

Figure 38:
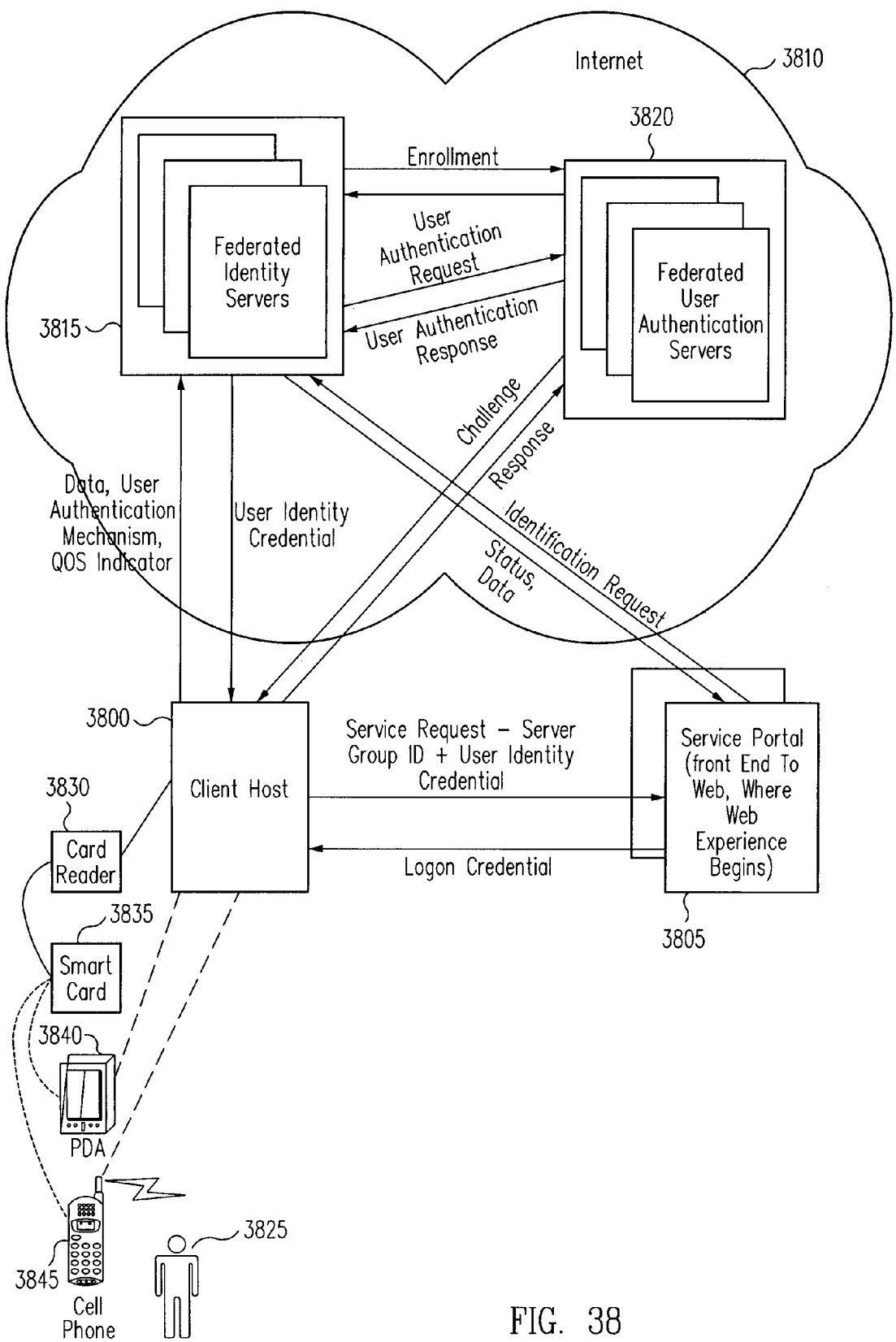
FIG. 38 is a block diagram that illustrates enrolling with an identity server in accordance with one embodiment of the present invention.

Turning now to FIG. 38, a block diagram that illustrates enrolling with an identity server in accordance with one embodiment of the present invention is presented. At 3850, user 3825 communicates a user identity credential request to federated identity servers 3815, using either the client host 3800 directly, or by using the client host 3800 via a personal device such as a smart card 3835, PDA 3840 or cell phone 3845. The user includes in the user identity credential request 3850 data to be stored. The request may also include a preferred user authentication mechanism and a quality of service (QoS) indicator. Federated identity servers 3815 verify the truthfulness, accuracy and completeness of the data to be stored according to the QoS indicator. The verification may include data authentication as described above. The verification may also include user authentication.

Once the federated identifier servers 3815 have verified the data, the federated identity servers 3815 enroll the user in one of the federated user authentication services that may be requested to perform one or more specific user authentication procedures to authenticate the user in a future logon request. At 3855, the federated identity servers 3815 return a user identity credential to the user 3825 via client host 3800.

Before user 3825 uses service portal 3805 to obtain services on the Web, the user 3825 must be authenticated. This is accomplished by using the user identity credential and authenticated data in it. This may result in a service credential. User 3825 issues a service request, including a server group ID and the user identity credential. The service portal 3805 passes the identity credential to the federated identity server group indicated by the server group ID to authenticate the user. The federated identity servers 3815 may delegate some or all user authentication tasks to federated user authentication servers 3820.

According to one embodiment of the present invention, user authentication includes issuing a challenge to a user's personal device (3835, 3840, 3845) directly from a federated user authentication server 3820. According to one embodiment of the present invention, user authentication includes issuing a challenge from a federated user authentication server 3820 to a user's personal device (3835, 3840, 3845) via a client host 3800.

According to one embodiment of the present invention, a response to a challenge is communicated directly to the federated user authentication server 3820 that issued the challenge. According to another embodiment of the present invention, a response to a challenge is communicated via a client host 3800 to the federated user authentication server 3820 that issued the challenge. According to one embodiment of the present invention, the response to the challenge is cryptographically processed by a cell phone, smart card, PDA.

Once the user is authenticated, service portal 3805 returns a logon credential to the client 3825 via client host 3800. The user may use the logon credential to obtain services from service providers that are accessible via the service portal 3805.

Figure 39:
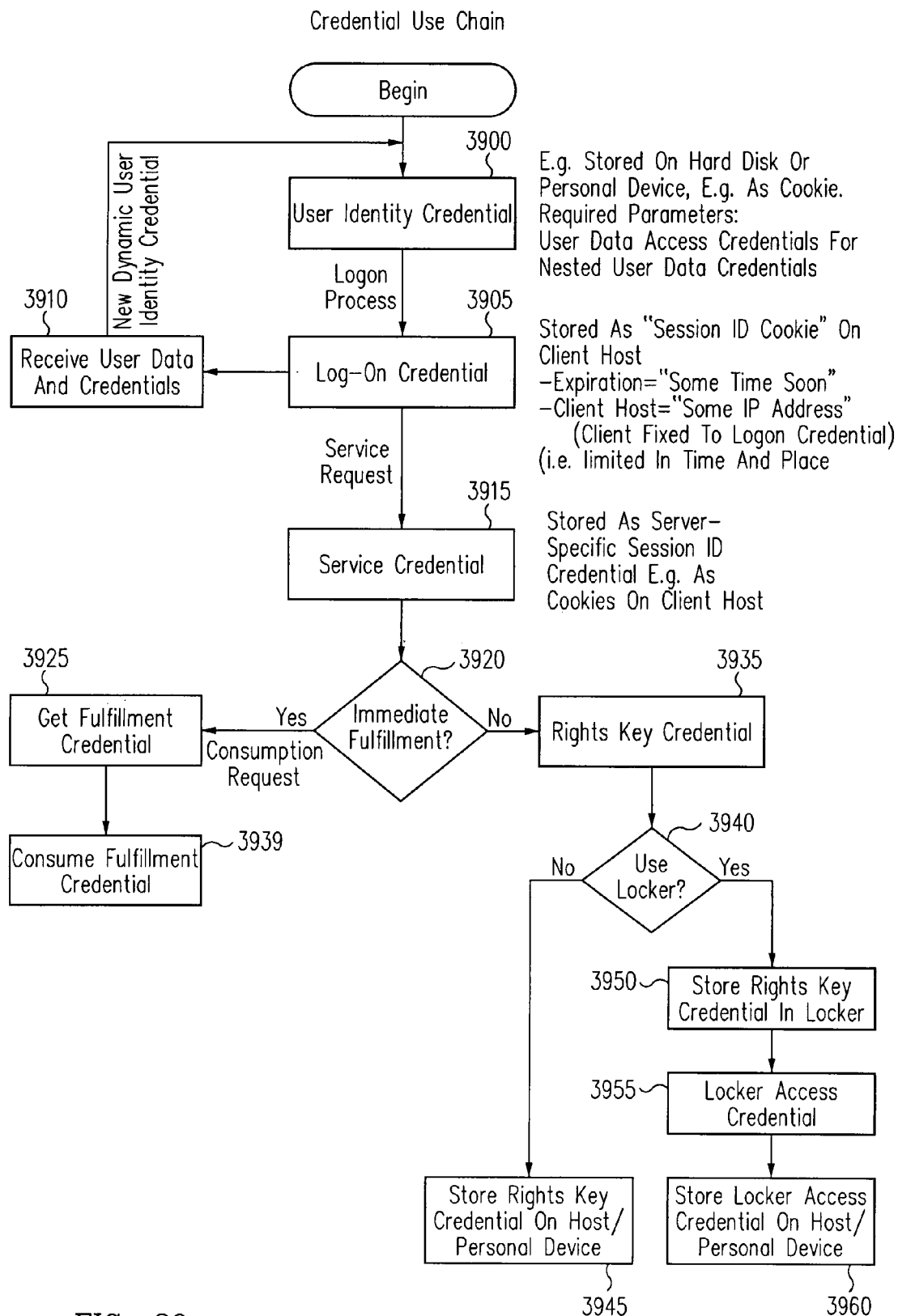
FIG. 39 is a block diagram that illustrates possible credential types in accordance with one embodiment of the present invention.

Turning now to FIG. 39, a block diagram that illustrates possible credential types in accordance with one embodiment of the present invention is presented. Reference numeral 3900 represents creating a user identity credential. A user identity credential comprises a randomized ID and the ID of an identification authority.

A user identity credential indicates a user has enrolled for single-sign-on services provided by a federation of user identity servers. Creating a user identity credential was described above with respect to FIG. 38.

Once a user identity credential is obtained, a user may then perform a logon process to create a logon credential 3905. A logon credential 3905 may be stored as "Session ID cookie" on a client host. A logon credential 3905 includes an indication of when the logon credential will expire, and the client host IP address or any other unique identifier, thus fixing a particular client host to a logon credential and the user represented by the credential. A logon credential is thus limited in time and place. Creating a logon credential was described above with respect to FIG. 38.

A logon credential indicates a user is logged in through a particular client host at a particular place. This enables secure delivery of proprietary or paid for information, or other content that must be delivered to the correct device. A logon credential may be stored on a client host because it is only valid when a user is working on that client host.

A new dynamic user identity credential 3900 may be obtained in the process of obtaining the logon credential 3905. It may be updated with additional user data and credentials 3910 in a reenrollment process. Alternatively, the logon credential 3905 may be used to create a service credential.

A service credential is a one-time token for a session with a specific server that may be obtained by applying a logon credential when accessing a service, while a logon credential may be used for multiple simultaneous sessions for multiple service providers. A service provider creates a service credential for its own use. A service credential may be applied to obtain further specific services, either for immediate use or fulfillment, or for postponed use or fulfillment. If the service credential is applied for immediate use of a service, a fulfillment credential 3925 may be dynamically created to satisfy the requested use. Reference numeral 3939 represents the consumption or use of the fulfillment credential, after which time the fulfillment credential can no longer be used and can be discarded.

If the service credential is applied to a service for later use, a rights key credential 3935 may be created. The entire rights key credential may be stored on a secure client host or personal device. Alternatively, the rights key credential may be stored in a locker 3950 and a locker access credential is created 3955 and then stored 3960 on a secure host or personal access device. In other words, the first method stores the entire rights key credential on a secure device, while the second method stores or locks the entire rights key on a resource server somewhere on the Web, and stores a key to the rights key on a secure device. A Locker access credential is a special rights key credential, where the resources protected by the rights key are other credentials.

An exemplary use of a locker mechanism is as follows: A user shops a vendor Web site and purchases the rights to listen to a selection of music tracks for a year. A set of rights key credentials is used to store the rights purchased by the user and the rights keys are used later to access the resource(s) directly.

According to another embodiment of the present invention, any of the logon credential, service credential and fulfillment credential are cookies.

The process described with respect to FIG. 39 is not intended to be limiting in any way. Those of ordinary skill in the art will recognize that other credentials may be created for other purposes. Furthermore, credentials may be created using a sequence other than that shown in FIG. 39.

Figure 40:
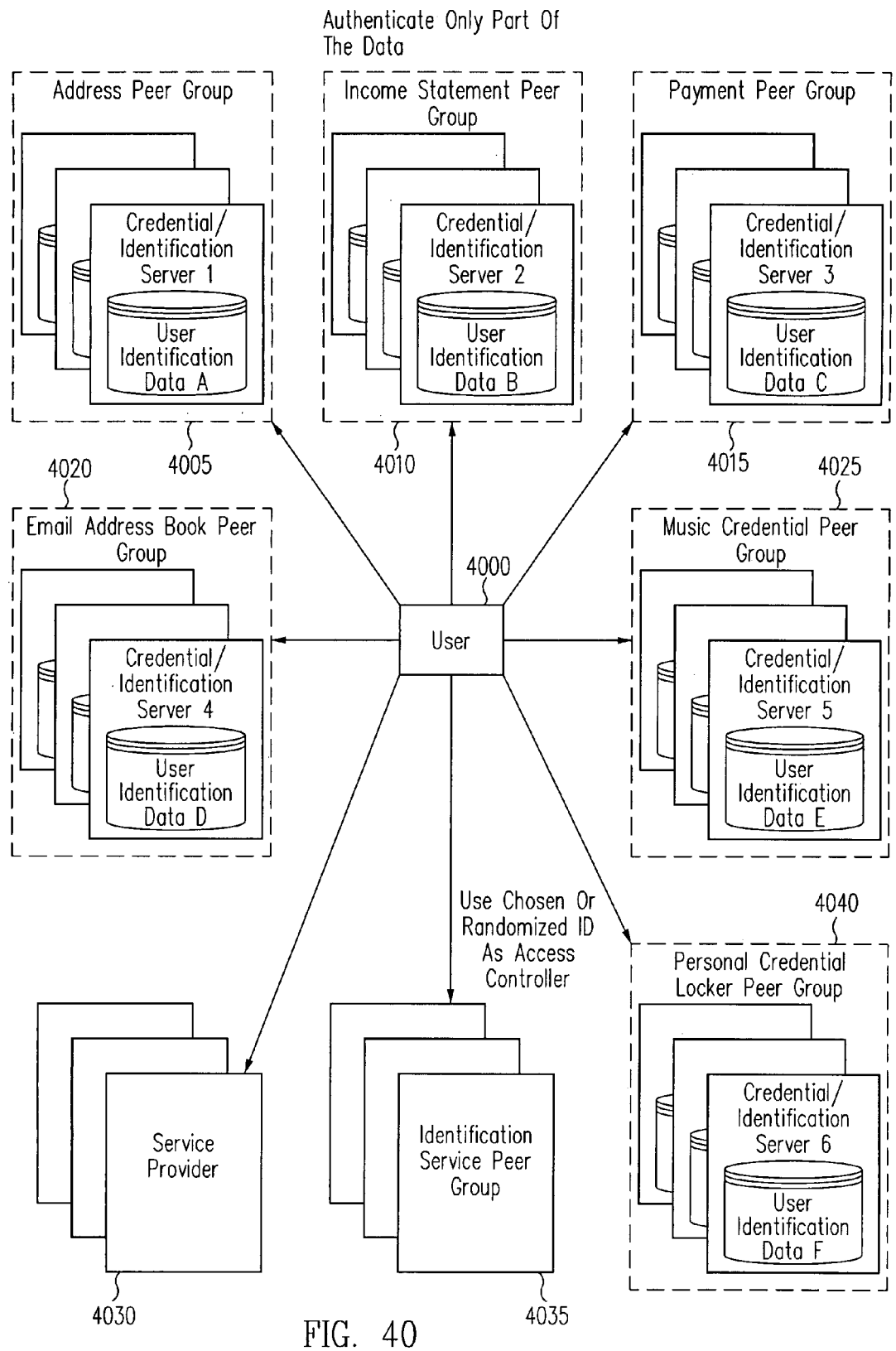
FIG. 40 is a block diagram that illustrates using a randomized identifier for access to distributed resources while maintaining privacy in accordance with one embodiment of the present invention.

Turning now to FIG. 40, a block diagram that illustrates using a randomized identifier for access to distributed resources while maintaining privacy in accordance with one embodiment of the present invention is presented. As shown in FIG. 40, user data is distributed among multiple places. Access to resources owned by a user is protected by one or more credentials. A credential includes a randomized ID, revealing nothing about the identity of the recipient. This search and match operation completely hides the identity of entity accessing the data, thus preventing leaking information about the identity of the user opening or gaining access to the resource. Furthermore, having data distributed over several peer groups ensures privacy because no single entity can actually use the information each of these groups stores.

According to embodiments of the present invention, a user authentication server federation performs user authentication on matching entries from an identity server federation. The user authentication server federation performs a sufficient level of user authentication to support the required QoS. The user authentication may receive a credential supporting a first QoS, perform additional user authentication and then return a credential supporting a higher level QoS.

Figure 41:
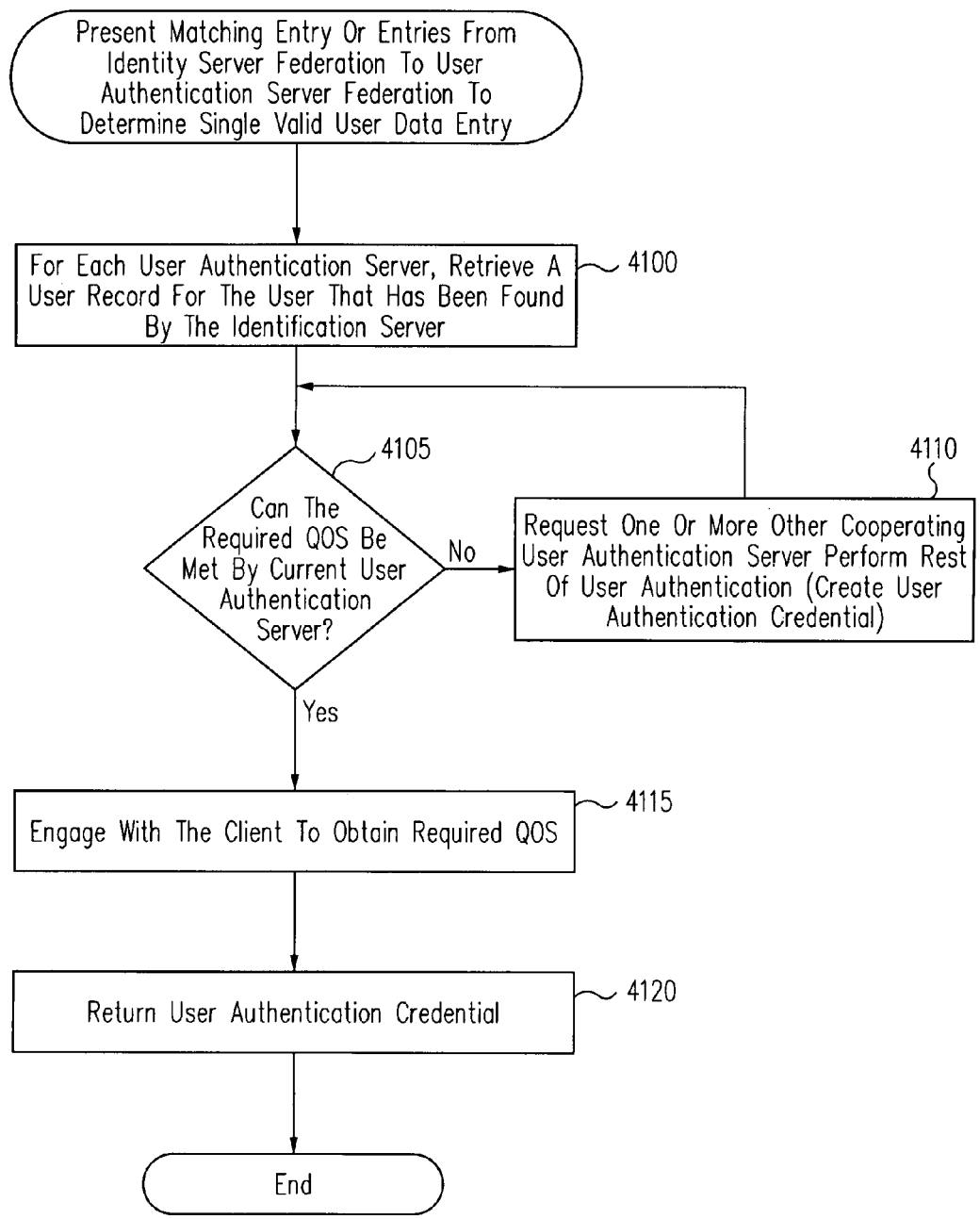
FIG. 41 is a flow diagram that illustrates a method for presenting a matching entry or entries from an identity server federation to a user authentication server federation to determine a single valid user data entry in accordance with one embodiment of the present invention.

Turning now to FIG. 41, a flow diagram that illustrates a method for presenting a matching entry or entries from an identity server federation to a user authentication server federation to determine a single valid user data entry in accordance with one embodiment of the present invention is presented. FIG. 41 provides more detail for reference numeral 3635 of FIG. 36. At 4100, for each user authentication server, a user record for the user that has been found by the identification server is retrieved. At 4105, a determination is made regarding whether the required QoS for user authentication can be met by the current user authentication server. If the current user authentication server cannot meet the required QoS, at 4110 a request is made for one or more other cooperating user authentication servers to perform additional user authentication. If the current user authentication server can meet the required QoS, at 4115 the client is engaged with using a challenge-response protocol or other protocol to obtain the required QoS. In this context, the term "QoS" is an indication of how much effort has been made by the user authentication servers working together to establish that the user is actually present at a terminal and intent on proceeding with the service request such as, by way of example, a purchase transaction. At 4120, the user authentication credential is returned.

According to one embodiment of the present invention, user authentication includes determining a cell phone number for a user and issuing a user authentication challenge to the user via the cell phone. The user authentication challenge may be, by way of example, a password challenge.

According to another embodiment of the present invention, user authentication includes the use of biometrics such as a retinal scan or fingerprint.

According to another embodiment of the present invention, user authentication includes asking a smart card to engage in a cryptographic protocol to confirm that the user has entered a PIN number for the card.

According to another embodiment of the present invention, the user authentication includes asking a smart card to engage in a protocol to authenticate a user using biometrics stored on the card.

According to another embodiment of the present invention, an encrypted PIN pad is used to enter a PIN number for the card.

According to another embodiment of the present invention, user authentication includes a combination of password/PIN and biometrics.

According to another embodiment of the present invention, the user authentication server federation includes at least one user authentication server that is specialized to perform a single type of user authentication. Having separate user authentication servers that perform different functions enhances privacy because the data about an individual is spread among multiple servers.

FIGS. 42A-46C illustrate embodiments of the present invention that use one or more credential to access data.

Figure 42A:
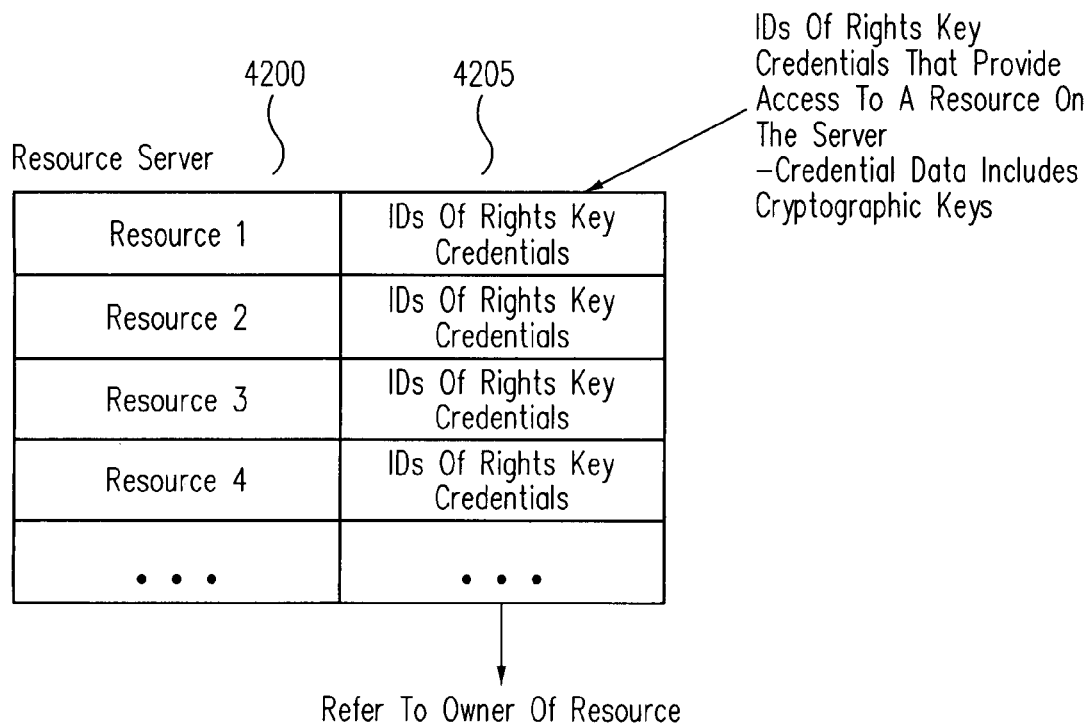
FIG. 42A is a block diagram that illustrates data stored in a resource server in accordance with one embodiment of the present invention.

Turning now to FIG. 42A, a block diagram that illustrates data stored in a resource server in accordance with one embodiment of the present invention is presented. As shown in FIG. 42A, a resource server stores resources 4200 and associated rights key credential identifiers. A resource may be, by way of example, access to a Web page or audio track. Each rights key credential includes one or more cryptographic keys that allow access to the associated resource. Thus, the identifiers 4205 are identifiers of credentials that give access to a resource.

When a user wants to use a resource, the user presents a rights key credential and a request for a resource to a resource server. The resource server finds a resource matching the rights key credential. Rights keys in the credential are used to open or gain access to the resource.

According to one embodiment of the present invention, the entire rights key credential is stored on a secure device. According to another embodiment of the present invention, the credential ID is stored in a secure device and the rest of the rights key credential is stored separately.

One example of a use of this embodiment is where the resource is requested by a third party (such as a merchant accessing user data) that is not the owner but has permission of the owner to access the resource. In this case, it is possible that when the resource owner enrolls, the resource owner may authorize the third party to access the owner's credential and copy it into the third party's credential mechanism, thus providing the third party with indirect access to the resource protected by the credential. A second rights key ID may be associated with the resource referring to the rights key credential held by the owning user.

Figure 42B:
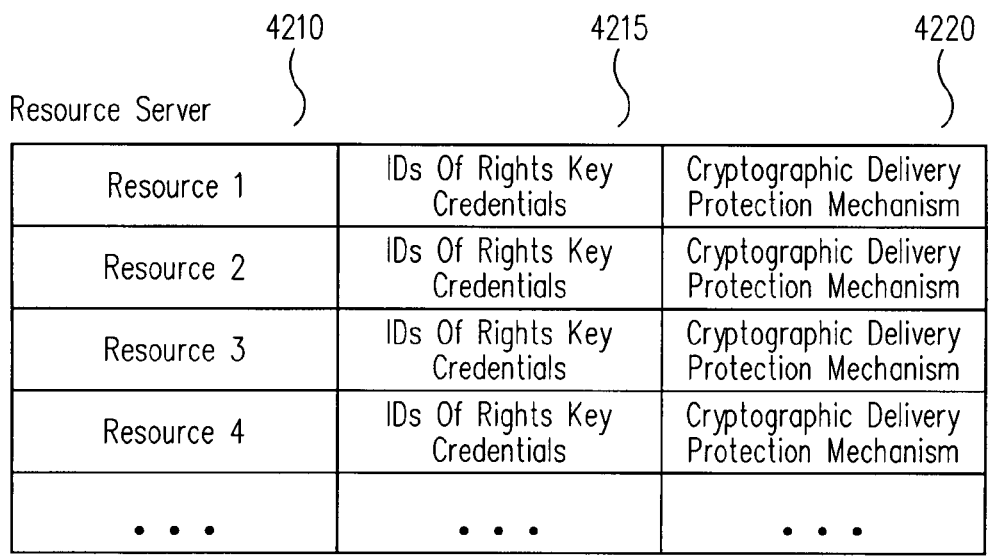
FIG. 42B is a block diagram that illustrates data stored in a resource server in accordance with one embodiment of the present invention.

Turning now to FIG. 42B, a block diagram that illustrates data stored in a resource server in accordance with one embodiment of the present invention is presented. FIG. 42 is similar to FIG. 42A, except that FIG. 42B includes references to one or more cryptographic protection mechanism 4220 that are available for use to provide a cryptographic protection when delivering the resource content to the user.

Figure 43A:
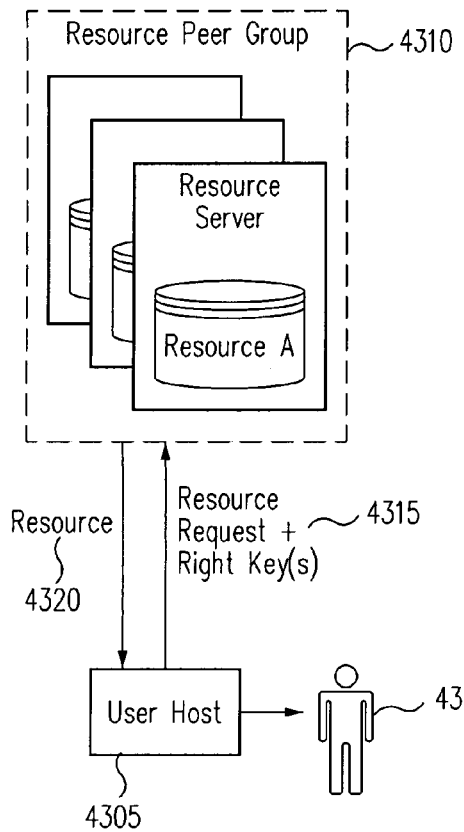
FIG. 43A is a block diagram that illustrates obtaining a resource from a resource server in response to a resource request including a set of rights keys in accordance with one embodiment of the present invention.

Turning now to FIG. 43A, a block diagram that illustrates obtaining a resource from a resource server in response to a resource request including a set of rights keys in accordance with one embodiment of the present invention is presented.

Figure 43B:
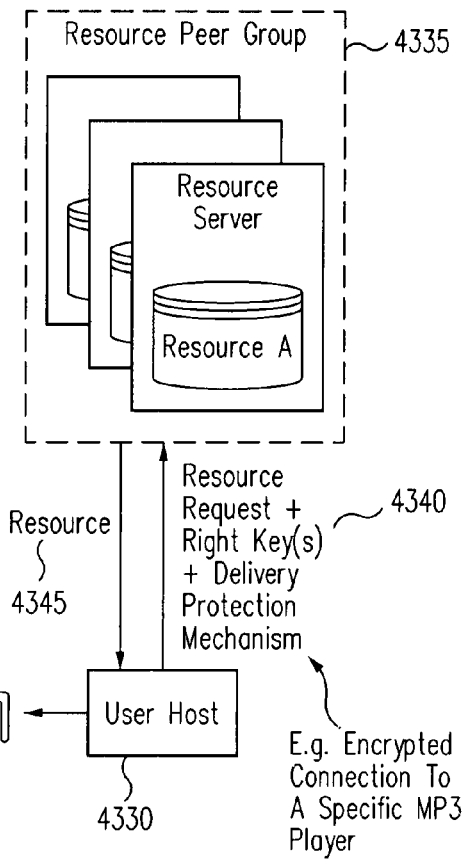
FIG. 43B is a block diagram that illustrates obtaining a resource from a resource server in response to a resource request including a set of rights keys and a reference to a delivery protection mechanism and optionally a target device in accordance with one embodiment of the present invention.

Turning now to FIG. 43B, a block diagram that illustrates obtaining a resource from a resource server in response to a resource request including a set of rights keys and a reference to a delivery protection mechanism and optionally a target device in accordance with one embodiment of the present invention is presented. According to this embodiment, resources are delivered to the client host or the optionally provided target device under protection of the referenced cryptographic mechanism.

Figure 43C:
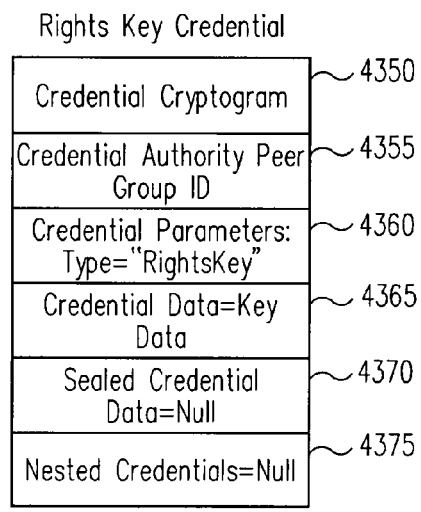
FIG. 43C is a block diagram that illustrates a rights key credential in accordance with one embodiment of the present invention.

Turning now to FIG. 43C, a block diagram that illustrates a rights key credential in accordance with one embodiment of the present invention is presented. The credential data field 4365 and the sealed credential data field 4370 include cryptographic key data. Public keys may be stored in the credential data field 4365, while secret keys are stored in the sealed credential data field 4370. Nested credentials 4375 may refer to credentials that relate to a resource delivery mechanism. For example, a user with a credential that entitles the user to play an MP3 file may indicate a connection should be made directly with a client device such as an MP3 player via an infrared connection to a client host. This increases user control over the use of remotely-stored resources.

Figure 44:
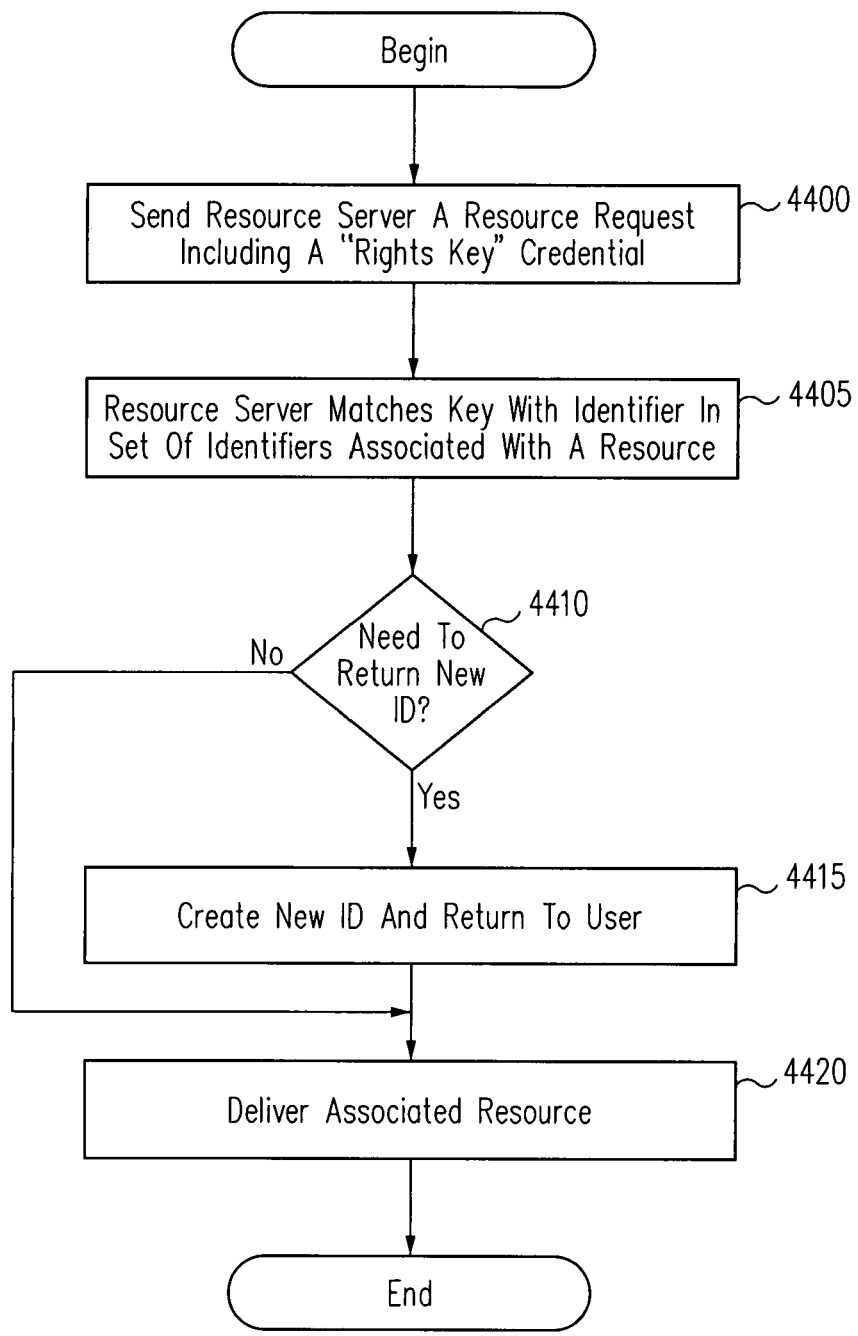
FIG. 44 is a flow diagram that illustrates a method for obtaining access to a resource in accordance with one embodiment of the present invention.

Turning now to FIG. 44, a flow diagram that illustrates a method for obtaining access to a resource in accordance with one embodiment of the present invention is presented. At 4400, a resource server is sent a resource request that includes a rights key credential. At 4405, the resource server matches the key with an identifier in a set of identifiers associated with a resource. At 4410, a determination is made regarding whether a new ID must be created. If a new ID must be created, it is created at 4415. If in this case, the ID is returned to the user. At 4420, the resource found at 4405 is returned.

Figure 45:
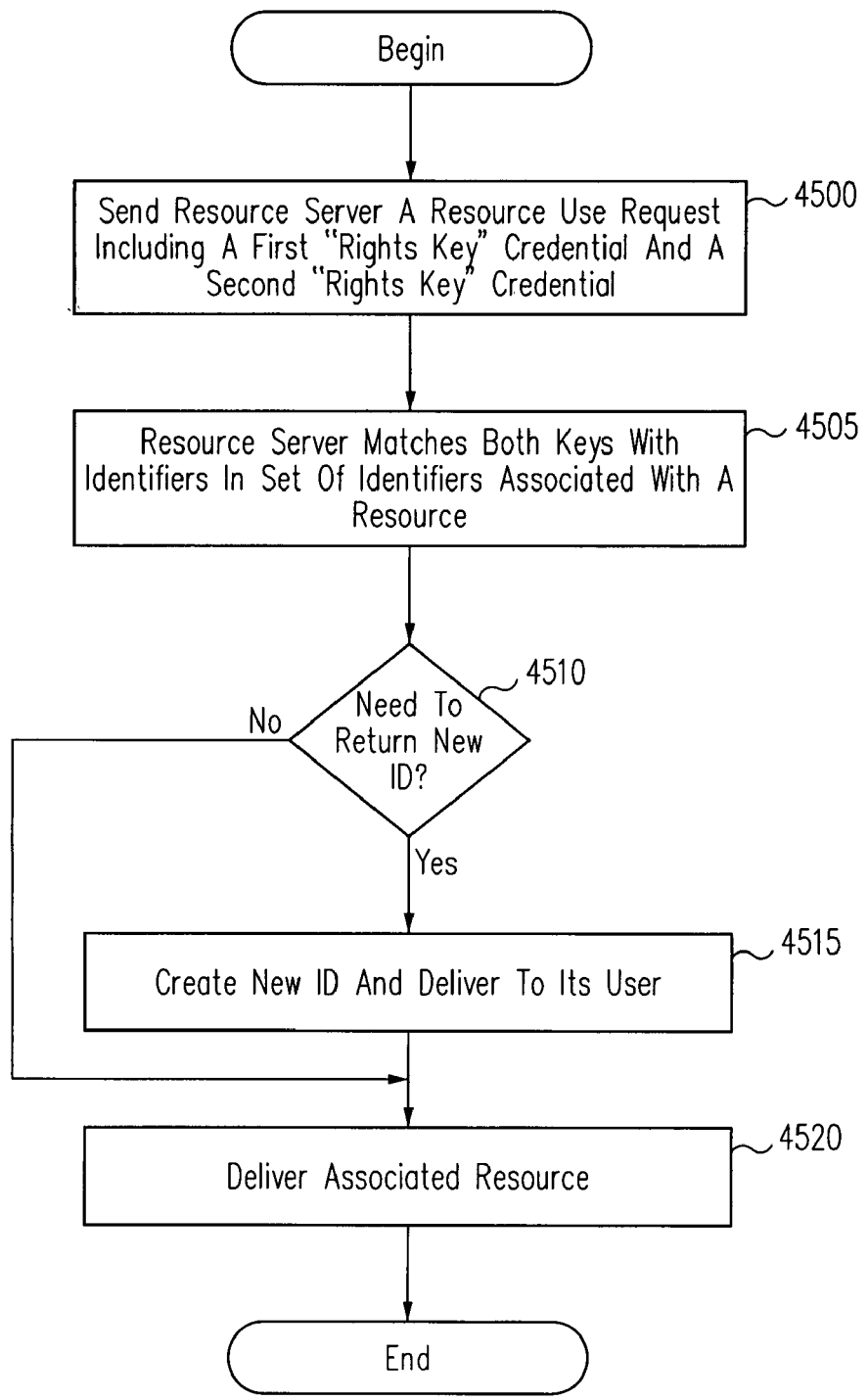
FIG. 45 is a flow diagram that illustrates a method for obtaining access to a resource requiring multiple keys in accordance with one embodiment of the present invention.

Turning now to FIG. 45, a flow diagram that illustrates a method for obtaining access to a resource requiring multiple keys in accordance with one embodiment of the present invention is presented. Multiple keys may be used, by way of example, when the owner of a resource and the entity requesting the resource are different entities. At 4500, a resource server is sent a resource request that includes a first rights key credential and a second rights key credential. At 4505, the resource server matches both keys with identifiers in a set of identifiers associated with a resource. At 4510, a determination is made regarding whether a new ID must be created. None, one or both of the IDs may need to be created. If a new ID must be created, it is created at 4515. At 4520, the resource found at 4505 is returned.

Figure 46A:
FIG. 46A is a block diagram that illustrates a Universal Resource Locator (URL) that includes a rights key credential to access a specific kind of resource stored on a server in a resource server peer group in accordance with one embodiment of the present invention.

FIG. 46A is a block diagram that illustrates a Universal Resource Locator (URL) that includes a rights key credential to access a specific kind of resource stored on a server in a resource server peer group in accordance with one embodiment of the present invention. As shown in FIG. 46A, the URL 4600 includes a resource server peer group 4620, a resource directory for a particular type of resource 4625, and the rights key for the resource 4630.

Figure 46B:
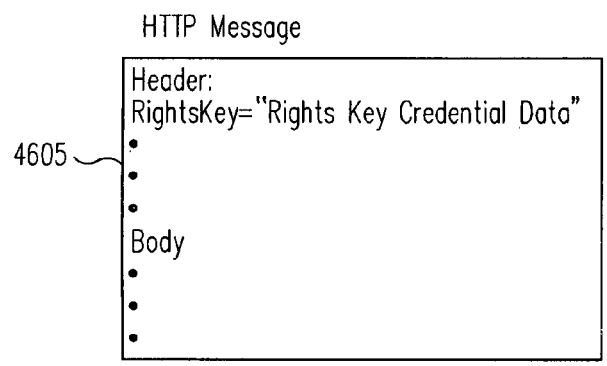
FIG. 46B is a block diagram that illustrates a Hypertext Transfer Protocol (HTTP) message that includes rights key credential data in accordance with one embodiment of the present invention.

FIG. 46B is a block diagram that illustrates a Hypertext Transfer Protocol (HTTP) message that includes rights key credential data in accordance with one embodiment of the present invention.

Figure 46C:
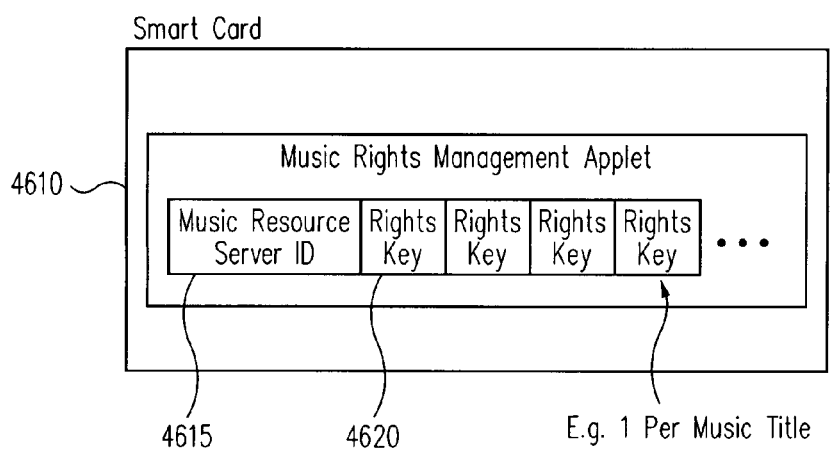
FIG. 46C is a block diagram that illustrates a smart card that includes a rights management applet in accordance with one embodiment of the present invention.

FIG. 46C is a block diagram that illustrates a smart card that includes a rights management applet in accordance with one embodiment of the present invention.

Figure 46D:
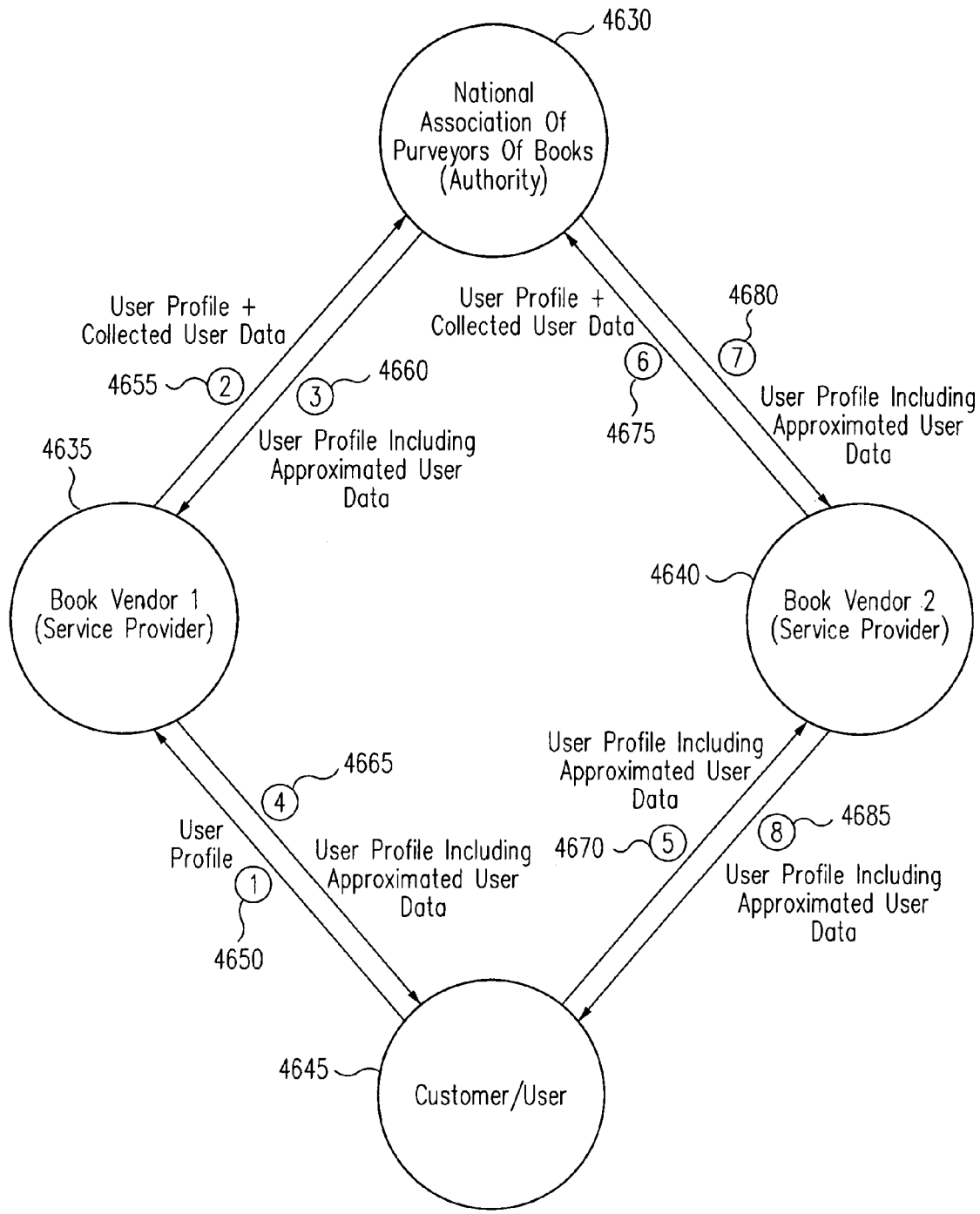
FIG. 46D is a block diagram that illustrates dynamic aggregation of user data in accordance with one embodiment of the present invention.
Figure 47:
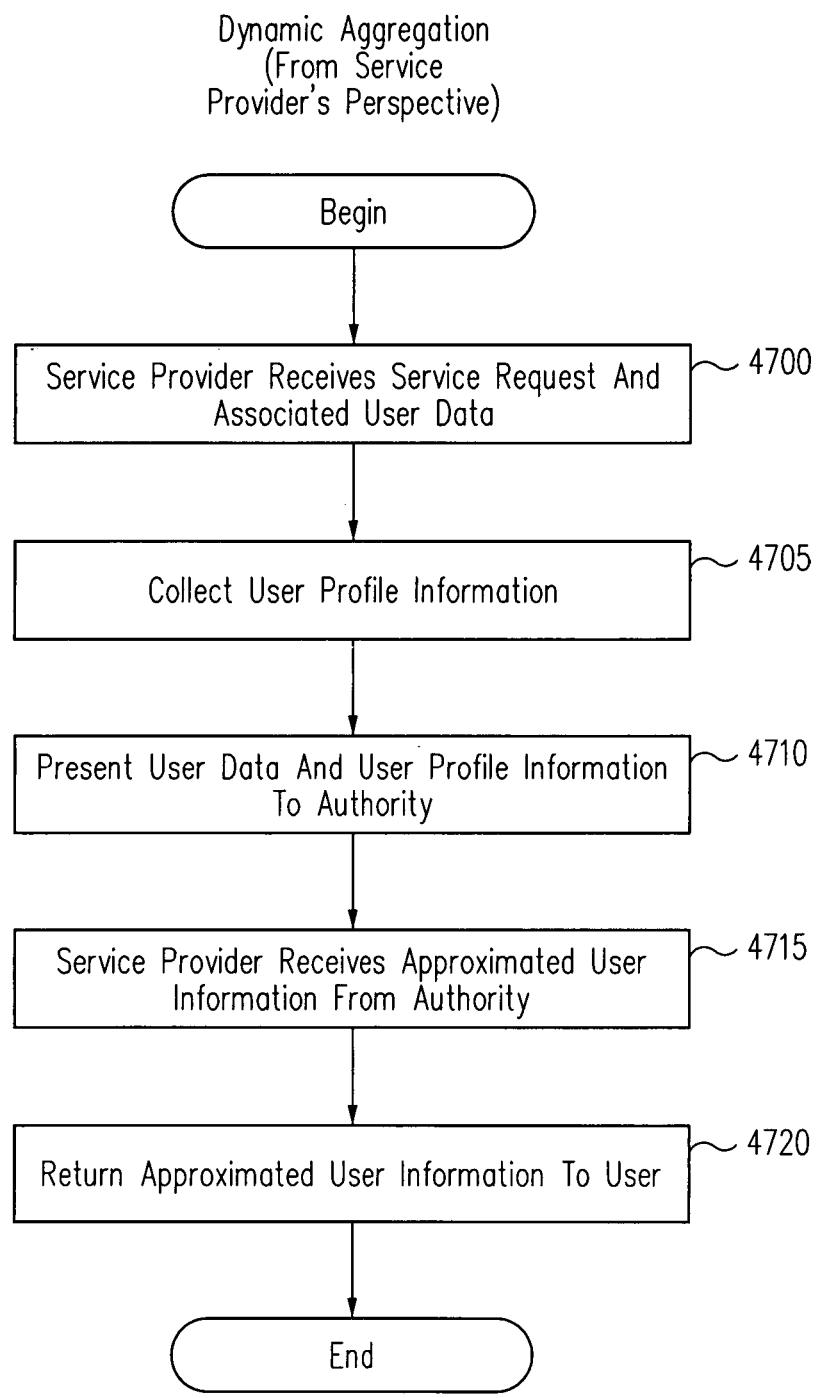
FIG. 47 is a flow diagram that illustrates a method for dynamic aggregation of user data in accordance with one embodiment of the present invention.
Figure 48:
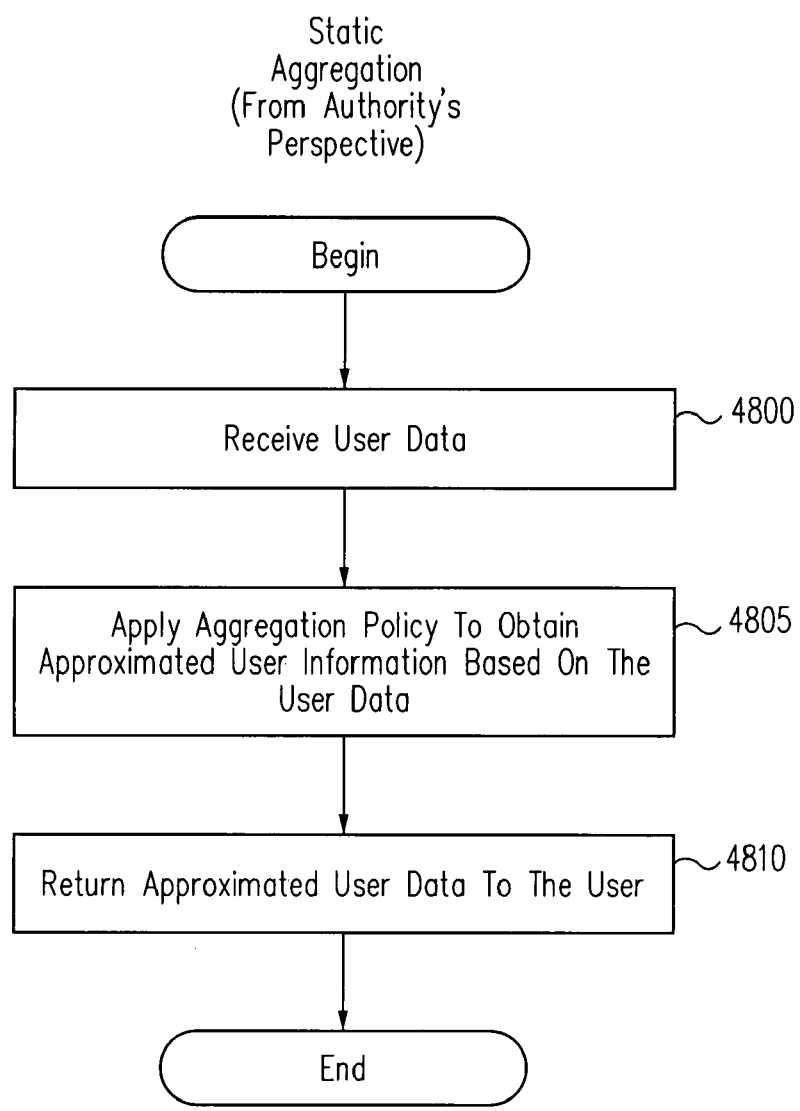
FIG. 48 is a flow diagram that illustrates a method for static aggregation of user data in accordance with one embodiment of the present invention.

FIGS. 46D, 47 and 48 illustrate embodiments of the present invention that use approximated user data to obtain services for a user in a manner that is privacy-sensitive.

For the purposes of the present disclosure, the term "Aggregation" refers to transforming specific user data into less specific and thus more approximate user data and the term "Aggregation authority" refers to an authority that performs this function. Aggregation includes obtaining information about a user that is not exact. For example, a service provider might store the number of times any Web page with a certain attribute was accessed, instead of storing the Web page URL or the Web page itself.

An aggregation authority may be classified in terms of the aggregation policies the authority applies. An external aggregation authority applies publicly accepted aggregation policies. A peer aggregation authority applies aggregation policies shared with another peer aggregation authority. An internal aggregation authority applies its own private aggregation policies. A peer group authority may restrict access to its policies to its peers.

Aggregation itself may be static or dynamic. The term "static aggregation" refers to performing aggregation based only upon user-provided information. An aggregation authority receives user-provided information, applies an aggregation policy to the user-provided data and returns approximated user data to the user.

The term "dynamic aggregation" refers to performing aggregation based upon both user-provided information and local information gathered about the user during an interaction with a service. In dynamic aggregation, a service provider receives user data from a user. The service provider also stores and gathers its own information about the user. The service provider presents both types of user data to an authority. The aggregation authority applies an aggregation policy to the combined data to obtain new approximated user data and returns the new approximated user data to the service provider.

Turning now to FIG. 46D, a block diagram that illustrates dynamic aggregation of user data in accordance with one embodiment of the present invention is presented. FIG. 46D includes a user 4645, a first vendor Web site 4635, a second vendor Web site 4640 and an authority 4630. The user 4645, shops at first vendor Web site 4635 and second vendor Web site 4640. The vendors (4635, 4640) communicate with the authority 4640. To obtain approximated user data based on more specific user data such as user activity at the vendor Web site. The approximated user data becomes part of the user data that the user retains for use when visiting other Web sites. According to one embodiment of the present invention, the user data is stored in secure user data storage.

In more detail, at 4650 a user 4645 presents a user profile to a first book vendor 4635. The first book vendor 4635 collects information about the type of books viewed or purchased using the first book vendor's Web site. By way of example, the book vendor 4635 may note the user purchased a number of science fiction novels and a number of gardening books. At 4655, the book vendor presents this collected user data and the user profile obtained from the user 4645 to an authority 4630. The authority applies an aggregation policy to the user profile and the collected user data to obtain approximated user data. By way of example, one possible aggregation policy may be to rate a user interest in book categories, using a commonly accepted set of categories. If the user data indicate the user 4645 is interested in neither science fiction nor gardening, and if the collected user data indicates the user 4645 recently purchased ten books in each category from book vendor 4635, the user data is modified to include a rating of the user's interest in these two categories.

Still referring to FIG. 46D, at 4670 the user 4645 may subsequently shop at a second book vendor Web site. The user 4640 presents a user profile including the approximated user data created when the user visited the first vendor 4635 Web site. The second book vendor 4640 may use the approximated user information to tailor the user's experience while shopping at the second Vendor Web site. The second book vendor 4640 may also collect information about the type of books viewed or purchased using the second book vendor's Web site, present this information to the authority 4630 and receive updated approximated user data, using a process similar to that which was discussed with respect to the first vendor 4635.

Turning now to FIG. 47, a flow diagram that illustrates a method for dynamic aggregation of user data in accordance with one embodiment of the present invention is presented. At 4700, a service provider receives a service request and associated user data. At 4705, user profile information is collected. At 4710, the user data and user profile information or a reference to the information is presented to an authority. At 4715, the service provider receives approximated user information from the authority. At 4720, the approximated user information is returned to the user.

Turning now to FIG. 48, a flow diagram that illustrates a method for static aggregation of user data in accordance with one embodiment of the present invention is presented. At 4800, user data is received. At 4805, an aggregation policy is applied to the user data to obtain approximated user data At 4810, the approximated user data is returned to the user.

According to one embodiment of the present invention, aggregated user data is stored in a credential. According to another embodiment of the present invention, a profile includes one or more credentials that in turn include aggregated user data. A profile is thus a form of aggregation of information about a user. According to another embodiment of the present invention, part of the data in the profile is bit-mapped.

Aggregation is privacy-protecting because the information stored is not exact. Therefore, it reveals nothing about a user as an individual. Any user could be described using approximated user information without revealing the user's identity. Furthermore, the mechanism for compiling the information may be hidden.

Figure 49:
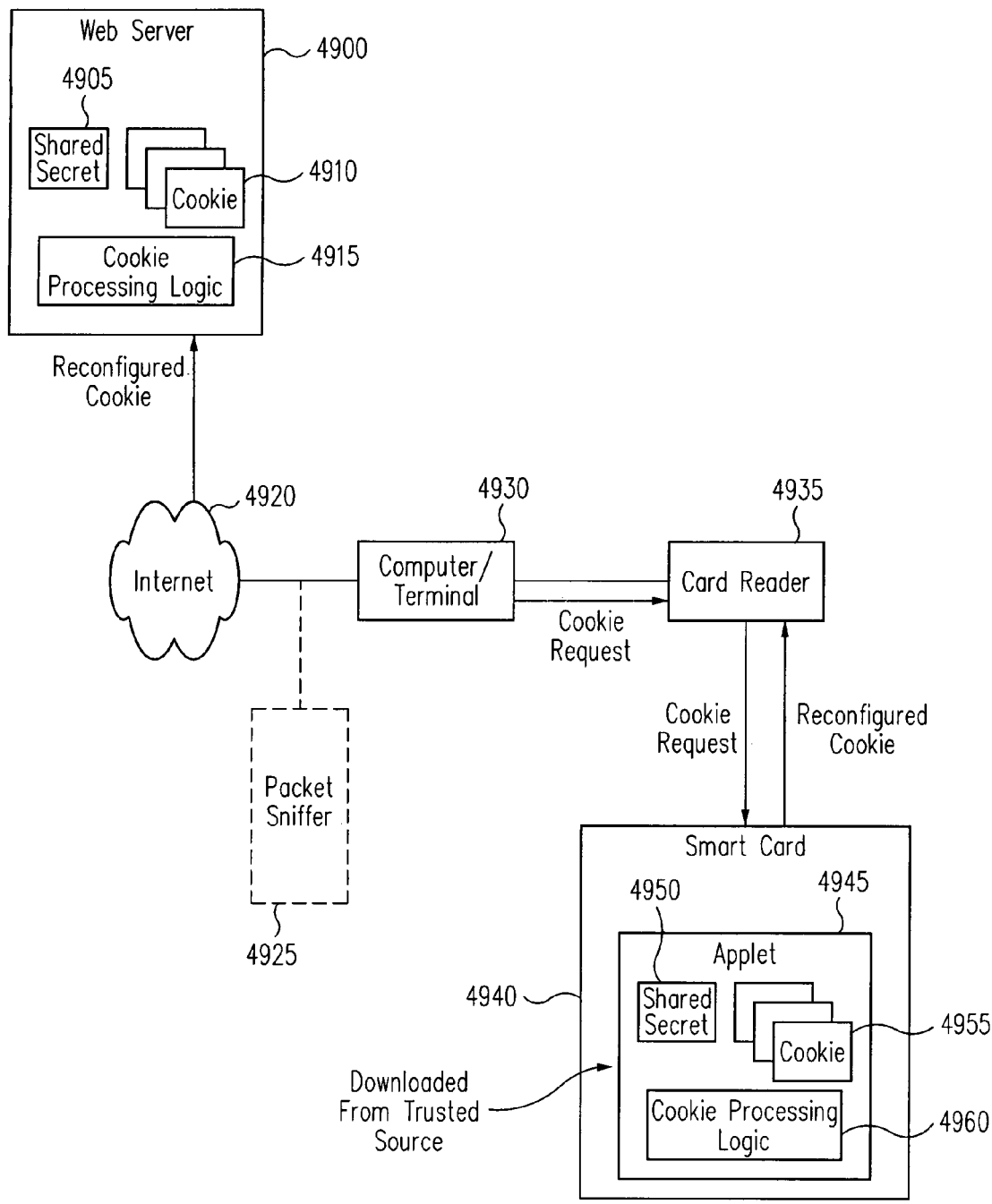
FIG. 49 is a block diagram that illustrates using a smart card to securely store and reconfigure cookies in accordance with one embodiment of the present invention.

Turning now to FIG. 49, a block diagram that illustrates using a smart card to securely store and reconfigure cookies in accordance with one embodiment of the present invention is presented. As shown in FIG. 49, a computer 4930 is equipped with a card reader 4935 for receiving a smart card 4940. The computer 4930 may be connected to a network 4920 that communicates with a plurality of other computing devices, such as a Web server 4900. Web server 4900 includes cookie-processing logic 4915, reconfigured cookies 4910 and at least one secret 4905 shared with applet 4945 on smart card 4940. Smart card 4940 also includes cookie-processing logic 4960 and storage for at least one cookie 4955.

In operation, Web Server 4900 issues a cookie request that is received by computer 4930. If the requested cookie is on the smart card 4940 and if the cookie comprises a dynamic cookie, cookie-processing logic 4960 uses the shared secret 4940 to reconfigure the cookie bit pattern and the reconfigured cookie is sent to Web server 4900 via computer 4930. Cookie-processing logic 4915 on Web server 4900 receives the reconfigured cookie and determines whether the cookie needs to be reconstructed. If the cookie needs to be reconstructed, cookie-processing logic 4915 reconstructs the cookie using shared secret 4905. Because cookies are reconfigured before being sent, a packet sniffer 5025 or similar device cannot match cookie data with a particular user.

According to one embodiment of the present invention, a cookie is associated with a timestamp. If the timestamp indicates the cookie is stale, the cookie is not processed.

According to another embodiment of the present invention, all cookies on a card are static, thus obviating the need for shared secrets (4905, 4950).

According to another embodiment of the present invention, a cookie management credential specifies the type of cookie management to be performed.

Figure 50:
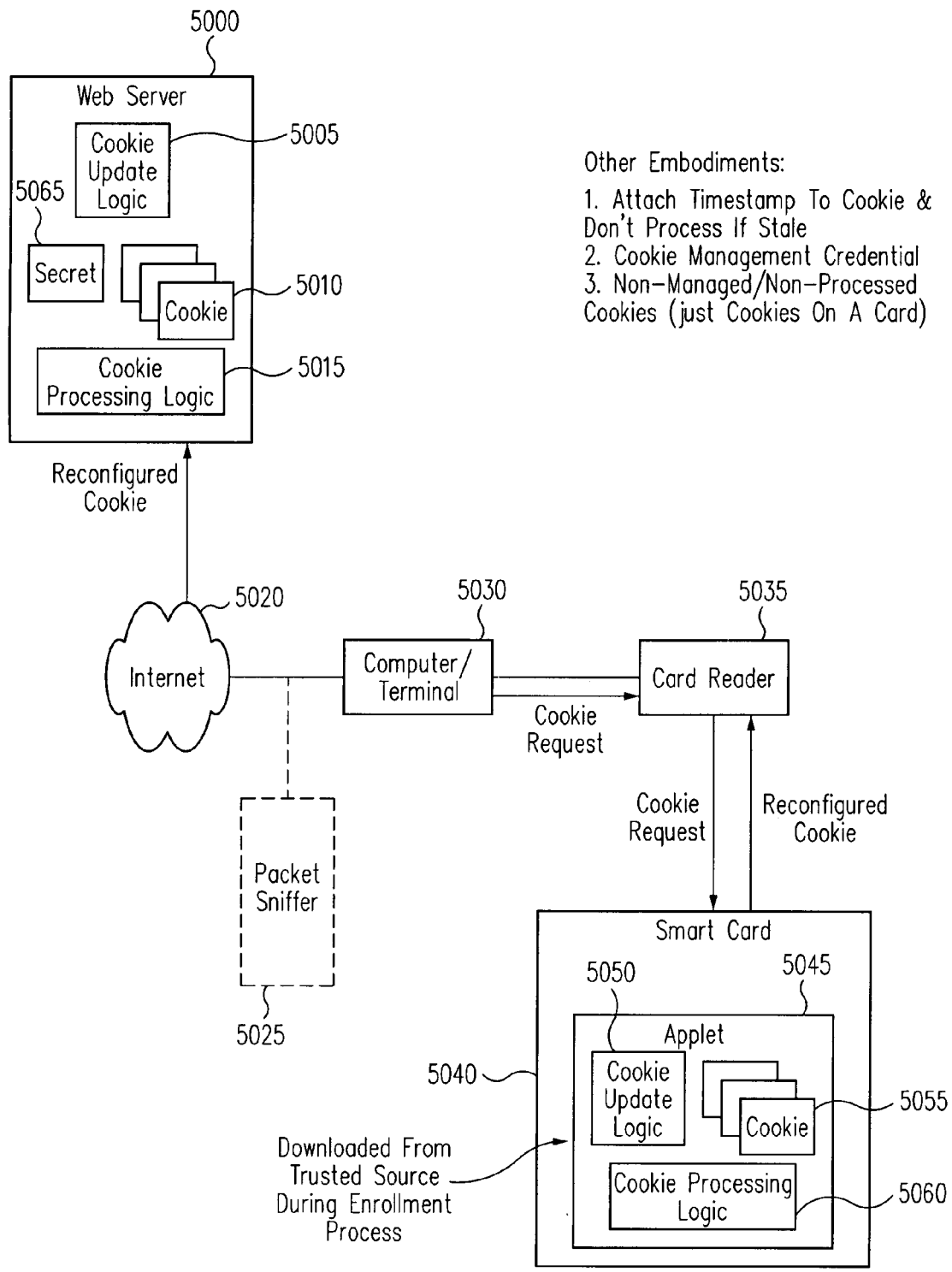
FIG. 50 is a block diagram that illustrates using a smart card to securely store and reconfigure cookies in accordance with one embodiment of the present invention.

Turning now to FIG. 50, a block diagram that illustrates using a smart card to securely store and reconfigure cookies in accordance with one embodiment of the present invention is presented. FIG. 50 is similar to FIG. 49, except that the secret 5065 resides only on Web server 5000 and is not shared with smart card 5040. Additionally, cookie update logic (5005, 5050) is used to periodically update cookies on the smart card 5040.

Figure 51:
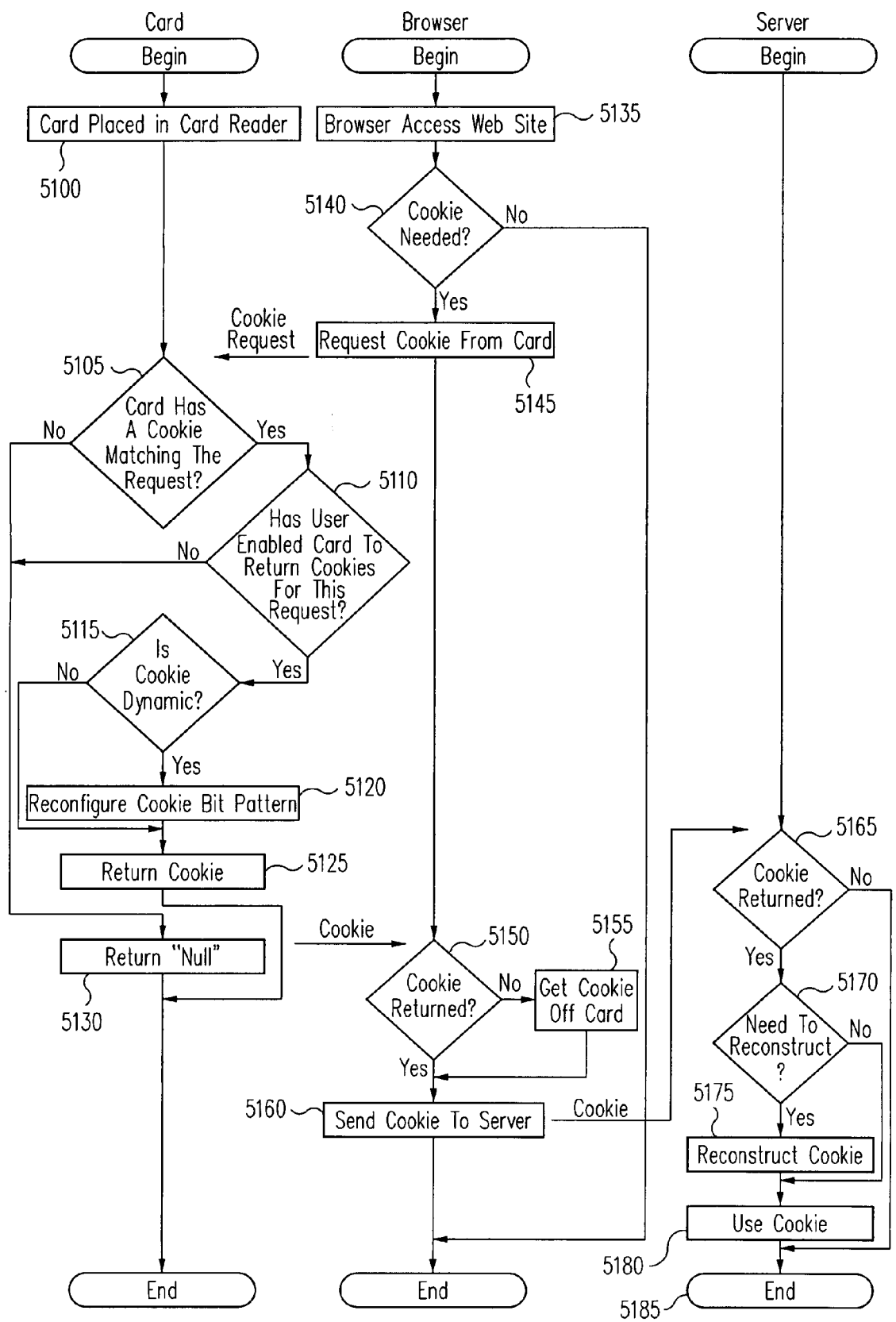
FIG. 51 is a flow diagram that illustrates a method for browsing the World Wide Web (WWW) in accordance with one embodiment of the present invention.

Turning now to FIG. 51, a flow diagram that illustrates a method for browsing the World Wide Web (WWW) in accordance with one embodiment of the present invention is presented. At 5100, the card is placed in a card reader. At 5135, a browser accesses a Web site. At 5140, a determination is made regarding whether a cookie is needed. If a cookie is needed, the browser requests a cookie from the card at 5145. At 5105, the card receives the cookie request and determines whether the card has a cookie matching the request. If the card has a cookie matching the request, at 5110 a determination is made regarding whether the user has enabled the card to return cookies for the request such as entering a PIN. If the card has enabled cookies for the request, at 5115 a determination is made regarding whether the cookie is dynamic. If the cookie is dynamic, the cookie bit pattern is reconfigured at 5120 and the reconfigured cookie is returned at 5125. If the cookie is static, the cookie is returned without reconfiguring it at 5125. If the card does not have a cookie matching the request or if the user has not enabled cookies for the request, an indication that no cookie will be returned is returned at 5130.

At 5150, the browser makes a determination regarding whether a cookie was returned from the card. If no cookie was returned from the card, a cookie is obtained from off the card, such as a local hard drive, and the cookie is sent to the server at 5160.

If a cookie was returned from the card, the cookie from the card is sent to the server at 5160. At 5165, the server determines whether a cookie was returned from the browser. If no cookie was returned from the browser, the process terminates at 5185. If a cookie was returned from the browser, at 5170 a determination is made regarding whether the cookie needs to be reconstructed. If the cookie needs to be reconstructed, it is reconstructed at 5175 and used at 5180. If the cookie does not need to be reconstructed. In either case, it is used at 5180.

Embodiments of the present invention have a number of advantages. Service providers can exchange information about a person without revealing inappropriate or unnecessary information, thus business transactions may be conducted over an open network such as the Internet while maintaining privacy.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for enhanced privacy protection in identification in a data communications network, the method comprising:

enrolling, by a user, with an authority over said data communications network for a service on said data communications network;

receiving, by said user from said authority over said data communications network, a randomized identifier (ID) in response to said enrolling;

storing said randomized ID; and using said randomized ID, by said user, and a service request to obtain services, on said data communications network, from a service provider wherein said service provider is different from said authority.

2. A program storage device readable by a machine, embodying a program of instructions executable by the machine to perform a method for enhanced privacy protection in identification in a data communications network, the method comprising:

enrolling, by a user, with an authority over said data communications network for a service on said data communications network;

receiving, by said user from said authority over said data communications network, a randomized identifier (ID) in response to said enrolling;

storing said randomized ID; and using said randomized ID, by said user, and a service request to obtain services, on said data communications network, from a service provider wherein said service provider is different from said authority.

3. An apparatus for enhanced privacy protection in identification in a data communications network, the apparatus comprising:

means for enrolling, by a user, with an authority over said data communications network for a service on said data communications network;

means for receiving, by said user from said authority over said data communications network, a randomized identifier (ID) in response to said enrolling;

means for storing said randomized ID; and means for using said randomized ID, by said user, and a service request to obtain services, on said data communications network, from a service provider wherein said service provider is different from said authority.

4. An apparatus for enhanced privacy protection in identification in a data communications network, the apparatus comprising:

a smart card configured to store a randomized ID obtained in response to enrolling for a service with an authority, by a user, on said data communications network, said smart card further configured to release said randomized ID to obtain services on said data communications network from a service provider wherein said service provider is different from said authority.

5. A memory for storing data for access by an application program being executed on a data processing system, comprising:

a data structure stored in said memory, said data structure including:

credential data;

an authority peer group ID that identifies an entity that provided data authentication for said credential, said entity comprising a one or more network servers in a data communications network, one of said one or more network servers providing data authentication for said credential; and a cryptogram provided by said entity and used to authenticate said credential data.

6. A method for obtaining a service on a data communications network, the method comprising:

presenting, over said data communications network an authority on said data communications network with user data and a credential request; and receiving, over said data communication network, a credential from said authority, in response to said credential request, said credential comprising:

a randomized identifier;

credential user data; and an indication of the credential user data verification performed by said authority in response to said credential request.

7. A method for obtaining a service on a data communications network, the method comprising:

presenting, over said data communications network, an authority on said data communications network with a logon request;

receiving, over said data communications network, a kerberos ticket in response to said user authentication data, said kerberos ticket comprising a randomized user ID; and using said kerberos ticket to obtain services from one or more service providers on said data communications network wherein said one or more service providers are different from said authority.

8. A program storage device readable by a machine, embodying a program of instructions executable by the machine to perform a method for obtaining a service on a data communications network, the method comprising:

presenting, over said data communications network, an authority on said data communications network with a logon request;

receiving, over said data communications network, a kerberos ticket in response to said user authentication data, said kerberos ticket comprising a randomized user ID; and using said kerberos ticket to obtain services from one or more service providers on said data communications network wherein said one or more service providers are different from said authority.

9. An apparatus for obtaining a service on a data communications network, the apparatus comprising:

means for presenting, over said data communications network, an authority on said data communications network with a logon request;

means for receiving, over said data communications network, a kerberos ticket in response to said user authentication data, said kerberos ticket comprising a randomized user ID; and means for using said kerberos ticket to obtain services from one or more service providers on said data communications network wherein said one or more service providers are different from said authority.

10. An apparatus for obtaining a service on a data communications network, the apparatus comprising:

a service provider configured to accept, over said data communications network, a service request and enrollment results obtained from an enrollment authority, said service provider capable of communicating with said enrollment authority to verify said enrollment results, said service provider configured to provide said service based upon said enrollment results and a response from said enrollment authority.

* * * * *